US012173532B2

(12) United States Patent
Zou et al.

(10) Patent No.: US 12,173,532 B2
(45) Date of Patent: Dec. 24, 2024

(54) LOCK AND CONTROL METHODS AND SYSTEMS THEREOF

(71) Applicant: YUNDING NETWORK TECHNOLOGY (BEIJING) CO., LTD., Beijing (CN)

(72) Inventors: Yong Zou, Beijing (CN); Mugen Zhou, Beijing (CN); Shuwen Zhou, Beijing (CN); Qi Yi, Shenzhen (CN); Guoming Chen, Beijing (CN); Lixue Ren, Shenzhen (CN)

(73) Assignee: YUNDING NETWORK TECHNOLOGY (BEIJING) CO., LTD., Beijing (CN)

( * ) Notice: Subject to any disclaimer, the term of this patent is extended or adjusted under 35 U.S.C. 154(b) by 743 days.

(21) Appl. No.: 17/290,267

(22) PCT Filed: Oct. 31, 2019

(86) PCT No.: PCT/CN2019/114905
§ 371 (c)(1),
(2) Date: Jun. 30, 2021

(87) PCT Pub. No.: WO2020/088621
PCT Pub. Date: May 7, 2020

(65) Prior Publication Data

US 2021/0381276 A1 Dec. 9, 2021

(30) Foreign Application Priority Data

Oct. 31, 2018 (CN) ......................... 201811283825.3
Oct. 31, 2018 (CN) ......................... 201821778261.6
(Continued)

(51) Int. Cl.
*E05B 47/00* (2006.01)
*E05B 47/06* (2006.01)

(52) U.S. Cl.
CPC ...... *E05B 47/0012* (2013.01); *E05B 47/0615* (2013.01); *E05B 2047/0026* (2013.01); *E05B 2047/0056* (2013.01)

(58) Field of Classification Search
CPC ..... E05B 2047/0031; E05B 2047/0026; E05B 2047/0056; E05B 24/0012; E05B 24/0615;
(Continued)

(56) References Cited

U.S. PATENT DOCUMENTS 5,403,047 A * 4/1995 Walls ........................ E05C 1/14 292/336.3
5,421,178 A * 6/1995 Hamel ................ E05B 47/0661 292/144
(Continued)

FOREIGN PATENT DOCUMENTS

CN 201372605 Y 12/2009
CN 201843394 U 5/2011
(Continued)

OTHER PUBLICATIONS

Espacenet, machine translation of CN 107643706 A (Year: 2024).*
(Continued)

*Primary Examiner* — Eugene G Byrd
*Assistant Examiner* — Emily G. Brown
(74) *Attorney, Agent, or Firm* — METIS IP LLC

(57) ABSTRACT

A lock and a method and a system for controlling the lock are provided. The lock includes an operation part, an action part, and a bolt. The action part is configured to drive the bolt to move. The operation part and the action part are connected to each other via a transmission connection. The transmission connection is blockable.

16 Claims, 19 Drawing Sheets

(30) Foreign Application Priority Data

Nov. 22, 2018 (CN) ......................... 201811399237.6
Nov. 22, 2018 (CN) ......................... 201821936750.X
Dec. 14, 2018 (CN) ......................... 201811536445.6
Dec. 14, 2018 (CN) ......................... 201822112162.0

(58) Field of Classification Search
CPC .... E05B 24/0673; E05B 24/0657; E05B 7/00; E05B 13/10; E05B 47/0657; E05B 2047/0069; E05B 2047/0072; E05B 47/0615; E05C 1/16
See application file for complete search history.

(56) References Cited

U.S. PATENT DOCUMENTS

| | | | | | |
|---|---|---|---|---|---|
| 5,979,199 | A | * | 11/1999 | Elpern | G07C 9/00182 292/201 |
| 6,851,291 | B2 | * | 2/2005 | Nunez | E05B 47/0673 70/150 |
| 8,033,147 | B2 | * | 10/2011 | Lie-Nielsen | E05B 47/0676 70/279.1 |
| 8,424,928 | B2 | * | 4/2013 | Lin | E05B 53/00 70/92 |
| 8,555,685 | B2 | * | 10/2013 | Frolov | E05B 63/16 70/482 |
| 9,200,472 | B2 | * | 12/2015 | Lee | E05B 63/22 |
| 2007/0157684 | A1 | | 7/2007 | Bogdanov et al. | |
| 2012/0212001 | A1 | * | 8/2012 | Benitez | E05B 17/22 340/5.1 |
| 2013/0031940 | A1 | * | 2/2013 | Romero | E05B 13/004 70/278.1 |
| 2015/0116075 | A1 | * | 4/2015 | Cregg | G07C 9/28 340/3.7 |
| 2016/0047145 | A1 | * | 2/2016 | Johnson | E05B 17/0087 292/144 |
| 2016/0053509 | A1 | * | 2/2016 | Shiu | E05B 47/0649 292/336.3 |
| 2018/0320412 | A1 | * | 11/2018 | Matosian | E05B 47/0012 |
| 2019/0040655 | A1 | * | 2/2019 | Chang | E05B 45/06 |

FOREIGN PATENT DOCUMENTS

| | | | | | |
|---|---|---|---|---|---|
| CN | 202064691 | U | * | 12/2011 | |
| CN | 102877707 | A | | 1/2013 | |
| CN | 105133926 | A | | 12/2015 | |
| CN | 204920469 | U | | 12/2015 | |
| CN | 204983919 | U | | 1/2016 | |
| CN | 204983928 | U | | 1/2016 | |
| CN | 205012759 | U | | 2/2016 | |
| CN | 205046977 | U | * | 2/2016 | |
| CN | 105545093 | A | | 5/2016 | |
| CN | 105587171 | A | | 5/2016 | |
| CN | 205206512 | U | | 5/2016 | |
| CN | 205314676 | U | | 6/2016 | |
| CN | 205370159 | U | | 7/2016 | |
| CN | 205637862 | U | | 10/2016 | |
| CN | 205777969 | U | | 12/2016 | |
| CN | 106320833 | A | | 1/2017 | |
| CN | 206458175 | U | | 9/2017 | |
| CN | 206785121 | U | | 12/2017 | |
| CN | 107643706 | A | * | 1/2018 | |
| CN | 207004199 | U | | 2/2018 | |
| CN | 207131184 | U | | 3/2018 | |
| CN | 108457524 | A | | 8/2018 | |
| CN | 108590369 | A | * | 9/2018 | E05B 15/00 |
| CN | 209443946 | U | | 9/2019 | |
| CN | 209585842 | U | | 11/2019 | |
| CN | 209958950 | U | | 1/2020 | |
| CN | 209958955 | U | | 1/2020 | |
| DE | 102005039959 | B4 | | 3/2014 | |
| GB | 2512875 | A | * | 10/2014 | E05B 17/22 |
| KR | 20160103269 | A | * | 9/2016 | |
| WO | WO-2014028332 | A1 | * | 2/2014 | E05B 47/0004 |

OTHER PUBLICATIONS

Espacenet, machine translation of CN 205046977 U (Year: 2024).*
Espacenet, machine translation of CN 202064691 U (Year: 2024).*
Espacenet, machine translation of CN 108590369 A (Year: 2024).*
Espacenet, machine translation of KR 20160103269 A (Year: 2024).*
Espacenet, machine translation of CN 205046977 U, generated Jan. 19, 2024 (Year: 2024).*
Espacenet, machine translation of CN 202064691 U, generated Jan. 24, 2024 (Year: 2024).*
First Office Action in Chinese Application No. 201811283825.3 mailed on Apr. 10, 2023, 16 pages.
First Office Action in Chinese Application No. 201811399237.6 mailed on Jan. 8, 2024, 13 pages.
International Search Report in PCT/CN2019/114905 mailed on Feb. 3, 2020, 10 pages.
Written Opinion in PCT/CN2019/114905 mailed on Feb. 3, 2020, 9 pages.

* cited by examiner

LOCK AND CONTROL METHODS AND SYSTEMS THEREOF

CROSS-REFERENCE TO RELATED APPLICATIONS

The present application is a U.S. National Stage entry under 35 U.S.C. § 371 of International Application No. PCT/CN2019/114905, filed on Oct. 31, 2019, designating the United States of America, which claims priority of Chinese Patent Application No. 201811283825.3, filed on Oct. 31, 2018, Chinese Patent Application No. 201821778261.6, filed on Oct. 31, 2018, Chinese Patent Application No. 201811399237.6, filed on Nov. 22, 2018, Chinese Patent Application No. 201821936750.X, filed on Nov. 22, 2018, Chinese Patent Application No. 201811536445.6, filed on Dec. 14, 2018, and Chinese Patent Application No. 201822112162.0, filed on Dec. 14, 2018, the entire contents of each of which are hereby incorporated by reference.

TECHNICAL FIELD

The present disclosure generally relates to the technical field of a lock, and more particularly, relates to a lock and methods and systems for controlling the lock.

BACKGROUND

As a smart home product, smart locks have been developed rapidly. The convenience, security, and sense of technology of the smart locks have been gradually recognized and favored by consumers.

For a traditional door lock, when there is no operation inside the door, a criminal can use some abnormal means to perform an unlocking operation on the door lock from outside the door. The door lock is very likely to be unlocked and the criminal can enter the room, which brings great hidden dangers to the safety of the occupants. For example, when a door is closed, a person outside the door can operate the door handle inside the door through a peephole from outside the door. Therefore, it is necessary to provide a lock that can prevent being unlocked by abnormal means from outside the door and a control method thereof, so as to improve the security of smart door locks.

SUMMARY

One of the embodiments of the present disclosure provides a lock. The lock may include an operation part, an action part, and a bolt. The action part may be configured to drive the bolt to move. The operation part and the action part may be connected to each other via a transmission connection. The transmission connection may be blockable.

One of the embodiments of the present disclosure provides a system for controlling a lock. The lock may include an operation part, an action part, and a bolt. The action part may be configured to drive the bolt to move. The operation part and the action part may be connected to each other via a transmission connection. The transmission connection may be blockable. The system may include a storage device storing a set of instructions and at least one processor in communication with the storage device. When executing the set of instructions, the at least one processor may be configured to cause the system to acquire a sensing signal via one or more sensing units; and control, based on the sensing signal, the operation part and the action part to switch between a transmission connection state and a transmission connection blocked state.

One of the embodiments of the present disclosure provides a method for controlling a lock. The lock may include an operation part, an action part, and a bolt. The action part may be configured to drive the bolt to move. The operation part and the action part may be connected to each other via a transmission connection. The transmission connection may be blockable. The method may include acquiring a sensing signal via one or more sensing units; and controlling, based on the sensing signal, the operation part and the action part to switch between a transmission connection state and a transmission connection blocked state.

One of the embodiments of the present disclosure provides a non-transitory readable medium. The non-transitory readable medium may include at least one set of instructions. When executed by at least one processor, the at least one set of instructions may direct the at least one processor to acquire a sensing signal via one or more sensing units; and control, based on the sensing signal, the operation part and the action part to switch between a transmission connection state and a transmission connection blocked state.

One of the embodiments of the present disclosure provides a smart door lock. The smart door lock may include a sensing unit, a controller, and a transmission mechanism. The controller may have a data connection to the sensing unit and the transmission mechanism. The sensing unit may include a pressure sensing unit and/or a capacitance sensor. The controller may be configured to control the transmission mechanism to be in an openable state based on a sensing signal of the sensing unit. In the openable state, the smart door lock can be opened from inside the door.

In some embodiments, the transmission mechanism may include a door inside handle, a handle steering member, a steering limiting plate, and a motor. The door inside handle may have a connection to the handle steering member. The steering limiting plate may have a connection to the motor. The openable state may be a state that the steering limiting plate is driven by the motor to be at a first position. The steering limiting plate at the first position does not hinder the rotation of the handle steering member. The handle steering member can be driven to rotate by rotating the door inside handle, and the smart door lock can be unlocked from inside the door.

In some embodiments, the controller may be further configured to control the transmission mechanism of the door lock to be in an unopenable state when the transmission mechanism has been in the openable state longer than a preset period. The unopenable state may be a state that the steering limiting plate is driven by the motor to be at a second position. The steering limiting plate at the second position may hinder the rotation of the handle steering member, and the smart door lock cannot be unlocked from inside the door.

In some embodiments, the sensing unit may be located on the door inside handle.

In some embodiments, the sensing unit may include a pressure sensing unit and a capacitance sensor. The pressure sensor may be located in a first region on the door inside handle, and the capacitance sensor may be located in a second region on the door inside handle.

In some embodiments, the sensing unit may include a pressure sensing unit and a capacitance sensor. The pressure sensing unit may be located on the door inside handle, and the capacitance sensor may be located in other regions other than the door inside handle. Alternatively, the capacitance sensor may be located on the door inside handle, and the pressure sensing unit may be located in other regions other than the door inside handle.

In some embodiments, the other regions other than the door inside handle may include a control panel of the smart door lock.

In some embodiments, the sensing unit may include a pressure sensing unit and a touch switch.

In some embodiments, the pressure sensing unit may include a metal pressure sensor.

In some embodiments, the capacitance sensor may include a multi-region capacitance sensor.

One of the embodiments of the present disclosure provides a method for controlling a door lock. The method may include detecting a sensing signal. The sensing signal may include a pressure sensing signal and/or a capacitance sensing signal. When the sensing signal is detected, the transmission mechanism of the door lock may be controlled to be in an openable state. In the openable state, the door lock can be unlocked from inside the door.

In some embodiments, after the transmission mechanism of the door lock is controlled to be in an openable state, the method may further include: when the transmission mechanism has been in the openable state longer than a preset period, controlling the transmission mechanism to be in an unopenable state. In the unopenable state, the door lock cannot be unlocked from inside the door.

One of the embodiments of the present disclosure provides a device for controlling a door lock. The device may include a sensing unit. The sensing unit may be configured to detect a sensing signal. The sensing signal may include a pressure sensing signal and/or a capacitance sensing signal. The device may further include a controller. When the sensing signal is detected, the controller may control the transmission mechanism of the door lock to be in an openable state. In the openable state, the door lock can be unlocked from inside the door.

In some embodiments, the controller may further be configured to control the transmission mechanism to be in an unopenable state when the transmission mechanism has been in the openable state longer than a preset period. In the unopenable state, the door lock cannot be unlocked from inside the door.

One of the embodiments of the present disclosure, an anti-peephole unlocking handle device is provided. The handle device may include a handle, a handle linkage member, and a clutch mechanism. The handle may include a pressure sensor for detecting a pressing force. The handle linkage member may be connected to the handle and move with a movement of the handle. A clutch end of the clutch mechanism may be configured to cooperate with the handle linkage member for clutch limiting. A drive controller of the clutch mechanism may be connected to the pressure sensor. When the pressure sensor detects the pressing force on the handle, a pressure signal may be generated and sent to the drive controller. The drive controller may control the action of the clutch mechanism based on the received pressure signal so that the cooperation between the clutch end and the handle linkage member may be broken and the handle may be allowed to perform an unlocking movement. When the handle is reset to a locked position, the drive controller may control the clutch end to reset to a position for cooperating with the handle linkage member.

In some embodiments, the clutch mechanism may include a housing, a motor, and a linear motion output assembly. The motor may be located within the housing. The drive controller may be a motor controller. The linear motion output assembly may be located within the housing. An output shaft of the motor may have a transmission connection with a rotating end of the linear motion output assembly. The linear motion output assembly may convert the rotation of the rotating end into a linear motion output of a linear motion end of the linear motion output assembly. The linear motion end may serve as the clutch end.

In some embodiments, the linear motion output assembly may include a clutch rotating shaft, a coil spring, and a clutch actuator. The clutch rotating shaft may have a transmission connection to the output shaft of the motor. A push rod may be located on an outer circumference of the clutch rotating shaft. The clutch rotating shaft may be the rotating end. The coil spring may be sleeved on the clutch rotating shaft, and the push rod may be inserted into a spiral gap of the coil spring. Two ends of the coil spring may be respectively fixed on the clutch actuator. The clutch actuator may include a guiding structure for circumferential limiting and linear guiding. One end of the clutch actuator may serve as the clutch end.

In some embodiments, the handle device may further include a mechanical clutch mechanism. The mechanical clutch mechanism may include a clutch mechanical member and a sliding switch. When a moving direction of the clutch mechanical member is parallel with that of the clutch actuator, and the clutch mechanical member drives the clutch actuator to move in a direction to be separated from the handle linkage member, the clutch actuator may move in a direction away from the handle linkage member. The sliding switch may be movably located on the housing along a straight line parallel to the moving direction of the clutch actuator. The sliding switch may be connected to the clutch mechanical member, and the sliding switch and the clutch mechanical member may move synchronously.

In some embodiments, the clutch mechanism member and the clutch actuator may be connected to each other through a contact connection. When the clutch mechanical member moves to a side close to the handle linkage member, the clutch mechanical member may be out of contact with the clutch actuator.

In some embodiments, the mechanical clutch mechanism may further include a reset elastic member. Two ends of the reset elastic member may act on the clutch mechanical member and the housing, respectively, to apply an elastic reset force on the clutch mechanical member to drive the clutch mechanical member to cooperate with the handle linkage member.

In some embodiments, the clutch mechanism may further include a transmission assembly. The motor may have a transmission connection to the rotating end of the linear motion output assembly through the transmission assembly.

In some embodiments, the transmission assembly may include a gear set, a synchronous belt transmission assembly, or a chain transmission assembly.

In some embodiments, the handle may be a rotating handle. The handle linkage member may include a handle steering member. The handle steering member may be arranged coaxially with a horizontal rotation axis of the rotating handle. The handle steering member may include a limiting groove for cooperating with the limiting member.

In some embodiments, the clutch mechanism may further include a steering limiting plate connected to the clutch end. The clutch end may cooperate with the limiting slot through the steering limiting plate.

In some embodiments, the rotating handle may include a handle body and a handle cover. The pressure sensor may be located within the handle body and configured at a position that can be touched by a finger.

In some embodiments, the rotating handle may include a handle body and a handle cover. The pressure sensor may be located in an installation groove of the handle cover. A pressure-deformed gap may exist between the pressure sensor and the handle cover.

In some embodiments, the pressure sensor may be located within a support sleeve, and the pressure sensor may be installed within the rotating handle through the support sleeve.

In some embodiments, the handle may be a push-pull handle. The handle linkage member may include a sliding plate. The sliding plate may be slidably located in the indoor casing and connected to a toggle end of the push-pull handle. The push-pull handle may drive the sliding plate to slide in the indoor casing. The sliding plate may include a limiting gap for cooperating with the clutch end.

In some embodiments, the clutch end that cooperates with the limiting gap may be a limiting stud.

In some embodiments, a pressure sensor may be located inside or outside of the push-pull handle close to a side panel of the indoor casing.

According to another aspect of the present disclosure, a door lock is provided. The door lock may include a lock body and a handle device. The handle device may be a handle device described above.

One of the embodiments of the present disclosure, a smart door lock is provided. The smart door lock may include a panel, an operation part, an action part, and a bolt. The panel may include a fixing hole, and the operation part and the action part may be respectively arranged at both ends of the fixing hole. The action part may include a driving member including a clutch structure, and a rotation of the driving member may drive the bolt to eject or retract. The operation part may include a handle and an elastic button including a clutch. When the elastic button is in a pressed state, the clutch may cooperate with the clutch structure, and a rotation of the handle may drive the rotation of the driving member. The handle may include an opening-closing mechanism. The opening-closing mechanism may include an operating member protruding from the handle and a limiting structure located within the handle. The limiting structure may cooperate with the elastic button. When the elastic button is in the pressed state, the operation part may act on the limiting structure to make the limiting structure cooperate with the elastic button, so as to restrict the elastic button from rebounding.

In some embodiments, the handle may include an accommodating cavity. A side wall of the accommodating cavity may include a first strip hole. The limiting structure may be located within the accommodating cavity, and the operating member may extend through the first strip hole. A movement of the operating member along the length direction of the first strip hole may drive the limiting structure to slide to be cooperated with or separated from the elastic button.

In some embodiments, the opening-closing mechanism may further include a slider located in the accommodating cavity. A movement of the operating member may drive the slider to slide. The limiting structure may be located at one end of the slider. The slider may include a second strip hole. The slider may be fixed to the handle through a limiting screw and the second strip hole. The limiting screw may slide along the second strip hole.

In some embodiments, the operating member may include a protruding part protruding from the first strip hole and a limiting part located in the accommodating cavity. The limiting part may drive the slider to slide.

In some embodiments, the opening-closing mechanism may further include a compression spring. The limiting part may include a limiting convex plate. The accommodating cavity may include a division block cooperating with the limiting convex plate. The division block may divide the accommodating cavity into a first position limiting region and a second position limiting region. When the limiting structure cooperates with the elastic button, the limiting convex plate may be located within the first position limiting region. When the limiting structure is separated from the elastic button, the limiting convex plate may be located within the second position limiting region. The compression spring may act on the limiting part so that the protruding part may be located within the position limiting region, and when the compression spring is in a compressed state, the limiting part may be out of the position limiting region.

In some embodiments, the slider may include a through hole. The limiting part may include a limiting column passing through the through hole. The compression spring may be sleeved on the outside of the limiting column. A length of the compression spring may be greater than that of the limiting column.

In some embodiments, the handle may include an arm and a connecting part. The opening-closing mechanism may be located on the arm. The connecting part may include an accommodating cavity connected to the fixing hole. The elastic button may be located within the accommodating cavity. The elastic button may further include a button and a return spring. The button and the clutch may be fixed, and the button may extend out of the accommodating cavity. The accommodating cavity may include a spring baffle. The return spring may be located between the spring baffle and the clutch, and the clutch may extend through the spring baffle to cooperate with the clutch structure.

In some embodiments, when the opening-closing mechanism includes the slider, an end of the slider may include a slot cooperating with the button. When a side wall of the slot is attached to a side wall of the button, an end surface of the slot may abut against the clutch to form the limiting structure.

In some embodiments, the button and the clutch may have a split structure and be fixed by bolts. The button may be made of an aluminum profile whose surface has been hard anodized. The clutch may be made of a zinc alloy whose surface has been electroplated.

In some embodiments, the action part may further include a connecting cylinder and a torsion spring. The panel may include a limiting plate and a limiting block along the circumference of the fixing hole. The limiting plate may include a gap. The limiting block may be located at a middle position of the gap. The torsion spring may be located inside the limiting plate and two torsion arms of the torsion spring may abut on both sides of the limiting block, respectively. The torsion arm may move between the limiting block and the end of the limiting plate. The connecting cylinder may include a limiting cover and a rotating cylinder. The limiting cover may include a first stucking member located between the two torsion arms. The rotating cylinder may pass through the fixing hole and be fixed with the handle. The rotating cylinder may include a cavity. The cavity may be connected to the accommodating cavity to form a clutch cavity. The driving member may include a blocking plate and a clutch sleeve. The blocking plate may include a second stucking member located between the two torsion arms. The clutch sleeve may pass through the cavity of the rotating cylinder.

An end of the clutch sleeve may include a clutch structure. When the button is pressed, the clutch may cooperate with the clutch structure in the clutch cavity.

In some embodiments, the limiting cover may include a first blocker. The blocking plate may include a second blocker that cooperates with the first blocker. When the clutch and the clutch structure are in a separated state, a rotation of the handle in a reverse-locking direction may drive the driving member to rotate through the first blocker and the second blocker, so that the door lock can be reverse locked.

In some embodiments, the smart door lock may further include a compression cover. The limiting cover may include a mounting groove on a side away from the rotating cylinder. The compression cover may be fixed with the limiting cover. The blocking plate may be rotatably located in the mounting groove.

In some embodiments, the smart door lock may further include a bearing. A side of the fixing hole facing the action part may include a flange along its circumference. An outer ring of the bearing may be fixedly connected to the flange. The limiting cover and the connecting part may abut against an inner ring of the bearing at two ends, respectively.

In some embodiments, an inner wall of the flange may include at least three convex ribs uniformly along an axial direction. A length direction of each convex rib may be parallel to an axial direction of the flange. The outer ring of the bearing may have an interference cooperation with the convex ribs.

In some embodiments, the smart door lock may further include a bearing pressure plate connected to the panel. A diameter of the flange may be greater than that of the fixing hole. The bearing pressure plate and the edge of the fixing hole may abut against the outer ring of the bearing from two ends.

In some embodiments, the connecting portion may include a first convex plate on a side facing the driving member. The limiting cover may include a second convex plate on a side facing the operation part. The first convex plate and the second convex plate may abut against the inner ring of the bearing from both ends.

BRIEF DESCRIPTION OF THE DRAWINGS

The present disclosure is further illustrated in terms of exemplary embodiments. These exemplary embodiments are described in detail with reference to the drawings. These embodiments are non-limiting schematic embodiments, in which like reference numerals represent similar structures, and wherein.

DETAILED DESCRIPTION

Figure 1:
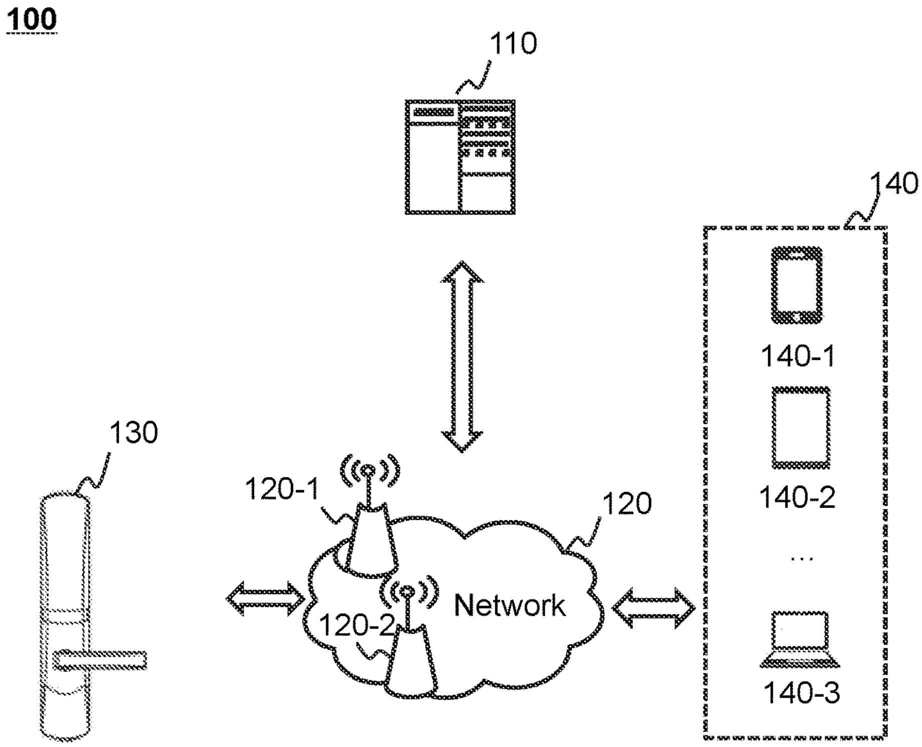
FIG. 1 is a schematic diagram illustrating an application scenario of a lock control system according to some embodiments of the present disclosure.

In order to illustrate the technical solutions related to the embodiments of the present disclosure, brief introduction of the drawings referred to the description of the embodiments is provided below. Obviously, drawings described below are only some examples or embodiments of the present disclosure. Those having ordinary skills in the art, without further creative efforts, may apply the present disclosure to other similar scenarios according to these drawings. Unless obviously obtained from the context or the context illustrates otherwise, the same numeral in the drawings refers to the same structure or operation.

It will be understood that the term "system," "device," "unit," and/or "module" used herein are one method to distinguish different components, elements, parts, sections, or assembly of different levels in ascending order. However, if other words may achieve the same purpose, the words may be replaced by other expressions.

As used in the disclosure and the appended claims, the singular forms "a," "an," and "the" include plural referents unless the content clearly dictates otherwise. In general, the terms "comprise" and "include" merely prompt to include steps and elements that have been clearly identified, and these steps and elements do not constitute an exclusive listing. The methods or devices may also include other steps or elements.

The flowcharts used in the present disclosure illustrate operations that systems implement according to some embodiments of the present disclosure. It should be noted that the foregoing or the following operations may not be performed in the order accurately. Instead, the steps may be processed in reverse order or simultaneously. Moreover, other operations may also be added into these procedures, or one or more steps may be removed from these procedures.

FIG. 1 is a schematic diagram illustrating an application scenario of a lock control system according to some embodiments of the present disclosure.

A lock control system 100 can control a state of a lock. In some embodiments, the lock may have more than one state, and the lock control system may control the lock to switch between different states. For example, the lock control system may control the lock to switch between an open state and a closed state. The lock control system may be widely used in various manufacturing and living regions, such as residential houses, office buildings, factories, schools, hospitals, hotels, rental houses, or the like. As shown in FIG. 1, the lock control system 100 may include at least a server 110, a network 120, a lock 130, and a user terminal 140.

The server 110 may process data and/or information related to the lock 130 to perform one or more functions described in the present disclosure. In some embodiments, the server 110 may include a processor 112. The processor 112 may process data and/or information related to the lock 130 to perform one or more functions described in the present disclosure. For example, the processor 112 may acquire password information for the lock 130 that is previously set via the user terminal 140, and send the password information to a relevant lock. As another example, the processor 112 may receive a management instruction for managing the lock passwords from the user terminal 140, and freeze or activate some of the lock passwords, or set a valid time for some of the lock passwords. As another example, the processor 112 may send, to the lock 130, a state switching instruction determined by the lock control system based on acquired sensing signals of one or more sensing units, in order to control an operation part and an action part of the lock 130 to switch between a transmission connection state and a transmission connection blocked state. As another example, the processor 112 may acquire state information and/or sensing information of the lock 130 through the network 120, and send the state information and/or sensing information to the user terminal 140 so that the relevant user can know the working state of the lock 130 in time. In some embodiments, the server 110 may be a single server or a server group. The server group may be centralized or distributed (e.g., the server 110 may be a distributed system). In some embodiments, the server 110 may be local or remote. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device. In some embodiments, the server 110 may be implemented on a mobile device.

The network 120 may be used for the exchange of information and/or data. One or more components (e.g., the server 110, the lock 130, the user terminal 140, etc.) of the system may send information/data to other components through the network 120. In some embodiments, the network 120 may be any type of wired or wireless network, or a combination thereof. For example, the network 120 may include a cable network, a wired network, a fiber-optic network, a telecommunication network, an intranet, the Internet, a local region network (LAN), a wide region network (WAN), a wireless local region network (WLAN), a metropolitan region network (MAN), a public telephone switched network (PSTN), a general package radio service (GPRS), a mobile phone network, a narrow band internet of things (NB-IoT/LoRa), a Bluetooth™ network, a ZigBee™ network, a near field communication (NFC) network, or the like, or any combination thereof. In some embodiments, the network 120 may include one or more network access points. For example, the network 120 may include wired and/or wireless network access points such as base stations and/or internet exchange points 120-1, 120-2, etc., through which one or more components of the system 100 may be connected to the network 120 to exchange data and/or information.

The lock 130 may have more than one state and can switch between different states based on instructions. In some embodiments, the lock 130 may include an operation part 210, an action part 220, and a bolt 230. The action part 220 may be configured to drive a bolt to move, such as to eject (lock) or to retract (unlock). In some embodiments, when the lock 130 receives a legal state switching instruction, the operation part may control the bolt to move based on the instruction to perform a locking operation or an unlocking operation. The operation part and the action part may be connected to each other via a transmission connection. In some embodiments, a user can manually operate the operation part to control the action part to move, thereby driving the bolt to move and performing the unlocking operation. In some embodiments, the lock 130 may also include a detecting unit. The detecting unit may be configured to detect the state of the lock. In some embodiments, the state of the lock may include a working state and/or an installation state. For example, the detecting unit may detect the installation state (e.g., installing, disassembling, whether an installation position of an internal component is accurate), electric quantity information, a working state of a component of the lock (e.g., a retracted state and an ejected state of a bolt, an operation with respect to the operation part inputted by a user, etc.) of the lock 130. In some embodiments, the detecting unit may also send an alarm to the lock control system 100 (e.g., the server 110, the user terminal 140, etc.) when it detects that the state of the lock 130 is abnormal. For example, the detecting unit may send an alarm to the lock control system 100 when it detects that the operation part and the action part are in a transmission connection blocked state and the bolt 230 is abnormally retracted. In some embodiments, the lock 130 may include one or more processors and one or more input devices locally. An input device may include a fingerprint inspection device, an image acquisition device, a keyboard, a voice acquisition device, or the like. The user may input an unlocking instruction into the lock 130 via the input device, and the processor of the lock may verify the unlocking instruction by, for example, comparing password information, verifying signature information of the unlocking instruction, etc. If the verification result is legal, the processor may control the action part to drive the bolt to move.

In some embodiments, the lock 130 may have an identification number, position information, state information, or the like. In some embodiments, the user terminal 140 or the server 110 may distinguish different locks 130 according to their identification numbers. In some embodiments, the lock 130 may include an independent communication module. The communication module may achieve communication function via a cable network, a wired network, a fiber-optic network, a telecommunication network, an intranet, the Internet, a local region network (LAN), a wide region network (WAN), a wireless local region network (WLAN), a metropolitan region network (MAN), a public telephone switched network (PSTN), a general package radio service (GPRS), a mobile phone network, a narrow band internet of things (NB-IoT/LoRa), a Bluetooth™ network, a ZigBee™ network, a near field communication (NFC) network, or the like, or any combination thereof.

In some embodiments, the user terminal 140 may include, but is not limited to, a desktop computer, a laptop computer, a smart phone, a personal digital assistance (PDA), a tablet computer, a handheld game console, smart glasses, a smart watch, a wearable device, a virtual display device, a handheld game player, or the like, or any combination thereof. The user terminal 140 may exchange data with other components in the system 100 via the network. In some embodiments, the user terminal 140 may be a terminal device of a user of the lock, which may communicate with the lock 130 directly or indirectly (e.g., through a server). In some embodiments, the user terminal 140 may transmit an instruction to the lock 130 to instruct the lock 130 to perform state switching. For example, the user may perform authentication on the user terminal 140 through a fingerprint authentication, a password authentication, or the like, and after the authentication is passed, the user may send an instruction to the lock 130 through the user terminal 140 to establish a transmission connection or block a transmission connection. In some embodiments, the user terminal 140 may also be configured to receive state information of the lock 130 directly or through the server 110, and the working state of the lock 130 may be grasped.

In some embodiments, the server 110, the lock 130, and the user terminal 140 may be provided with storage devices separately. An independent storage device may also be provided in the lock control system 100 for storing data and/or instructions. For example, the server 110 may include an integrated storage device. An independent storage device (e.g., a big data server) may also be provided, and the server 110 may access the independent storage device via the network 120. In some embodiments, a storage device may include a mass storage device, a removable storage device, a volatile read-and-write memory, a read-only memory (ROM), or the like, or any combination thereof. Exemplary mass storage devices may include a magnetic disk, an optical disk, a solid-status drive, etc. Exemplary removable storage devices may include a flash drive, a floppy disk, an optical disk, a memory card, a zip disk, a magnetic tape, etc. Exemplary volatile read-and-write memory may include a random-access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, a storage device may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

Figure 2:
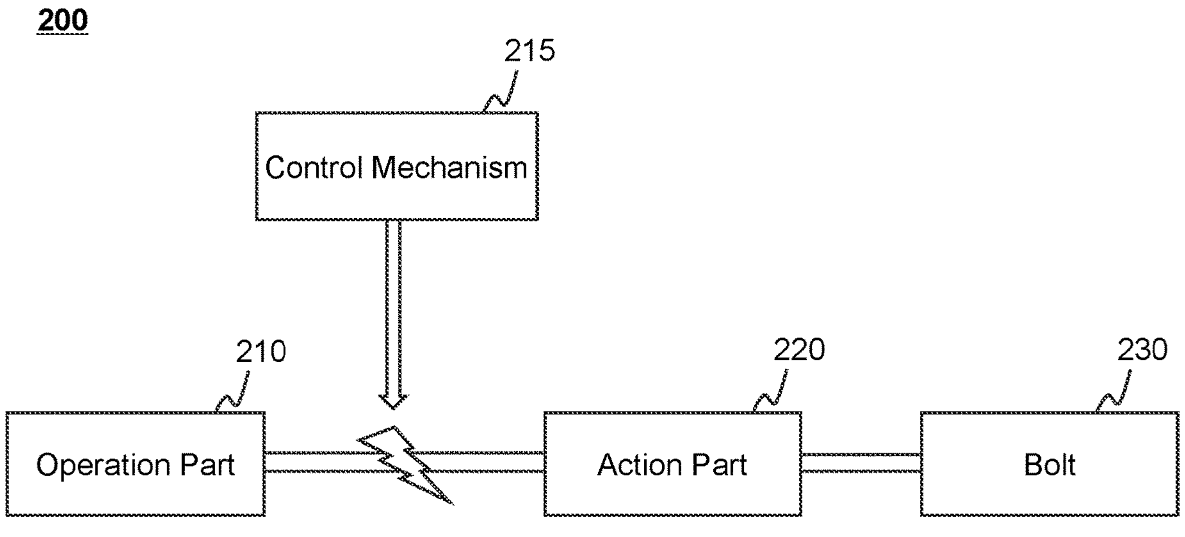
FIG. 2 is a schematic diagram illustrating an exemplary structure of a lock according to some embodiments of the present disclosure.

FIG. 2 is a schematic diagram illustrating an exemplary structure of a lock according to some embodiments of the present disclosure.

As shown in FIG. 2, the lock 200 may include an operation part 210, an action part 220, and a bolt 230. The operation part 210 and the action part 220 may be connected to each other via a transmission connection. The action part 220 may be configured to drive the bolt 230. The operation part 210 may be held by a user, receive an external force in a certain direction applied by the user, and transmit the external force to the action part, thereby driving the bolt to move. In some embodiments, the operation part may include a handle. In some embodiments, the operating portion may include a knob, and the bolt may be driven to move by rotating the knob.

In some embodiments, the transmission connection between the operation part 210 and the action part 220 may be blocked. For example, based on a certain control mechanism 215, the operation part 210 and the action part 220 may be controlled to switch between a transmission connection state and a transmission connection blocked state. When the operation part 210 and the action part 220 are in the transmission connection state, an operation applied on the operation part 210 by the user may be transmitted to the action part 220, and the action part 220 may drive the bolt 230 to move, thereby achieving the unlocking and locking of the lock. When the operation part 210 and the action part 220 are in the transmission connection blocked state, the operation applied on the operation part 210 by the user cannot be transmitted to the action part 220, so that the bolt 230 cannot be driven to eject or retract.

In some embodiments, blocking the transmission connection between the operation part 210 and the action part 220 may include disconnecting a transmission path. For example, the operation part 210 may include an elastic component that can act on the action part 220. When the elastic component is in a pressed state, the operation part 210 may have a transmission connection to the action part 220. When the elastic component is in a rebound state, the transmission path between the operation part 210 and the action part 220 may be disconnected, and the transmission connection may be blocked. More descriptions about disconnecting a transmission path may be found elsewhere in the present disclosure (e.g., FIGS. 26-39 and descriptions thereof).

In some embodiments, blocking the transmission connection between the operation part 210 and the action part 220 may include locking one or more elements in the transmission path, so that the power cannot be transmitted through the transmission path. For example, the operation part 210 may include a clutch mechanism and a handle linkage member (e.g., a handle steering member 3032 in FIG. 8, a handle linkage member 3 in FIGS. 12-14). The operation part 210 may be connected to the action part 220 through the handle linkage member. The clutch mechanism may further include a limiting member (e.g., a steering limiting plate 3033 in FIG. 8, a steering limiting plate 8 in FIGS. 13-14) and a driving member (e.g., a motor in FIG. 8, the clutch mechanism 7 in FIGS. 13-21). The limiting member has a transmission connection to the driving member. The limiting member and the handle linkage member may be driven to separate or to cooperate under the drive of the driving member. When the limiting member cooperates with the handle linkage member, the handle linkage member may be locked, so that the operation on the operation part 210 cannot be transmitted to the action part 220, that is, the power cannot be transmitted through the transmission path. More descriptions about locking a transmission path may be found elsewhere in the present disclosure (e.g., FIGS. 8-9, FIGS. 11-21, and descriptions thereof).

In some embodiments, the control mechanism 215 may include controlling the operation part 210 and the action part 220 to switch between the transmission connection state and the transmission connection blocked state based on a sensing signal of one or more sensing units. In some embodiments, the sensing unit may include a pressure sensor, a capacitance sensor, a touch switch, or the like, or any combination thereof. For example, the operation part 210 may include at least one sensing unit (e.g., a sensing unit 501 in FIG. 5, a pressure sensor 6 in FIG. 12, etc.). A control module (e.g., a controller 502 in FIG. 5) may control the operation part 210 and the action part 220 to switch between the transmission connection state and the transmission connection blocked state based on the sensing signal sent by the sensing unit. More descriptions about controlling the operation part and the action part to switch between the transmission connection state and the transmission connection blocked state based on a sensing signal may be found elsewhere in the present disclosure (e.g., FIGS. 5-25 and descriptions thereof).

In some embodiments, the control mechanism 215 may include controlling the operation part 210 and the action part 220 to switch between the transmission connection state and the transmission connection blocked state based on one or more mechanical actions. For example, the lock 200 may include an elastic component (e.g., a button 2200 and a return spring 2400 in FIG. 28), a clutch component (e.g., a clutch component 2300 in FIG. 28), and a first transmission component (e.g., a first transmission component 3100 in FIG. 39). The elastic component may be located on the operation part 210 and cooperated with the clutch component. The clutch component may have a transmission connection to the operation part 210. The first transmission component may have a transmission connection to the action part 220. The clutch component may have a transmission connection to the first transmission component by pressing the elastic component, so that the operation part 210 and the action part 220 may be in the transmission connection state. When the elastic component rebounds, the transmission connection between the clutch component and the first transmission component may be disconnected, the operation part 210 and the action part 220 may be in the transmission connection blocked state. More descriptions about controlling the operation part and the action part to switch between the transmission connection state and the transmission connection blocked state based on mechanical actions may be found elsewhere in the present disclosure (e.g., FIGS. 26-40 and descriptions thereof).

In some embodiments, the lock 200 may further include a detecting unit for detecting a state of the lock. In some embodiments, a state of the lock may include a working state and an installation state. For example, the working state of the lock may include an electric quantity of the lock, an ejected state or a retracted state of the lock, a rotation of the operation part and/or the action part, etc. The installation state of the lock may include a combined installation of the lock, a disassembly of the lock, an installation or a removal of a component, or the like. In some embodiments, the detecting unit may include a gravity sensor, a pressure sensor, a capacitance sensor, a biosensor, a touch switch, a transmitting detector, or the like, or any combination thereof. In some embodiments, the detecting unit may send a detection result to the control module of the lock 200. The control module of the lock 200 may perform corresponding operations (e.g., controlling a speaker unit to issue a warning) based on the detection result. For example, the action part 220 of the lock may include a sensor for detecting whether the ejection or retraction of the bolt 230 is in an abnormal state (e.g., the bolt 230 is abnormally retracted when the action part 220 and the operation part 210 are in the transmission connection blocked state). When detecting that the bolt 230 is abnormally retracted, the detecting unit may send a detection signal to the control module of the lock 200, and the lock 200 may perform corresponding operations (e.g., sending a notification to the user terminal 140, controlling the speaker inside the lock 200 to generate an alarm) based on the detection result. As another example, a sensor may be installed at a place where the battery is installed in the lock 200 to detect the electric quantity state of the lock. When the electric quantity of the lock is insufficient, the detecting unit may send a detection signal to the control module of the lock 200, and the lock 200 may issue a warning based on the detection result.

It should be noted that the above description of the lock 200 is merely provided for the purposes of illustration, and not intended to limit the scope of the present disclosure. Apparently, for persons having ordinary skills in the art, multiple variations and modifications may be conducted to the lock 200 under the teachings of the present disclosure. However, those variations and modifications do not depart from the scope of the present disclosure.

Figure 3:
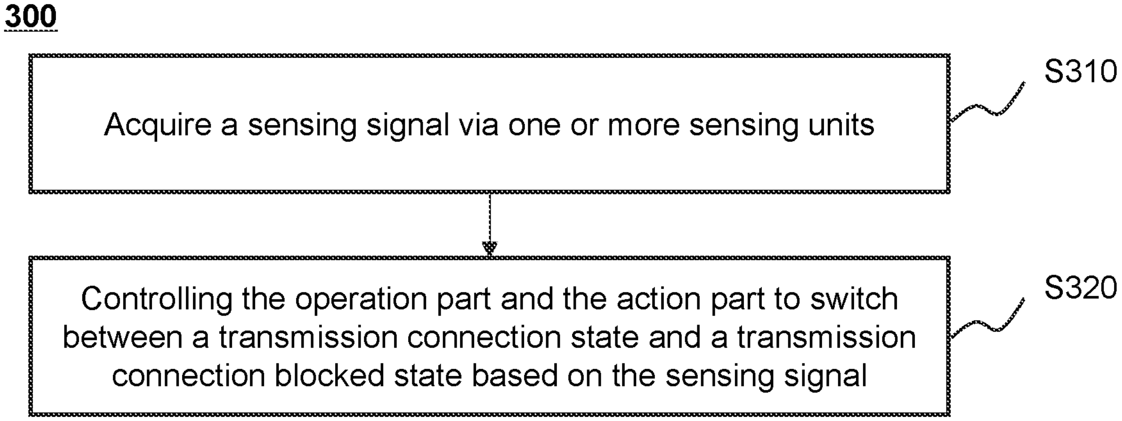
FIG. 3 is a flowchart illustrating an exemplary lock control method according to some embodiments of the present disclosure.

FIG. 3 is a flowchart illustrating an exemplary lock control method according to some embodiments of the present disclosure. The lock may include an operation part 210, an action part 220, and a bolt 230 as described in FIG. 2.

In operation 310, the lock may acquire a sensing signal via one or more sensing units. In some embodiments, operation 310 may be implemented by an acquisition module 410.

In some embodiments, the sensing unit may be located in the operation part of the lock. In some embodiments, the sensing unit may include a biosensor, a pressure sensor, a capacitance sensor, a touch switch, a transmitting detector, or the like, or any combination thereof. The transmitting detector may include a laser detector, an infrared detector, or the like. In some embodiments, the sensing signal may include a signal indicating that a human body is in contact with the operation part of the lock, a signal indicating that the operation part is at an initial position, biometric data generated after the human body contacts the operation part, a signal regarding a result of identity authentication, or the like. In some embodiments, whether the operation part is in contact with the human body may be detected via a pressure sensor, a capacitance sensor, or a touch switch. For example, the sensing unit may include a pressure sensor. When detecting that a user presses a handle (e.g., a handle 3031 in FIG. 8, a handle 1 in FIGS. 11-14, etc.) of the operation part of the lock, the pressure sensor may transmit a signal to the control module (e.g., a control module 420 in FIG. 4, a controller 502 in FIG. 5, etc.). In some embodiments, whether the operation part is located at a designated position may be detected based on a transmitting detector and a touch switch. Specifically, a laser detector may be located at an appropriate position of a certain part of the operation part, and the laser detector may emit a laser signal. When the operation part is at the initial position, the laser signal may be transmitted to the certain part of the operation part and be reflected. The laser detector may determine that the operation part is at the initial position based on the received reflected laser signal. When the operation part leaves the initial position, the laser signal cannot be reflected because there is no obstruction on the optical path of the laser signal. The laser detector may determine that the operation part has left the initial position based on that the reflected laser signal is not received. As another example, the touch switch may be located at a certain part of the operation part. When the operation part is at the initial position, the certain part is in contact with the touch switch, and when the operation part leaves the initial position, the certain part is separated from the touch switch. In some embodiments, the biometric data generated after the human body contacts the operation part may be detected based on the biosensor. For example, the sensing unit may include a biosensor. When detecting that a human body is in contact with the operation part, the biosensor may further detect the biometric data of the human body (e.g., face data, fingerprint data, vein data, etc.) and transmit the biometric data to the control module. In some embodiments, identity authentication may be performed based on the biosensor. For example, the sensing unit may include a fingerprint sensor. When the user touches the handle (e.g., the handle 3031 in FIG. 8, the handle 1 in FIGS. 11-14, etc.) of the operation part, the fingerprint sensor may collect fingerprint information of the user, compare the fingerprint information with pre-stored fingerprint in the system, and send the comparison result to the control module. The sensing unit may include various types and installation positions, which are not limited by the present disclosure. Any sensing unit that can achieve the above-mentioned detection purposes does not depart from the scope of the present disclosure.

In operation 320, the operation part and the action part may be controlled to switch between a transmission connection state and a transmission connection blocked state based on the sensing signal. In some embodiments, operation 320 may be implemented by a control module 420.

In some embodiments, the control module may control the operation part and the action part to be in the transmission connection blocked state based on the sensing signal transmitted by one or more sensing units. For example, if the sensing signal transmitted by the sensing unit indicates that the operation part is at an initial position, the operation part 210 and the action part 220 may be controlled to block the transmission connection. In some embodiments, the control module may control the operation part and the action part to connect to each other via a transmission connection based on the sensing signal transmitted by the sensing unit. For example, when the sensing signal indicates that the operation part is in contact with the human body, the control module may control the operation part 210 and the action part 220 to connect to each other via the transmission connection to unlock the lock. As another example, if an identity verification result transmitted by the sensing unit indicates that the current user is an authorized user, or the current user is confirmed as an authorized user by the control module based on the biometric data transmitted by the sensing unit, the control module may control the operation part 210 and the action part 220 to connect to each other via the transmission connection to unlock the lock. In some embodiments, the control module may also control the operation part and the action part to maintain in an original state based on the sensing signal transmitted by the one or more sensing units. For example, if the identity verification result transmitted by the sensing unit indicates that the current user is an unauthorized user, or the current user is confirmed as an unauthorized user by the control module based on the biometric data transmitted by the sensing unit, the control module may control the operation part and the action part to maintain in the original state (e.g., the transmission connection blocked state).

It should be noted that the above description of the process 300 is merely provided for the purposes of illustration, and not intended to limit the scope of the present disclosure. Apparently, for persons having ordinary skills in the art, multiple variations and modifications may be conducted to the process 300 under the teachings of the present disclosure. However, those variations and modifications do not depart from the scope of the present disclosure.

Figure 4:
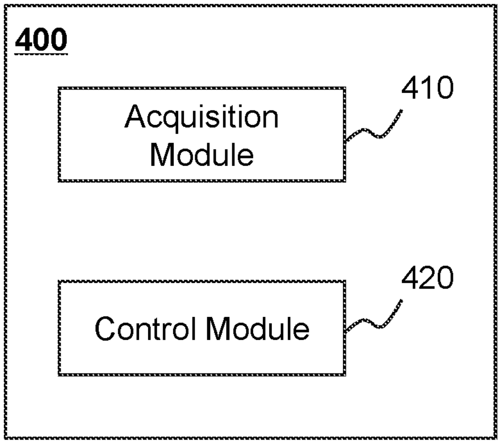
FIG. 4 is a block diagram illustrating an exemplary lock state control system according to some embodiments of the present disclosure.

FIG. 4 is a block diagram illustrating an exemplary lock state control system according to some embodiments of the present disclosure. As shown in FIG. 4, a lock state control system 400 may include an acquisition module 410 and a control module 420.

The acquisition module 410 may be configured to acquire a sensing signal acquired by one or more sensing units.

The control module 420 may be configured to control the operation part and the action part to switch between a transmission connection state and a transmission connection blocked state based on the sensing signal acquired by the acquisition module 410. In some alternative embodiments, in order to prevent misjudgment, the control module 420 may control the operation part and the action part to connect to each other via a transmission connection or block the transmission connection when the sensing signal is greater than a preset threshold.

It should be understood that the system and modules shown in FIG. 4 may be implemented in various ways. For example, in some embodiments, the system and modules may be implemented by hardware, software, or combining software and hardware. The hardware may be implemented using a dedicated logic. The software may be stored in a memory and executed by an appropriate instruction execution system, such as a microprocessor or dedicated designed hardware. In some embodiments, the lock state control system 400 may be implemented by a processor of the lock 130. Those having ordinary skills in the art will understand that the above-described methods and systems can be implemented using computer-executable instructions and/or by being included in processor control codes, for example, codes provided on a carrier medium such as a disk, CD or DVD-ROM, a programmable memory such as a read-only memory (firmware), or a data carrier such as an optical or electronic signal carrier. The system and modules of the present disclosure may be implemented by hardware circuits such as very large-scale integrated circuits or gate arrays, semiconductors such as logic chips, transistors, etc., or programmable hardware devices such as field programmable gate arrays, programmable logic devices, etc. The system and modules of the present disclosure may also be implemented by, for example, software executed by various types of processors, or by a combination of the foregoing hardware circuit and software (e.g., firmware).

According to an aspect of the present disclosure, a lock is provided. The lock may further include a handle linkage member (e.g., a handle steering member 3032 in FIG. 8) and a clutch mechanism. The operation part of the lock may have a transmission connection to the handle linkage member. In some embodiments, the clutch mechanism may include a limiting member (e.g., a steering limiting plate 3033 in FIG. 8) and a driving member. The limiting member may have a transmission connection to the driving member. The driving member may have a signal connection to the controller (e.g., the controller 502). In some embodiments, the clutch mechanism and the limiting member may be two independent elements (e.g., the clutch mechanism 7 and the steering limiting plate 8 in FIG. 13). In some embodiments, the driving member may include a motor (e.g., a motor 3034 in FIG. 8, a motor 73 in FIG. 16). In an initial state, the operation part of the lock may be at an initial position, and the limiting member of the lock may cooperate with the handle linkage member. The transmission connection between the operation part and the action part may be blocked. When detecting that the operation part is in contact with a human body, the sensing unit may send a sensing signal to the controller. The controller may control the driving member to drive the limiting member to separate from the handle linkage member. The operation part may be connected to the action part through the handle linkage member. At this time, the lock may be unlocked by operating the operation part. When detecting that the operation part is at the initial position, the sensing unit may send a sensing signal to the controller. The controller may control the driving member to drive the limiting member to cooperate with the handle linkage member, and the transmission connection between the operation part and the action part may be blocked. More details may be described in exemplary embodiments with reference to FIGS. 5-10.

Figure 5:
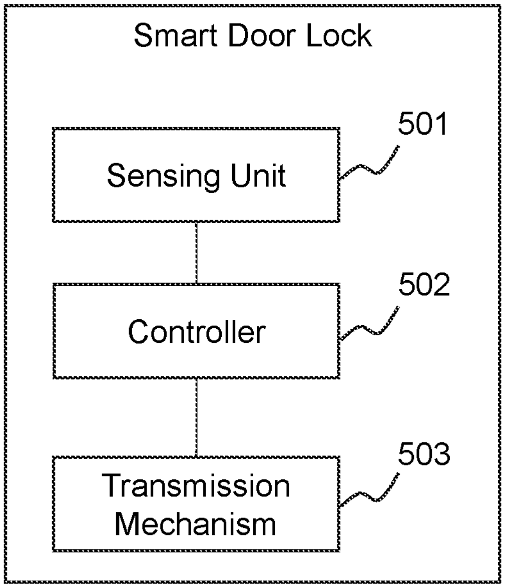
FIG. 5 is a schematic diagram illustrating a structure of an exemplary lock according to some embodiments of the present disclosure.
Figure 6:
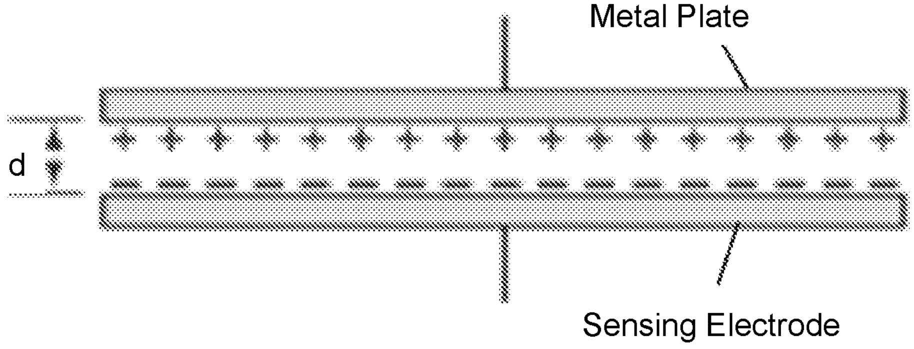
FIG. 6 is a schematic diagram illustrating a principle of how a pressure sensor senses an external pressure according to some embodiments of the present disclosure.
Figure 7:
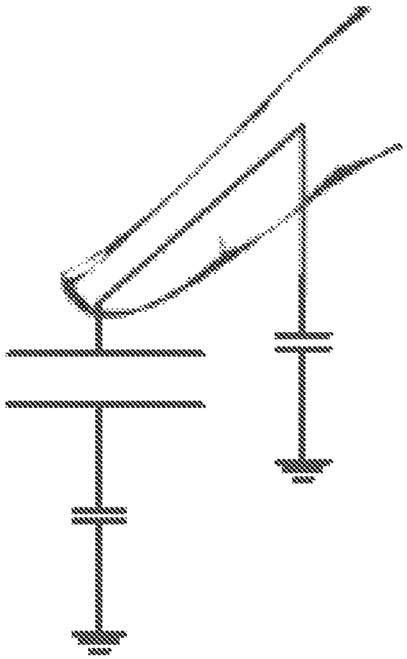
FIG. 7 is a schematic diagram illustrating a principle of how a capacitance sensor senses whether it is in contact with a human body according to some embodiments of the present disclosure.

FIG. 5 is a schematic diagram illustrating a structure of an exemplary lock according to some embodiments of the present disclosure. As shown in FIG. 5, a lock 500 may include a sensing unit 501, a controller 502, and a transmission mechanism 503.

The sensing unit 501 may have a data connection to the controller 502. The controller 502 may have a data connection to the transmission mechanism 503. Specifically, the data connection may be implemented by a wireless method or a data transmission medium, such as a data line (i.e., a telecommunication connection). For example, a data connection may include, but is not limited to, a wired or wireless connection method via a cable network, a wired network, a fiber-optic network, a telecommunication network, an intranet, the Internet, a local region network (LAN), a wide region network (WAN), a wireless local region network (WLAN), a metropolitan region network (MAN), a public telephone switched network (PSTN), a Bluetooth™ network, a ZigBee™ network, a near field communication (NFC) network, or the like, or any combination thereof.

The sensing unit 501 may be configured to sense an operation of a user with respect to a smart door lock. The operation may include touching, pressing, or the like, or any combination thereof. In some embodiments, the user may include a house owner, a house manager, a visitor, or a courier of a house where the smart door lock is located. The sensing unit 501 may include at least one of a pressure sensing unit or a touch sensing unit. The pressure sensing unit may be configured to sense an external pressing on the smart door lock, for example, the user's pressing on the handle of the smart door lock. The touch sensing unit may be configured to sense whether a human body is in contact with the smart door lock, for example, whether the user holds the handle of the smart door lock. Specifically, the pressure sensing unit may include a pressure sensor and/or a touch switch. In some embodiments, the pressure sensor may include, but is not limited to, a piezoresistive pressure sensor, a ceramic pressure sensor, a diffused silicon pressure sensor, a sapphire pressure sensor, a piezoelectric pressure sensor, or the like, or any combination thereof.

Some embodiments of the present disclosure describes a pressure sensor as an example of the pressure sensing unit. Generally, a pressure sensor may include a sensing electrode, a metal plate, and a processing chip. The principle of how the pressure sensor senses an external pressure may be shown in FIG. 6. A capacitance value may be formed between the sensing electrode and the metal plate of the pressure sensor. When the metal plate is touched and pressed, a distance between the sensing electrode and the metal plate (i.e., a value d) changes, so that the capacitance value changes. The processing chip of the pressure sensor (not shown in FIG. 6) may detect the external pressure based on the collected voltage value.

The touch sensing unit may include a capacitance touch sensor and/or a resistive touch sensor. Some embodiments of the present disclosure describe a capacitance sensor as an example of the touch sensing unit. The principle of how the capacitance sensor senses whether it is in contact with a human body may be shown in FIG. 7. The capacitance sensor and the ground may form an inductive capacitor with a fixed charging and discharging time. When a human body, such as a finger, approaches a touch panel of the capacitance sensor, a coupling capacitor may be formed, which may change the fixed charging and discharging time. Whether there is a human body approaches the touch panel of the capacitance sensor may be detected by measuring a change of the charging and discharging time.

A capacitance sensor is a sensor that makes use of the structural characteristic of a capacitor to implement measurement. For a capacitor including two parallel plates, a relationship between a capacitance C and a capacitor structure may be:

$$C = \frac{\varepsilon_0 \varepsilon_r A}{d} \quad (1)$$

where $\varepsilon_0$ denotes a dielectric constant of the vacuum, $\varepsilon_r$ denotes a relative dielectric constant, d denotes a distance between the two capacitor plates, and A denotes an area of a capacitor plate. In an initial state of the capacitance sensor, since the dielectric of the capacitor, the facing area of the two capacitor plates, and the distance between the two capacitor plates are unchanged, the capacitance C of the capacitor remains unchanged, so the capacitor has a fixed charging and discharging time. When the human body touches the capacitance sensor, a capacitance may be generated among the sensor, the finger, and the ground. This capacitance may be connected in parallel with and added to the natural parasitic capacitance of the capacitance sensor to the ground. Therefore, when the finger approaches the capacitance sensor, a total capacitance increases, and the fixed charging and discharging time changes.

The transmission mechanism 503 may have an openable state and an unopenable state. In the openable state, the smart door lock can be opened from inside the door. In the unopenable state, the smart door lock cannot be opened from inside the door. Specifically, when the transmission mechanism 503 is in the openable state, the operation part of the lock may have a transmission connection to the action part, and a rotation of the handle of the smart door lock (i.e., the operation part) may drive the handle steering member (i.e., the handle linkage member) to rotate, thereby driving the bolt to move to realize the unlocking and locking of the smart door lock. When the transmission mechanism 503 is in the unopenable state, the steering limiting plate (i.e., the limiting member) may cooperate with the handle steering member to hinder the rotation of the handle steering member. The transmission connection between the operation part and the action part may be blocked, so the smart door lock cannot be opened from inside the door by rotating the handle.

The controller 502 may be configured to control the transmission mechanism 503 to be in the openable state based on a sensing signal of the sensing unit. The controller 502 may not issue a control command to the transmission mechanism 503 when it doesn't receive the sensing signal, therefore, the transmission mechanism 503 is in the unopenable state.

That is, the controller 502 may be connected to the sensing unit 501, and the sensing unit 501 may send a sensing signal to the controller 502 when it senses an external pressure and/or a human body contact. The controller 502 may control the transmission mechanism 503 to be in the openable state based on the received sensing signal. In the openable state, the smart door lock can be opened from inside the door. Optionally, in order to prevent misjudgment, the controller 502 may control the transmission mechanism 503 to be in the openable state when the sensing signal is greater than a preset threshold. For example, the sensing unit 501 may set a first threshold, and when the sensing signal sent by the pressure sensor is greater than the first threshold, the transmission mechanism 503 may be controlled to be in the openable state. As another example, the sensing unit 501 may set a second threshold, and when the sensing signal sent by the capacitance sensor is greater than the second threshold, the transmission mechanism 503 may be controlled to be in the openable state. Optionally, the first threshold and the second threshold may be set at the same time, and the controller 502 may control the transmission mechanism 503 to be in the openable state when two sensing signals are greater than the first threshold and the second threshold, respectively.

The sensing unit 501 may not send a sensing signal to the controller 502 when it does not sense an external pressure and/or a human body contact, the transmission mechanism 503 may remain in the unopenable state, and the transmission connection between the operation part and the action part may be blocked.

It can be seen that the smart door lock shown in FIG. 5 combines a sensing unit, a transmission mechanism, and a controller. The transmission mechanism may be controlled to unlock the door from inside the door based on a sensing signal. Therefore, when a human body presses and/or is in contact with the sensing unit, the smart door lock can be opened from inside the door, otherwise, the smart door lock cannot be opened from inside the door. Compared with the existing anti-peephole unlocking technology, unless an external pressure and/or a human body contact is detected, the door lock is always in an unopenable state that the door cannot be opened from inside the door. Therefore, it can effectively prevent the lock from being unlocked through the peephole. In addition, compared with the existing method that relies solely on the mechanical structure to prevent the lock from being unlocked through the peephole, the combination of an electronic sensing control method and the mechanical structure may achieve higher security and a better convenience. For example, the sole mechanical structure may be more likely to be opened by a modified special tool that enters through a peephole mounting hole, but the electronic sensing element increases the difficulty for the criminals to operate through the peephole mounting hole. It should be noted that, even if the sensing unit only includes a pressure sensing unit or a touch sensing unit, and the pressure sensing unit or touch sensing unit as an electronic device may have a smaller area than a sole mechanical structure, which may increase the difficulty for the criminals to press through the peephole mounting hole.

Further, if the user does not deliberately perform any operations, the door lock may always be in the unopenable state. When the user needs to open the door, he/she only needs to contact the sensing unit. Therefore, the user does not need to deliberately trigger the anti-peephole unlocking technology and have a better user experience.

Figure 8:
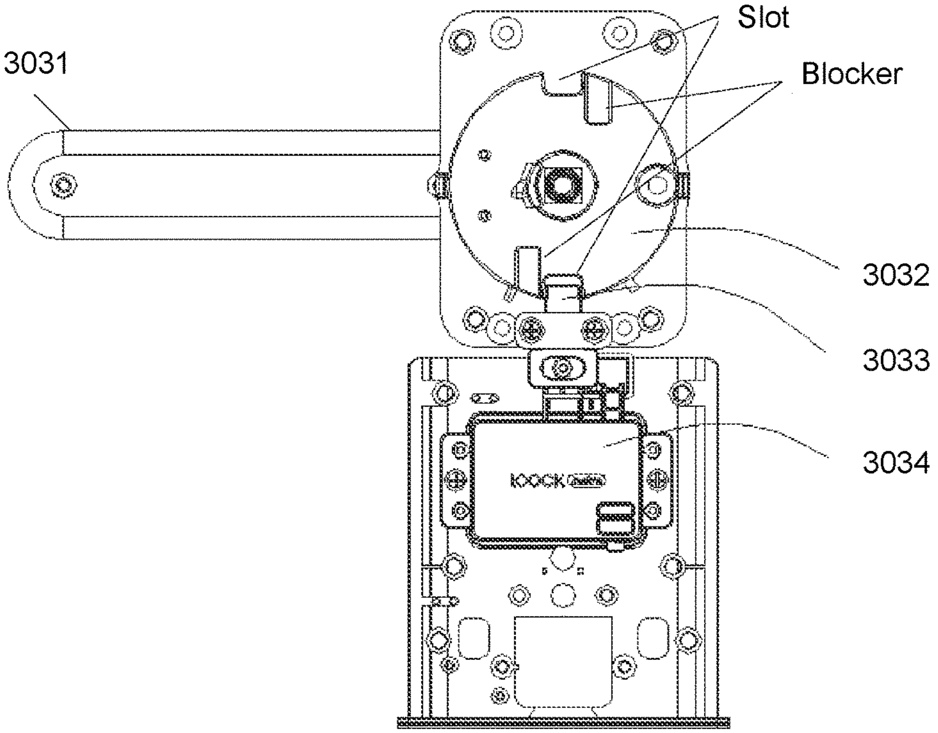
FIG. 8 is a schematic diagram illustrating a structure of an exemplary transmission mechanism of a smart door lock according to some embodiments of the present disclosure.

FIG. 8 is a schematic diagram illustrating a structure of an exemplary transmission mechanism 503 of a smart door lock according to some embodiments of the present disclosure.

As shown in FIG. 8, the transmission mechanism 503 may include a door inside handle 3031, a handle steering member 3032 (i.e., the handle linkage member), a steering limiting plate 3033 (i.e., the limiting member), and a motor 3034 (i.e., the driving member).

The door inside handle 3031 may be located at the operation part. The door inside handle 3031 may have a connection (specifically, as shown in FIG. 8, a mechanical connection, more specific connection structures can be referred to related descriptions of the prior art or FIGS. 11-25) to the handle steering member 3032. In some embodiments, the door inside handle 3031 may have a fixed connection and/or a transmission connection to the handle steering member 3032. For example, a connection between the door inside handle 3031 and the handle steering member 3032 may include, but is not limited to, a welding connection, a bolt connection, a glue connection, a riveting connection, a clamping connection, or the like, or any combination thereof. The steering limiting plate 3033 may have a connection (e.g., a mechanical connection, more specific connection structures can be referred to related descriptions of the prior art or FIGS. 11-25) to the motor 3034. For example, a connection between the steering limiting plate 3033 and the motor 3034 may include, but is not limited to, a rack and pinion connection, a belt driving connection, a crank-rocker connection, a cam connection, or the like, or any combination thereof. The motor 3034 may control the steering limiting plate 3033 to move. When the steering limiting plate 3033 is at a first position, it does not hinder the rotation of the handle steering member 3032. When the steering limiting plate 3033 is at a second position, it hinders the rotation of the handle steering member 3032.

Specifically, as shown in FIG. 8, the handle steering member 3032 may include a blocker. The second position may be a position where the steering limiting plate 3033 extends toward the handle steering member 3032, and more specifically, a position where the steering limiting plate 3033 is locked into a slot on the handle steering member 3032. In such cases, the occupancy of the steering limiting plate 3033 may partially overlap with the moving trajectory of the blocker. The steering limiting plate 3033 may block the movement of the blocker, therefore, the handle steering member 3032 cannot be rotated and the transmission connection between the operation part and the action part may be blocked. The first position may be a position where the steering limiting plate 3033 leaves the slot of the handle steering member 3032. Optionally, a state that the steering limiting plate 3033 is at the second position may be shown in FIG. 13. The steering limiting plate 3033 (corresponding to the steering limiting plate 8 in FIG. 13) may be locked into the slot (corresponding to the limiting slot 311 in FIG. 13) of the handle steering member 3032 (corresponding to the handle steering member 31 in FIG. 13). The occupied position of the steering limiting plate 3033 may partially overlap with the moving trajectory of the blocker, so the steering limiting plate 3033 may block the movement of the blocker, and the handle steering member 3032 cannot be rotated. A state that the steering limiting plate 3033 is at the first position may be shown in FIG. 14. The steering limiting plate 3033 (corresponding to the steering limiting plate 8 in FIG. 14) may leave the slot (corresponding to the limiting slot 311 in FIG. 14) of the handle steering member 3032 (corresponding to the handle steering member 31 in FIG. 14) to release the restriction on the handle steering member 3032. At this time, rotating the door inside handle 3031 may drive the handle steering member 3032 to move, and the operation part may have a transmission connection to the action part. The bolt may be driven to realize the unlocking.

In connection with the transmission mechanism shown in FIG. 8, the controller 502 may have a data connection to the motor 3034. For example, when receiving a sensing signal, the controller 502 may transmit an electrical signal to the motor 3034. The motor 3034 may drive the steering limiting plate 3033 to move according to the electrical signal, and then control the operation part and the action part to switch between a transmission connection state and a transmission connection blocked state.

Based on the transmission mechanism shown in FIG. 8, the pressure sensor may be located on the operation part (e.g., the door inside handle 3031). The capacitance sensor may also be located on the operation part (e.g., the door inside handle 3031). Specifically, the pressure sensor may be located in a first region on the operation part, and the capacitance sensor may be located in a second region on the operation part. Since the operation part is usually made of metal, in order to make the door lock have a better feel, the pressure sensor located on the operation part may be a metal pressure sensor. Exemplary technical parameters of a corresponding hardware structure of the metal pressure sensor may be set as follows:

The material may include zinc alloy, aluminum, or stainless steel.

A distance d2 between a metal touch panel and a sensing panel may be in a range of 0.1 mm-0.2 mm.

A thickness H of the metal touch panel may be in a range of 0.4 mm-0.5 mm.

A diameter D of the sensing panel may be greater than 12 mm.

An area size L of the metal touch panel may be equal to (D+2 mm).

A shape of the sensing panel may include a circle, an ellipse, or a square.

It should be noted that the above parameters are examples. Since the pressure sensor has extremely high requirements for anti-static and anti-electromagnetic pulse interference, temperature and humidity, or vibration, in actual applications, in order to prevent false triggers, different products may adopt different strategies. The parameters actually used can be set based on experience.

In some embodiments, the capacitance sensor and/or the pressure sensor may also be located on a side or a bottom of the door inside handle 3031. In the embodiments of this specification, a side of the door inside handle 3031 refers to a side of the door handle facing the ceiling (or roof) and/or the ground when the lock is unlocked. A bottom of the door inside handle 3031 refers to a side of the door handle facing the door inside panel when the lock is unlocked. Optionally, the capacitance sensor and/or the pressure sensor may also be located in other regions other than the door inside handle 3031, which is not limited in the present disclosure.

Optionally, the pressure sensing unit and the capacitance sensor may be located in different regions depending on the user experience and an internal structure of the product. For example, the pressure sensing unit may be located on the door inside handle, and the capacitance sensor may be located in other regions other than the door inside handle. As another example, the capacitance sensor may be located on the door inside handle, and the pressure sensing unit may be located in other regions other than the door inside handle. The other region refers to a region of the smart door lock other than the door inside handle (e.g., a control panel) or a region other than a smart door lock (e.g., a door body).

Optionally, in some embodiments, the capacitance sensor may include a multi-region capacitance sensor. A multi-region capacitance sensor refers to a capacitance sensor with touch panels distributed in multiple regions. The multi-region capacitance sensor can determine whether there is a user contact on multiple regions, and the result is more accurate, thereby improving the security of the smart door lock.

Based on the transmission mechanism shown in FIG. 8, the controller 502 and the motor 3034 may be located in a rear panel of the smart door lock. In some embodiments, the controller 502 may also be located in other reasonable regions, such as a front panel of the smart door lock, which is not limited in the present disclosure. The sensing unit 501 and the controller 502 may communicate to each other via a bus. After sensing a signal, the sensing unit 501 may send an instruction to the controller 502, and the controller 502 may control the motor 3034 to drive the steering limiting plate 3033 to move from the second position to the first position.

It should be noted that, in order to further improve security, the controller 502 may control the motor 3034 to drive the steering limiting plate 3033 to move to the second position after the steering limiting plate 3033 has been at the first position for a period longer than a preset period. In such cases, it is possible that the door handle is still in a depressed state. Therefore, the steering limiting plate 3033 cannot be driven to move to the second position, and the motor 3034 may keep driving the steering limiting plate 3033 under the control of the controller 502. When the door handle is not in the depressed state (referred to as return), the steering limiting plate 3033 may be driven by the motor 3034 to move to the second position.

In some embodiments, when the sensing unit detects that the operation part is at the initial position, the controller may control the operation part to be connected to the action part via a transmission connection based on a detection signal output by the sensing unit. For example, the controller 502 may control the motor 3034 to drive the steering limiting plate 3033 to move to the second position based on the sensing information of the sensing unit 501. Specifically, when the sensing unit 501 does not detect the pressing (or touching) signal of the door handle, the detecting result may be transmitted to the controller 502, and the controller 502 may control the motor 3034 to drive the steering limiting plate 3033 to move to the second position. In some alternative embodiments, the operation part may further include a module for detecting a position of the handle (e.g., a pressed position, an initial position, etc.). After the sensing unit detects that the handle is at the initial position, the detection signal may be sent to the controller 502, and the controller 502 may control the motor 3034 to drive the steering limiting plate 3033 to move to the second position.

In some embodiments, an elastic structure interacting with the steering limiting plate 3033 may be provided, so that when the steering limiting plate 3033 is at the first position, the elastic structure may be in a compressed state. After the door lock is opened (or the door handle is returned), the steering limiting plate 3033 may be driven to move to the second position under an action of the elastic structure (e.g., an elastic force). More descriptions about the elastic structure may be found elsewhere in the present disclosure (e.g., FIGS. 11-25 and descriptions thereof).

In some alternative embodiments, the lock may also include an element, such as a bolt and a bolt driving mechanism.

Figure 40:
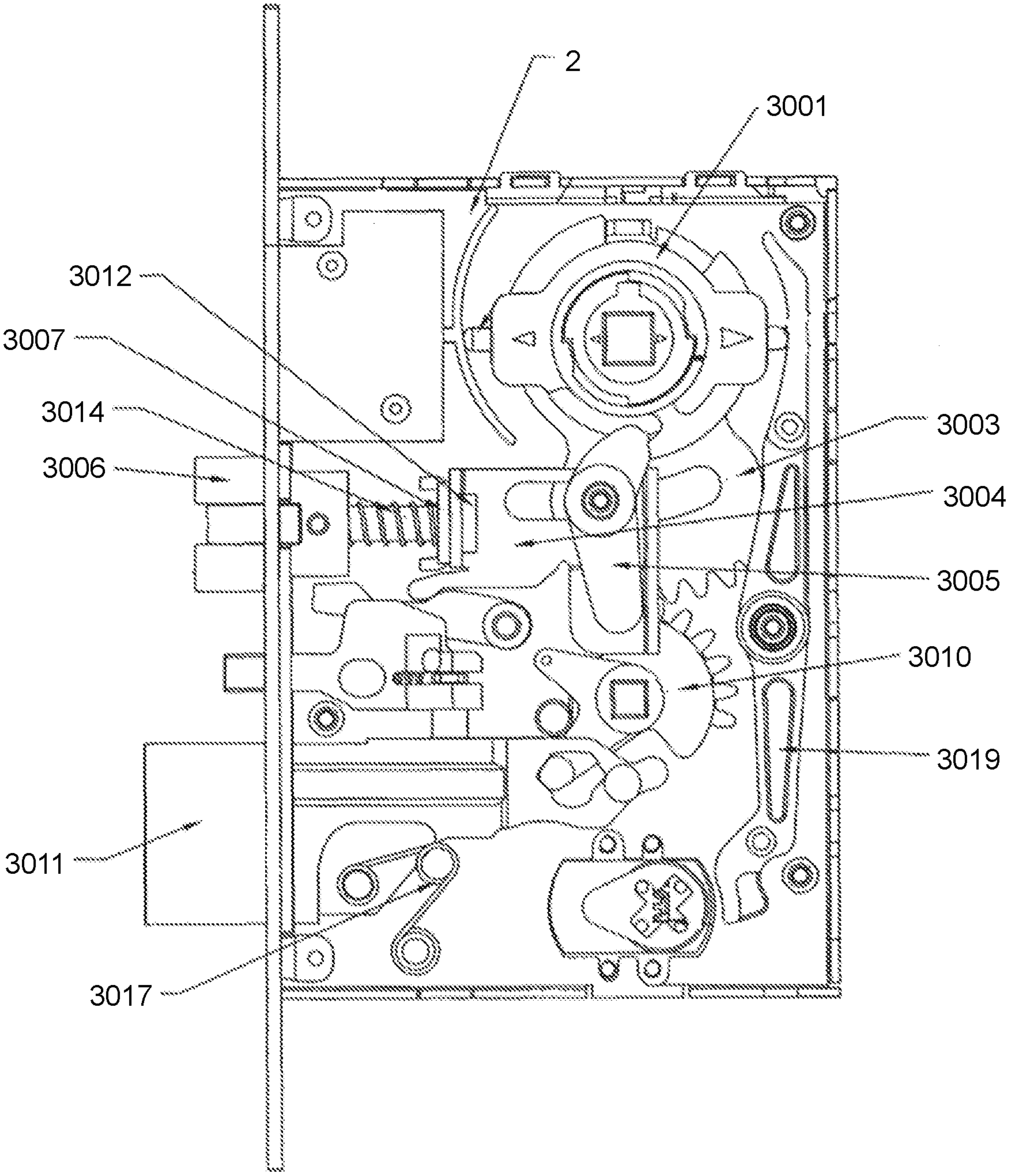
FIG. 40 is a schematic diagram illustrating a structure of an exemplary transmission mechanism according to some embodiments of the present disclosure.

In a specific embodiment, as shown in FIG. 40, the smart door lock may be in a locked state. The lock may include a large fork 3001, and the large fork 3001 may drive a bolt assembly to unlock or lock the lock. The bolt assembly may include a latch bolt 3006, a latch bolt fork 3005, a latch bolt pulling rod 3012, a latch bolt pulling plate 3004, a latch bolt spring 3014, a latch bolt guiding piece 3007. Two ends of the latch bolt pulling rod 3012 may be fixedly connected to the latch bolt pulling plate 3004 and the latch bolt 3006, respectively. The latch bolt guiding piece 3007 may be fixedly installed on the lock housing 2 and include a guiding hole. The latch bolt pulling rod 3012 may be sleeved by the guiding hole, and the latch bolt spring 3014 may be sleeved on the latch bolt pulling rod 3012. One end of the latch bolt spring 3014 may be in contact with the latch bolt guiding piece 3007, and the other end may be in contact with the latch bolt 3006. A middle part of the latch bolt fork 3005 may be rotatably connected to the lock housing 2. One end of the latch bolt fork 3005 may be a pushed end that is in contact with and pushed by the large fork 3001, and the other end may be a pushing end that pushes the latch bolt pulling plate 3004.

Specifically, the large fork 3001 may be connected (e.g., via a fixed connection, a transmission connection, a snap connection, etc.) to the handle steering member 3032. When the steering limiting plate 3033 is at the second position, a rotation of the door inside handle 3031 may cause the handle steering member 3032 to drive the large fork 3001 to rotate. The large fork 3001 may push one end of the latch bolt fork 3005 to rotate the latch bolt fork 3005, and the other end of the latch bolt fork 3005 may push the latch bolt pulling plate 3004, thereby driving the latch bolt pulling rod 3012 and the latch bolt 3006 and compressing the latch bolt spring 3014. The latch bolt 3006 may be retracted into the lock housing 2 to unlock the lock. After the door is opened, the door inside handle 3031 may be released and automatically return. After the door inside handle 3031 returns to its position, the latch bolt 3006 may extend out from the lock housing 2 under the action of the latch bolt spring 3014, and the smart door lock may be locked.

Figure 9:
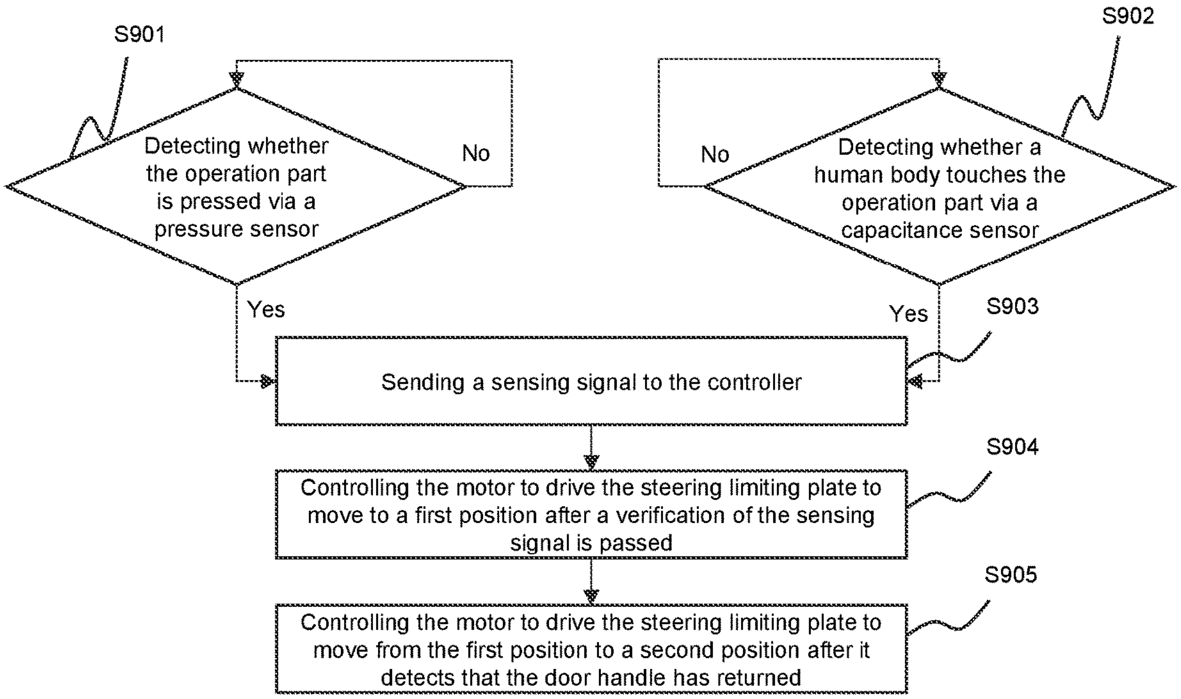
FIG. 9 is a flowchart illustrating an exemplary process for a controller of a smart door lock to unlock the smart door lock according to some embodiments of the present disclosure.

FIG. 9 is a flowchart illustrating an exemplary process for a controller 502 of a smart door lock as described in connection with FIG. 5 to unlock the smart door lock according to some embodiments of the present disclosure. Assuming that the smart door lock cannot be opened from inside the door before the following operations are executed, that is, the operation part and the action part are in a transmission connection blocked state, the unlocking process may include the following operations.

In S901, whether the operation part is pressed may be detected by a pressure sensor. If it is detected that the operation part is pressed, S903 may be executed, otherwise, S901 may be executed. Specifically, operation S901 may be implemented by the sensing unit 501.

In some embodiments, the sensing unit 501 may determine whether the pressure sensor is pressed by setting a threshold. For example, the sensing unit 501 may set a first voltage threshold. When an external voltage value collected by the processing chip inside the pressure sensor is higher or lower than the first voltage threshold, the sensing unit 501 may determine that the pressure sensor is pressed. In some embodiments, the pressure sensor may include, but is not limited to, a piezoresistive pressure sensor, a ceramic pressure sensor, a diffused silicon pressure sensor, a sapphire pressure sensor, a piezoelectric pressure sensor, or the like, or any combination thereof. In some embodiments, the pressure sensor may be replaced by a touch switch.

In S902, whether a human body touches the operation part may be detected by a capacitance sensor. If it is detected that a human body touches the operation part, S903 may be executed, otherwise, S902 may be executed. Specifically, step S902 may be implemented by the sensing unit 501.

In some embodiments, the sensing unit 501 may determine whether a human body is approaching the touch panel of the capacitance sensor by measuring a charging and discharging time of the capacitance sensor. In some embodiments, the sensing unit 501 may set a second time threshold. When it is detected that the charging and discharging time of the capacitance sensor is different from the second time threshold, the sensing unit 501 may determine that there is a human body approaching the touch panel of the capacitance sensor.

S901 and S902 may be executed separately. In some embodiments, when a detection result of S901 is that the pressure sensor is pressed, and a detection result of S902 is that a human body touches the door lock, S903 may be executed. In such cases, the detection results of the pressure sensor and the capacitance sensor are both positive, that is, the door handle of the smart door lock is touched and pressed, S903 may be executed. In some embodiments, when the detection result of S901 is that the pressure sensor is not pressed, and the detection result of S902 is that a human body touches the door lock, S903 may also be executed. In some embodiments, when the detection result of S902 is that no human body touches the door lock, and the detection result of S901 is that the pressure sensor is pressed, S903 may also be executed. In such cases, when the door handle of the smart door lock is touched or pressed, S903 may be executed.

In S903, a sensing signal may be sent to the controller.

Specifically, an intensity of the sensing signal sent by the pressure sensor may be positively correlated with a sensed pressure value, and an intensity of the sensing signal sent by the capacitance sensor may be related to a distance from the finger to the sensor and an area of the sensing panel of the sensor. In some embodiments, the sensing signal may be sent to the controller via a wireless or wired network. For example, the sensing signal may be sent to the controller via a cable network, a wired network, a fiber-optic network, a telecommunication network, an intranet, the Internet, a local region network (LAN), a wide region network (WAN), a wireless local region network (WLAN), a metropolitan region network (MAN), a public telephone switched network (PSTN), a Bluetooth™ network, a ZigBee™ network, a near field communication (NFC) network, or the like, or any combination thereof.

In S904, after a verification of the sensing signal is passed, the controller may control the motor to drive the steering limiting plate to move to the first position.

Specifically, the verification of the sensing signal is passed refers to that the intensity of the sensing signal sent by the pressure sensor and/or the intensity of the sensing signal sent by the capacitance sensor is greater than a corresponding threshold. For example, a first threshold may be set. When the intensity of the sensing signal sent by the pressure sensor is greater than the first threshold, the controller may control the transmission mechanism 503 to be in the openable state. As another example, a second threshold may be set. When the intensity of the sensing signal sent by the capacitance sensor is greater than the second threshold, the controller may control the transmission mechanism 503 to be in the openable state. Optionally, the first threshold and the second threshold may be set at the same time, and the controller 502 may control the transmission mechanism 503 to be in the openable state when the two sets of sensing signals are respectively greater than the first threshold and the second threshold.

The first position may be a position where the steering limiting plate is 3033 located when it leaves the slot of the handle steering member 3032, that is, when the operation part has a transmission connection to the action part. Specifically, the first position may be a position where the steering limiting plate 3033 (corresponding to the steering limiting plate 8 in FIG. 14) is located when it leaves the slot (corresponding to the limiting slot 311 in FIG. 14) of the handle steering member 3032. The second position, as shown in FIG. 8, may be a position where the steering limit plate 3033 is locked into the slot (corresponding to the limiting slot 311 in FIG. 14) of the handle steering member 3032. In such cases, the occupied space of the steering limiting plate 3033 may partially overlap with the moving trajectory of the blocker. The steering limiting plate 3033 may block the movement of the blocker, therefore, the handle steering member 3032 cannot be rotated and the transmission connection between the operation part and the action part may be blocked.

In S905, the controller may control the motor to drive the steering limiting plate to move from the first position to the second position after the steering limiting plate has been at the first position for a period longer than a preset period.

In some embodiments, the preset period may be determined based on an unlocking time of the smart door lock (i.e., a time for the bolt to move from a retracted position to a completely extended position). In some embodiments, a general unlocking time of the smart door lock may be determined by collecting and analyzing multiple sets of unlocking data of the smart door lock and set as the preset period. For example, multiple time durations from a time when the door handle was pressed to a time when the door lock was unlocked and the door handle was returned may be collected, and an average unlocking time may be determined. The average unlocking time may be determined as the preset time (e.g., 30 seconds, 1 minute, 2 minutes, 5 minutes, etc.). When a period from a time point when the steering limiting plate 3033 moves to the first position to the current time point is greater than the preset period, the controller 502 may control the motor 3034 to drive the steering limiting plate 3033 to move from the first position to the second position.

As aforementioned, if the door inside handle is pressed down, the steering limiting plate may only be driven by the motor to move to the second position (but may not be able to move to the second position). If the door inside handle is not pressed down, the steering limiting plate may be driven to move to the second position. When the steering limiting plate is moved to the second position, the door inside handle cannot be pressed down.

In summary, the function of the smart door lock may be implemented in the following application scenario.

When the door is locked, the transmission connection between the operation part and the action part is blocked. If the user does not contact the door handle, the steering limiting plate is at the second position, and the door lock cannot be unlocked. Since the lock is controlled by a sensing signal of the sensor, using special tools cannot unlock the lock through a peephole.

If the user wants to unlock the lock, the user needs to hold the door inside handle. At this time, the metal pressure sensor may sense a pressing pressure, and the capacitance sensor may sense a human body contact, and a sensing signal may be sent to the controller. The controller may control the motor to drive the steering limiting plate to move to the first position where the operation part has a transmission connection to the action part. In such cases, when the user presses down the door inside handle, the door inside handle may drive the handle steering member to rotate, and the lock may be unlocked. When the user's hand leaves the door inside handle, the controller of the door inside handle may no longer receive the sensing signal. After a preset period, the controller may control the motor to drive the steering limiting plate to move to the second position and the door lock cannot be unlocked.

It can be seen that using the metal pressure sensor and the capacitance sensor in the handle of the smart door lock to implement mechanical transmission mechanism actions can improve the security level of anti-peephole unlocking technology. Moreover, the door lock may change from the unopenable state to the openable state if the user holds, which may be more consistent with the user's habit of opening the door and have better convenience.

Figure 10:
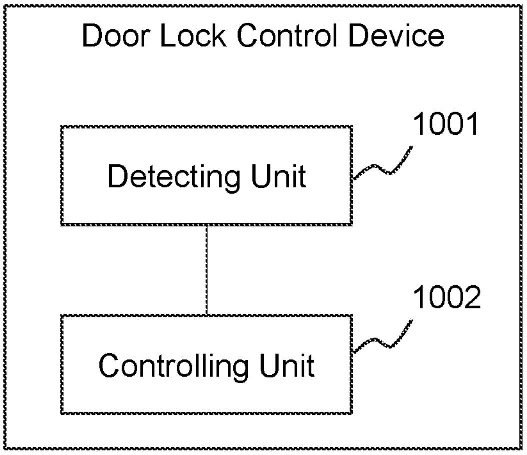
FIG. 10 is a schematic diagram illustrating a structure of an exemplary door lock control device according to some embodiments of the present disclosure.

FIG. 10 is a schematic diagram illustrating a structure of an exemplary door lock control device according to some embodiments of the present disclosure. The door lock control device may include a detecting unit 1001 and a controlling unit 1002.

The detecting unit 1001 may be configured to detect a sensing signal. The sensing signal may include a pressure sensing signal and/or a capacitance sensing signal. The controlling unit 1002 may be configured to control the transmission mechanism of the door lock to be in an openable state when the sensing signal is detected. In the openable state, the operation part may have a transmission connection to the action part, and the door lock can be unlocked from inside the door. In addition, the controlling unit 1002 may be further configured to control the transmission mechanism of the door lock to be in an unopenable state when the transmission mechanism has been in the openable state longer than a preset period. In the unopenable state, the transmission connection between the operation part and the action part may be blocked, and the door lock cannot be unlocked from inside the door.

The door lock control device may be located in a controller shown in FIG. 5.

The controller shown in FIG. 5 may include a processor and a memory. The detecting unit and the controlling unit may both be stored in the memory as a program unit. The processor may execute the program unit stored in the memory to realize the corresponding functions.

The processor may include one or more kernels configured to retrieve the corresponding program unit from the memory. The control of the smart door lock may be realized by adjusting the kernel parameters to cooperate with the sensing unit and the transmission mechanism described in FIG. 5.

The memory may include a non-permanent memory in computer readable media, a random access memory (RAM) and/or a non-volatile memory, such as a read-only memory (ROM) or a flash memory (flash RAM). The memory may include at least one memory chip.

An embodiment of the present disclosure provides a storage medium on which a program is stored. When the program is executed by a processor, the method for controlling a door lock described above is performed.

An embodiment of the present disclosure provides a processor. The processor may be configured to execute a program. When the program is executed, the method for controlling a door lock described above is performed.

An embodiment of the present disclosure provides a device. The device may include a processor, a memory, and a program stored on the memory and executed by the processor. When the program is executed, a method including the following operations may be implemented. The method may include detecting a sensing signal. When the sensing signal is detected, the method may include controlling the transmission mechanism of the door lock to be in an openable state. In the openable state, the door lock can be unlocked from inside the door. The method may further include controlling the transmission mechanism of the door lock to be in an unopenable state when the transmission mechanism has been in the openable state longer than a preset period. In the unopenable state, the door lock cannot be unlocked from inside the door. The device in the present disclosure may be a chip or the like located in the inner panel of the door.

The present disclosure also provides a computer program product. When executed on a data processing device, the computer program product may be suitable for executing a program of a method including the following operations. The method may include detecting a sensing signal. When the sensing signal is detected, the method may include controlling the transmission mechanism of the door lock to be in an openable state. In the openable state, the door lock can be unlocked from inside the door. The method may further include controlling the transmission mechanism of the door lock to be in an unopenable state when the transmission mechanism has been in the openable state longer than a preset period. In the unopenable state, the door lock cannot be unlocked from inside the door.

An embodiment of the present disclosure provides a lock. The lock may include a handle linkage member, a clutch mechanism, a limiting member, and a mechanical clutch mechanism. The clutch mechanism may include a driving member and a linear motion output assembly. The driving member may act on the linear motion output assembly to drive the limiting member to move. The mechanical clutch mechanism may include a clutch mechanical member and a sliding switch. The clutch mechanical member may have a connection to the sliding switch and act on the linear motion output assembly through the sliding switch to drive the limiting member to move. In an initial state, the limiting member of the lock (e.g., the steering limiting plate 8 in FIG. 13) may cooperate with the handle linkage member (e.g., the handle linkage member 3 in FIG. 13), and the transmission connection between the operation part and the action part may be blocked. When detecting that the operation part is in contact with a human body (e.g., a user presses the handle of the lock), the sensing unit may send a sensing signal to the controller. The controller may control the driving member (e.g., the motor 73 in FIG. 16) of the clutch mechanism to act on the linear motion output assembly (e.g., the linear motion output assembly 75 in FIG. 16) to drive the limiting member (e.g., the steering limiting plate 8 in FIG. 14) to separate from the handle linkage member (e.g., the handle linkage member 3 in FIG. 14). The operation part may have a transmission connection to the action part and can unlock the lock. After door is opened, the operation on the operation part may be cancelled. After the handle is returned, the controller may control the driving member (e.g., the motor 73 in FIG. 16) of the clutch mechanism to act on the linear motion output assembly (e.g., the linear motion output assembly 75 in FIG. 16) to drive the limiting member (e.g., the steering limiting plate 8 in FIG. 14) to cooperate with the handle linkage member (e.g., the handle linkage member 3 in FIG. 14). The transmission connection between the operation part and the action part may be blocked again.

Alternatively, when the clutch mechanism of the lock fails (e.g., a connection between the controller and the clutch mechanism is disconnected), a mechanical clutch mechanism can be used to control the operation part and the action part to be in a transmission connection state or a transmission connection blocked state. Specifically, in the initial state, the limiting member of the lock may cooperate with the handle linkage member (as shown in FIG. 13), and the transmission connection between the operation part and the action part may be blocked. In this state, both the clutch mechanical member and the sliding switch of the mechanical clutch mechanism may cooperate with the limiting member and the handle linkage member. When the lock needs to be unlocked, the sliding switch may be operated to drive the clutch mechanical member to move in a direction consistent with a direction along which the limiting member separates from the handle linkage member, and the clutch mechanical member may drive a clutch actuator of the linear motion output assembly to move in the same direction. The operation part and the action part may be switched to be in the transmission connection state. After the door lock is opened, the mechanical clutch mechanism and the linear motion output assembly may return to the initial state under the action of their respective reset elastic members, and the transmission connection between the operation part and the action part may be blocked again. Exemplary embodiments may be described in detail with reference to FIGS. 11-25.

Specifically, as shown in FIGS. 11-25, reference numerals are described as the following.

Where, 1 denotes a handle, 11 denotes a rotating handle, 111 denotes a handle body, 112 denotes a handle cover, 12 denotes a push-pull handle, 2 denotes an indoor casing, 3 denotes a handle linkage member, 31 denotes a handle steering member, 311 denotes a limiting slot, 32 denotes a sliding plate, 321 denotes a limiting gap, 4 denotes a mechanical clutch mechanism, 41 denotes a sliding switch, 42 denotes a clutch mechanical member, 43 denotes a return spring, 5 denotes a lock body, 6 denotes a pressure sensor, 7 denotes a clutch mechanism, 71 denotes a housing, 72 denotes a clutch end, 73 denotes a motor, 74 denotes a transmission assembly, 75 denotes a linear motion output assembly, 751 denotes a clutch rotating shaft, 7511 denotes a push rod, 752 denotes a clutch actuator, 753 denotes a coil spring, and 8 denotes a steering limiting plate.

In FIGS. 11-25, the handle 1 represents the same structure as that of the part 3031 in FIG. 8 and the part 2100 in FIGS. 26-39, which all belong to the operation part. The handle steering member 31 represents the same structure as the part 3032 (handle steering member) in FIG. 8, which both belong to the handle linkage member. The limiting slot 311 represents the same structure as the slot in FIG. 8 (not numbered in the figure). The clutch mechanism 7 represents the same structure as the part 3034 in FIG. 8, which both belong to the driving member. The steering limiting plate 8 represents the same structure as the part 3033 (steering limiting plate) in FIG. 8, which both belong to the limiting member.

As shown in FIGS. 11-25, an embodiment of the present disclosure provides a handle device for safely unlocking a lock from inside the door, hereinafter referred to as a handle device. The handle device may include a handle 1, a handle linkage member 3, and a clutch mechanism 7. The handle 1 may include a pressure sensor 6 (i.e., a sensing unit) for detecting a pressing force. The pressure sensor may include a capacitance pressure sensor. The handle linkage member 3 may have a linkage connection to the handle 1 and move with the movement of the handle 1. A clutch end 72 of the clutch mechanism 7 may be configured to cooperate with the handle linkage member 3. A drive controller of the clutch mechanism 7 may be connected to the pressure sensor 6. When the pressure sensor 6 detects the pressing force on the handle 1, the drive controller may receive a pressure signal (i.e., a sensing signal) sent by the pressure sensor 6 and control the action of the clutch mechanism 7, so that the cooperation between clutch end 72 and the handle linkage member 3 is broken. The handle 1 may be allowed to perform the unlocking movement. At this time, the operation part may have a transmission connection to the action part. When the handle 1 is reset to the locked position, that is, when the operation part is at the initial position, the drive controller may control the clutch end 72 to reset to a position for cooperating with the handle linkage member 3. At this time, the transmission connection between the operation part and the action part may be blocked. In some embodiments, the limiting member (i.e., the steering limiting plate 8) and the clutch mechanism (i.e., the clutch mechanism 7) may be two independent and interactable components.

In some embodiments, the pressure sensor may include, but is not limited to, a piezoresistive pressure sensor, a ceramic pressure sensor, a diffused silicon pressure sensor, a sapphire pressure sensor, a piezoelectric pressure sensor, or the like, or any combination thereof.

The working principle and working process of the handle device are described below.

Before the lock is unlocked, an initial position of the handle 1 may be the locked position. At this time, the clutch end 72 of the clutch mechanism 7 may cooperate with the handle linkage member 3 to restrict the movement of the handle linkage member 3, thereby restricting the handle 1 from performing the unlocking movement. When unlocking the lock, a user inside the door may hold the handle 1 with a hand. The pressure sensor 6 in the handle 1 may detect the pressing pressure of the hand. The pressure sensor 6 may send a pressure signal to the drive controller of the clutch mechanism 7. After the pressure signal is received, the drive controller may control the clutch mechanism 7 to move to break the cooperation between clutch end 72 and the handle linkage member 3. At this time, the handle linkage member 3 can move, thereby allowing the handle 1 to perform an unlocking movement. The user inside the door may manually rotate the handle 1 to the unlocking position, and the door lock is unlocked.

When the user inside the door releases the handle, the handle 1 may be reset to the locked position under an action of its own reset structure (e.g., a compression spring). After the clutch end 72 has been at the position separated from the handle linkage member 3 for a preset period, the drive controller of the clutch mechanism 7 may control the clutch end 72 to reset to the position where the clutch end 72 cooperates with the handle linkage member 3, thereby restricting the handle 1 from performing the unlocking movement. In some embodiments, a specific value of the preset period may be determined based on an unlocking time of the smart door lock (i.e., a time for the bolt to move from a retracted position to a completely extended position). In some embodiments, a general unlocking time of the smart door lock may be determined by collecting and analyzing multiple sets of unlocking data of the smart door lock and set as the preset period.

In some embodiments, when the sensing unit detects that the operation part is at the initial position, the controller may control the operation part to be connected to the action part via a transmission connection based on a detection signal output by the sensing unit. For example, a detection module may be used to detect a position and a state of the handle and send a detecting result to the controller to control the clutch end 72 to reset to the position where the clutch end 72 cooperates with the handle linkage member 3, thereby restricting the handle 1 from performing the unlocking movement. As another example, when the pressure sensor 6 does not detect a pressing signal (i.e., no one is about to unlock or lock the lock), the detecting result may be sent to the controller, so that the controller may control the clutch end 72 to reset to the position where the clutch end 72 cooperates with the handle linkage member 3 according to the detecting result. As another example, an angle detection device may be used to detect a position of the handle (e.g., a pressed position, an initial position, etc.) and send the detecting result to the controller. When the detecting result is that the handle is at the initial position, the controller may control the clutch end 72 to reset to the position where the clutch end 72 cooperates with the handle linkage member 3.

It can be seen that the handle device can only perform the unlocking movement when the hand of the user inside the door is on the handle 1 and the pressure sensor 6 detects the pressing pressure of the hand. When the hand releases the handle 1 and the handle 1 is reset to the locked state, the unlocking movement of the handle 1 may be restricted again, and the door lock cannot be unlocked, thereby avoiding the situation that criminals unlock the lock by operating the handle 1 using a tool through a peephole. Compared with the existing anti-peephole unlocking technology, for the handle device of the present disclosure, the anti-peephole unlocking function can be released just by holding the handle 1 with a hand, and the unlocking movement can be performed. After the handle is released, the anti-peephole unlocking function may be automatically activated, and the handle 1 is automatically restricted to perform the unlocking movement. It is not necessary to unlock the anti-peephole unlocking button every time, and it is not necessary to manually lock the anti-peephole unlocking button after unlocking the lock every time. It is not necessary to verify whether the anti-peephole unlocking button is locked every time, and the situation of artificially forgetting to open the anti-peephole unlocking structure will not happen, thereby avoiding the situation that the anti-peephole unlocking structure is not activated caused by human factors, which may improve safety. Meanwhile, the unlocking is convenient and quick.

An embodiment of the present disclosure provides a clutch mechanism 7. The clutch mechanism 7 may include a housing 71, a motor 73, and a linear motion output assembly 75. The housing 71 may be preferably formed by an inner casing and an outer casing. The inner casing may be located inside the indoor casing 2, and the outer casing may be adjacent to the outside of the indoor casing 2. The motor 73 may be located in the housing 71. The drive controller may be a motor controller, that is, the drive controller may be integrated with the motor 73. The drive controller may also be set separately from the motor 73. The motor controller may receive a pressure signal of the pressure sensor 6 and control the operation of the motor 73. The linear motion output assembly 75 may be located in the housing 71. The linear motion output assembly 75 may include a rotating end (i.e., a clutch rotating shaft) and a linear motion end (i.e., a clutch actuator). An output shaft of the motor 73 may have a transmission connection with the rotating end of the linear motion output assembly 75. The linear motion output assembly 75 may convert the rotation of the rotating end into a linear motion output of the linear motion end of the linear motion output assembly 75. The clutch end 72 may also serve as the linear motion end.

The working principle of the clutch mechanism 7 is described below. When the pressure sensor 6 detects the pressing force of a hand acting on the handle, it may send a pressure signal to the motor controller. After the pressure signal is received, the motor controller may control the motor 73 to rotate. The output shaft of the motor 73 may drive the rotating end of the linear motion output assembly 75 to rotate. The linear motion output assembly 75 may convert the rotation of the rotating end into the linear motion output of the linear motion end of the linear motion output assembly 75. The clutch end 72 may also serve as the linear motion end, which may move away from an initial position where the clutch end 72 cooperates with the handle linkage member 3 to a position where the clutch end 72 does not cooperate with the handle linkage member 3. At this time, the handle 1 may perform the unlocking movement. When the handle 1 is reset to the locked position, the motor controller may control the motor 73 to rotate in a reverse direction, thereby driving the linear motion end to reset to the position where the linear motion end cooperates with the handle linkage member 3, and the handle 1 cannot perform the unlocking movement.

As shown in FIGS. 15-18, an embodiment of the present disclosure provides a linear motion output assembly 75. The linear motion output assembly 75 may include a clutch rotating shaft 751, a coil spring 753, and a clutch actuator 752. The clutch rotating shaft 751 may have a transmission connection to the output shaft of the motor 73. A push rod 7511 may be located on an outer circumference of the clutch rotating shaft 751. The clutch rotating shaft 751 may be the rotating end. The coil spring 753 may be sleeved on the clutch rotating shaft 751, and the push rod 7511 may be inserted into a spiral gap of the coil spring 753. The clutch rotating shaft 751 may pass through the clutch actuator 752 and rotate relatively to the clutch actuator 752. The clutch actuator 752 may include a guiding structure 7521 for circumferential limiting and linear guiding (that is, the guiding structure 7521 cannot rotate along an axial direction of the clutch actuator 752). The clutch actuator 752 may cooperate with the housing 71 in a straight line through the guiding structure 7521, so that the clutch actuator 752 can only move in a straight line and cannot rotate. The clutch actuator 752 may be the linear motion end, and one end of the clutch actuator 752 may be the clutch end 72. Two ends of the coil spring 753 may be respectively fixed on the clutch actuator 752. The coil spring 753 and the clutch actuator 752 may be relatively stationary in the circumferential direction.

The working principle and working process of the linear motion output assembly 75 are described below.

The motor 73 may drive the clutch rotating shaft 751 to rotate. Since the clutch rotating shaft 751 cannot move in the axial direction, the push rod 7511 may be inserted into the spiral gap of the coil spring 753. The push rod 7511 may rotate with the clutch rotating shaft 751 and move in a guiding direction in the spiral gap. The coil spring 753 and the clutch actuator 752 may be fixed and limited in the circumferential direction. Therefore, the push rod 7511 may cooperate with the coil spring 753, and the rotation of the push rod 7511 may drive the coil spring 753 and the clutch actuator 752 to move along a straight line. When the pressure sensor 6 detects a pressing force of a hand, the motor 73 may finally drive the clutch actuator 752 to move in a direction along which the clutch end 72 of the clutch actuator 752 is separated from the handle linkage member 3, that is, the operation part and the action part are in a transmission connection state. When the handle 1 is released and reset to the locked position, the motor 73 may rotate in the reverse direction and finally drive the clutch actuator 752 to reset to the position where the clutch actuator 752 cooperates with the handle linkage member 3, and the operation part and the action part are in a transmission connection blocked state.

Obviously, the linear motion output assembly 75 can also include other structural forms. In some embodiments, the linear motion output assembly 75 may include a lead-screw matching structure. Specifically, the linear motion output assembly 75 may include a lead screw and a screw sleeve, and the lead screw and the screw sleeve may be matched and sleeved. The lead screw may be the rotating end, and the screw sleeve may be the linear motion end. The lead screw may be connected to the motor 73. The screw sleeve may be circumferentially limited and can only move in a straight line. Therefore, the motor 73 may drive the lead screw to rotate. Since the lead screw and the screw sleeve are connected to each other through a threaded track, and the screw sleeve is circumferentially limited, the lead screw may drive the screw sleeve to move in a straight line, so that the clutch end of the screw sleeve may cooperate with the handle linkage member 3.

As shown in FIGS. 16-19, the clutch mechanism 7 may further include a transmission assembly 74. The output shaft of the motor 73 may have a transmission connection to the rotating end of the linear motion output assembly 75 through the transmission assembly 74. The transmission connection with a certain transmission ratio between the output shaft of the motor 73 and the rotating end of the linear motion output assembly 75 may be realized by the transmission assembly 74. Alternatively, the transmission assembly 74 may be omitted, and the output shaft of the motor 73 may be directly connected to the rotating end.

In some embodiments, the transmission assembly 74 may include a gear set, a synchronous belt transmission assembly, or a chain transmission assembly. Preferably, a gear set may be used for a transmission connection, which may have a compact structure and high transmission accuracy. The gear set may include at least two gears, and the count of the at least two gears is not limited. The gear set may achieve multi-stage deceleration, such as one-stage deceleration, two-stage deceleration, or three-stage deceleration, depending on the actual situation.

As shown in FIG. 16, FIG. 18, and FIGS. 20-22, the handle device may further include a mechanical clutch mechanism 4 for completing the manual unlocking of the anti-peephole unlocking function (that is, switching the operation part and the action part between a transmission connection state and a transmission connection blocked state) when the motor 73 of the clutch mechanism 7 fails. Specifically, the mechanical clutch mechanism 4 may include a clutch mechanical member 42 and a sliding switch 41. When a moving direction of the clutch mechanical member 42 is parallel with that of the clutch actuator 752, and the clutch mechanical member 42 drives the clutch actuator 752 to move in a direction to be separated from the handle linkage member 3, the clutch actuator 752 may move in a direction away from the handle linkage member 3. The sliding switch 41 may be movably located on the housing 71 along a straight line parallel to the moving direction of the clutch actuator 42. The sliding switch 41 may be connected to the clutch mechanical member 42, and the sliding switch 41 and the clutch mechanical member 42 may move synchronously.

Figure 19:
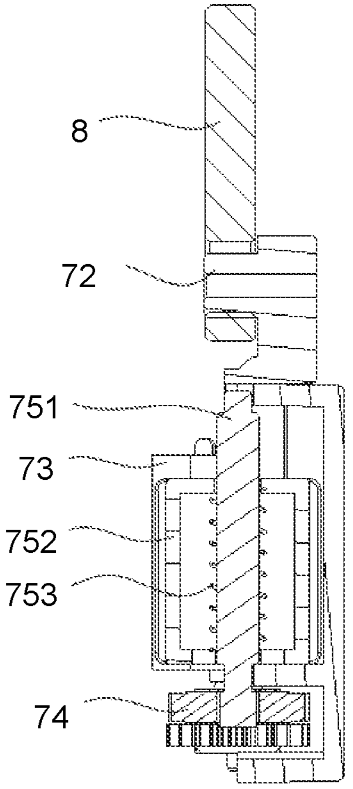
FIG. 19 is a schematic diagram illustrating a sectional view of a C-C section as described in connection with FIG. 18 according to some embodiments of the present disclosure.
Figure 20:
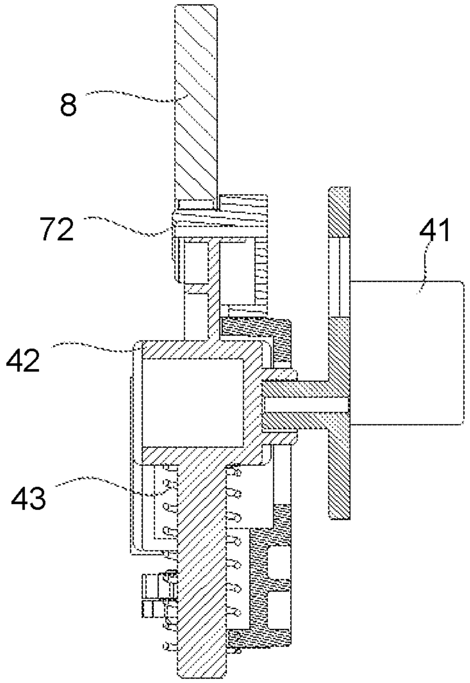
FIG. 20 is a schematic diagram illustrating a structure of a D-D section of an exemplary clutch mechanism as described in connection with FIG. 18 that is separated from a limiting matching state according to some embodiments of the present disclosure.
Figure 21:
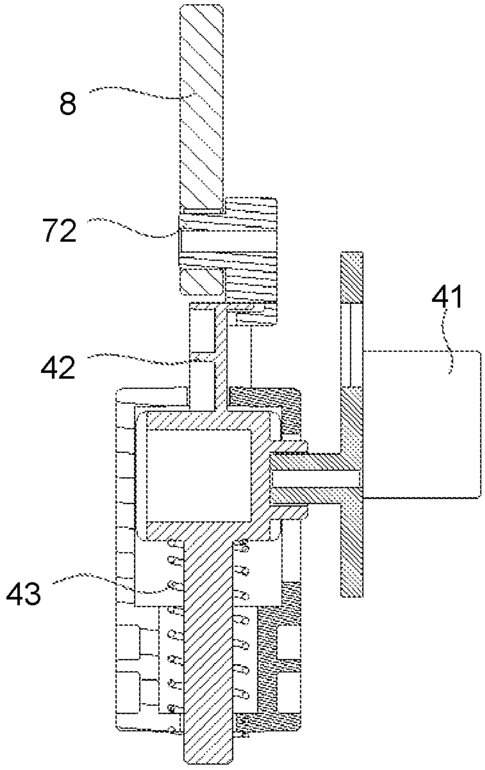
FIG. 21 is a schematic diagram illustrating a structure of a D-D section of an exemplary clutch mechanism as described in connection with FIG. 18 that is in a limiting matching state according to some embodiments of the present disclosure.
Figure 22:
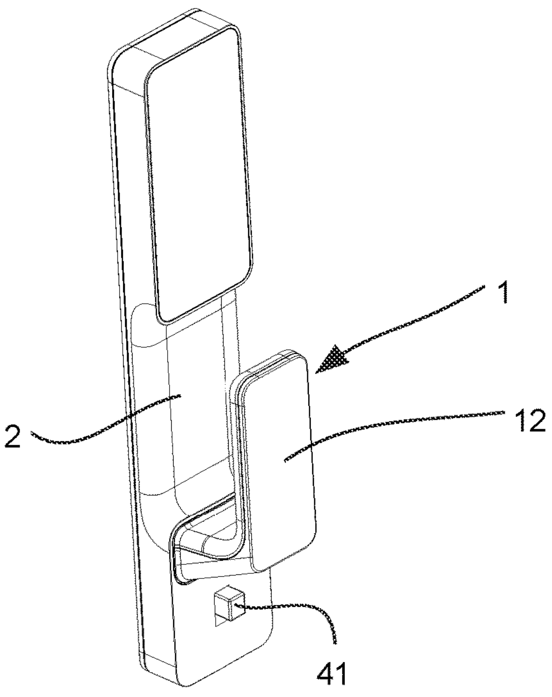
FIG. 22 is a schematic diagram illustrating another exemplary anti-peephole unlocking handle device according to some embodiments of the present disclosure.
Figure 23:
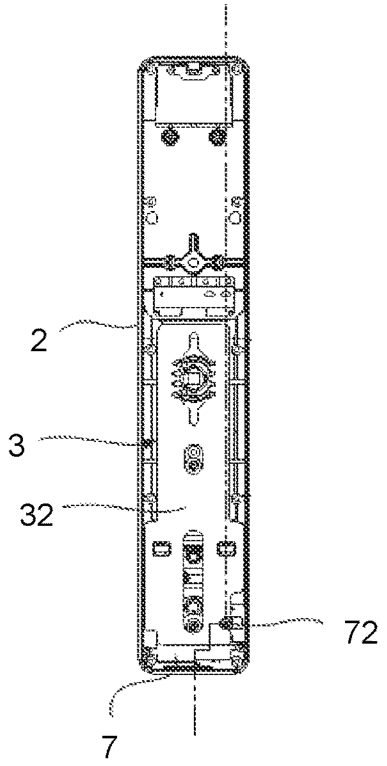
FIG. 23 is a schematic diagram illustrating a rear view of an exemplary handle device as described in connection with FIG. 22 according to some embodiments of the present disclosure.
Figure 24:
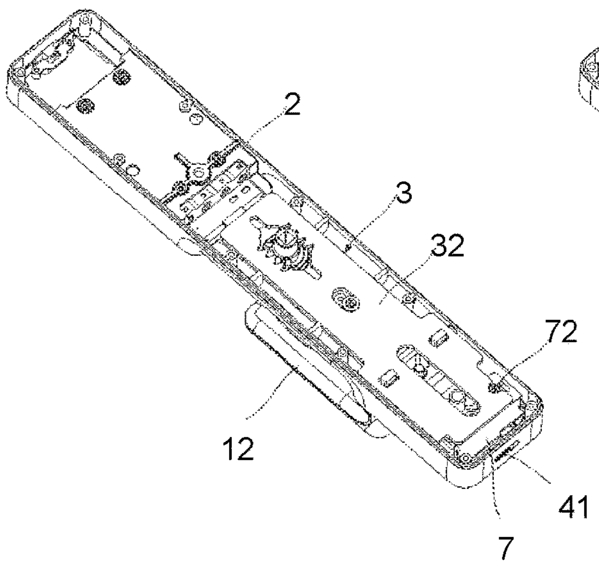
FIG. 24 is a schematic diagram illustrating a structure of an exemplary clutch mechanism of a handle device as described in connection with FIG. 22 that is in a limiting matching state according to some embodiments of the present disclosure.
Figure 25:
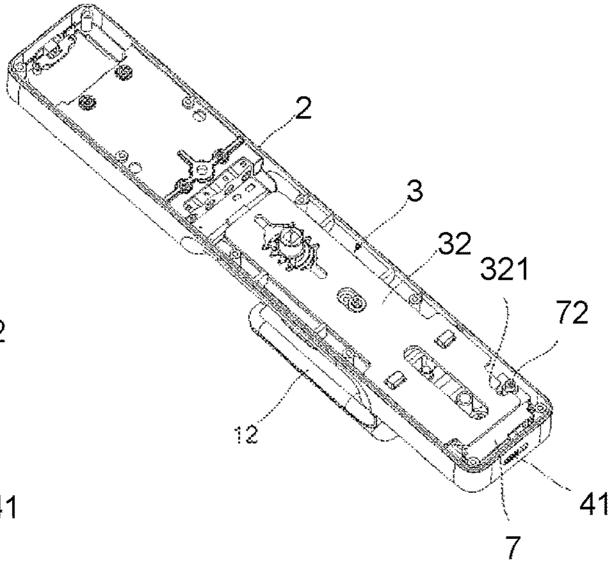
FIG. 25 is a schematic diagram illustrating a structure of an exemplary clutch mechanism of a handle device as described in connection with FIG. 22 that is separated from a limiting matching state according to some embodiments of the present disclosure.
Figure 26:
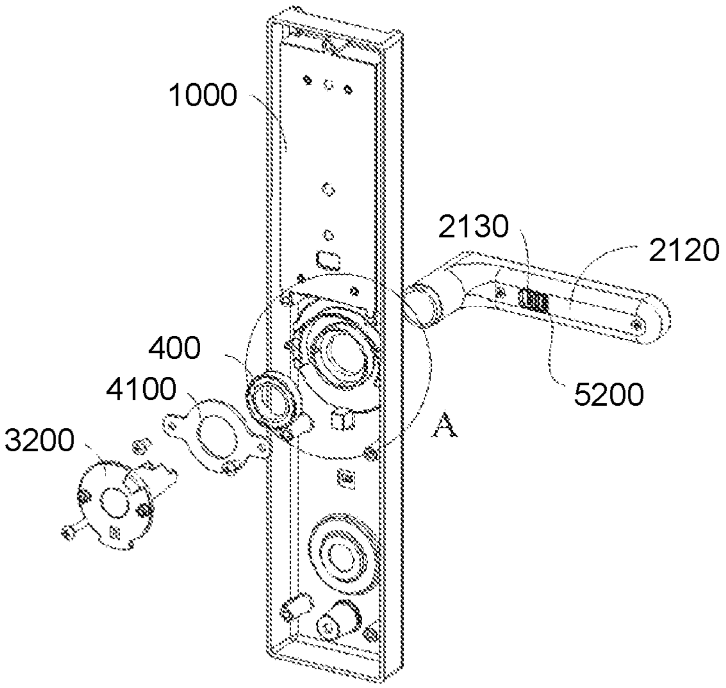
FIG. 26 is a schematic diagram illustrating an exploded view of an exemplary smart door lock according to some embodiments of the present disclosure.

The working principle and working process of the mechanical clutch mechanism 4 are described below. When the motor 73 of the clutch mechanism 7 cannot rotate, the clutch end 72 of the clutch mechanism 7 may cooperate with the handle linkage member 3, and the handle 1 cannot perform the unlocking movement as shown in FIG. 21. At the same time, the clutch mechanical member 42 and the sliding switch 41 of the mechanical clutch mechanism 4 may be at an anti-peephole unlocking position where the clutch end 72 cooperates with the handle linkage member 3. When the sliding switch 41 is moved to the anti-peephole unlocking position, the sliding switch 41 may drive the clutch mechanical member 42 to move. The clutch mechanical member 42 may drive the clutch actuator 752 to move in a direction to be separated from the handle linkage member 3 as shown in FIG. 19. The clutch actuator 752 may be separated from the handle linkage member 3, and the handle 1 can perform the unlocking movement. During this process, since the clutch rotating shaft 751 is restricted by the motor 73 and cannot rotate, when the clutch actuator 752 moves in a straight line away from the handle linkage member 3, one side of the coil spring 753 close to the handle linkage member 3 may be compressed by the push rod 7511, and the other side away from the handle linkage member 3 may be pulled up for accumulating elastic force.

In addition, in some embodiments, when the clutch mechanical member 42 moves to the side close to the handle linkage member 3, that is, when the clutch mechanical member 42 moves to cooperate with the handle linkage member 3, the clutch mechanical member 42 may be out of contact with the clutch actuator 752. That is, the clutch mechanism member 42 and the clutch actuator 752 are connected to each other not through a fixed connection, but through a contact connection. Alternatively, when the clutch mechanical member 42 cooperates with the handle linkage member 3, a small gap may exist between the clutch mechanical member 42 and the clutch actuator 752. Only when the clutch mechanical member 42 moves in a direction to be separated from the handle linkage member 3, the clutch mechanical member 42 may have a contact connection to the clutch actuator 752. The clutch actuator 752 may be pushed to move in the direction to be separated from the handle linkage member 3.

When the sliding switch 41 moves from the anti-peephole unlocking position to the anti-peephole locking position, the sliding switch 41 may drive the clutch mechanical member 42 to reset to the initial position. At this time, since the clutch actuator 752 is not pushed by the clutch mechanical member 42, and the coil spring 753 accumulates the elastic force, the clutch actuator 752 may be reset to a position to cooperate with the handle linkage member 3 under the elastic force of the coil spring 753. The handle 1 may be restricted from performing unlocking movement again.

The purpose of establishing the non-fixed connection between the clutch mechanical member 42 and the clutch actuator 752 is to separate the movements of the clutch mechanism 7 and the mechanical clutch mechanism 4, so that they can implement their respective functions of anti-peephole unlocking and locking independently.

Alternatively, in some embodiments, the clutch mechanical member 42 may be fixedly connected to the clutch actuator 752, and the clutch mechanical member 42 and the clutch actuator 752 may act synchronously in the process of the anti-peephole unlocking or locking.

Furthermore, in some embodiments, the mechanical clutch mechanism 4 may further include a reset elastic member 43. Two ends of the reset elastic member 43 may act on the clutch mechanical member 42 and the housing 71, respectively, to apply an elastic reset force on the clutch mechanical member 42 to drive the clutch mechanical member 42 to cooperate with the handle linkage member 3. The function of setting the reset elastic member 43 is described hereinafter. During the process that the sliding switch 41 moves from the anti-peephole locking position to the anti-peephole unlocking position, the clutch mechanical member 42 may compress the reset elastic member 43, and the reset elastic member 43 may accumulate the elastic reset force. When the sliding switch 41 is released, under the action of the reset elastic force of the reset elastic member 43, the sliding switch 41 may be automatically reset from the anti-peephole unlocking position to the anti-peephole locking position. The reset elastic member 43 may preferably include a compression spring.

As shown in FIGS. 11-14, an embodiment of the present disclosure provides a specific handle device, in which the handle 1 may be a rotating handle 11. The rotating handle 11 may be rotatably connected to the indoor casing 2 with a horizontal rotation axis perpendicular to indoor casing 2 of the door lock. When the rotating handle 11 is in a horizontal state, that is, the operation part is at the initial position, the rotating handle 11 may be at the initial locking position. The rotating handle 11 may be held by a hand and rotated downward to perform an unlocking movement.

In some embodiments, when the handle 1 is the rotating handle 11, the handle linkage member 3 is the handle steering member 31. The handle steering member 31 may be arranged coaxially with the horizontal rotation axis of the rotating handle 11. The handle steering member 31 may include a limiting slot 311 cooperating with the clutch end 72.

Figure 12:
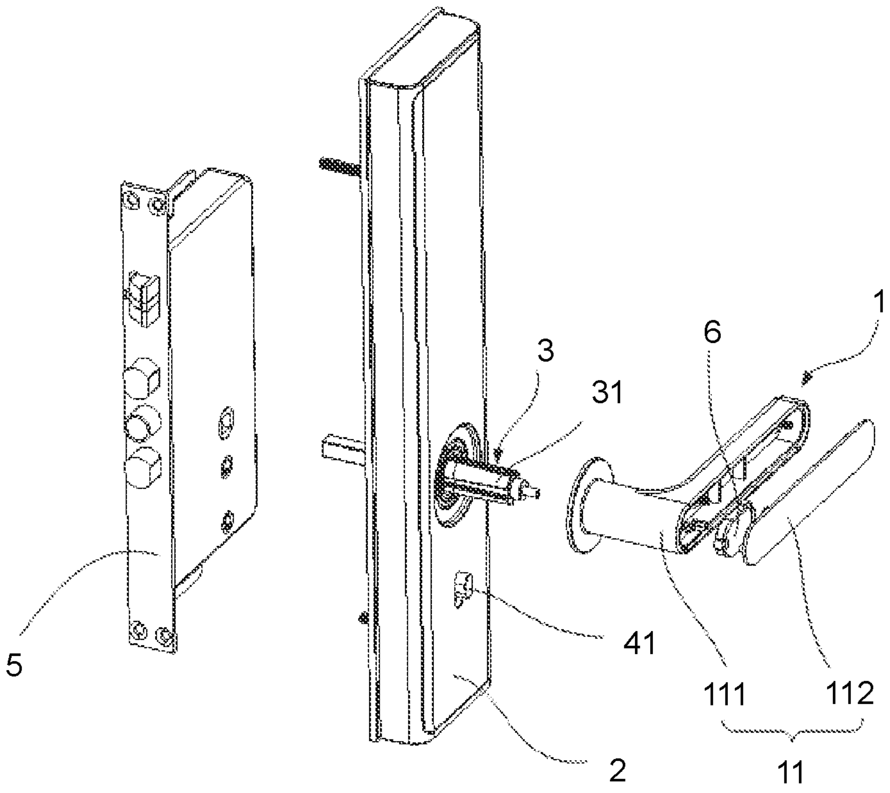
FIG. 12 is a schematic diagram illustrating an exploded structure of an exemplary handle device as described in connection with FIG. 11 according to some embodiments of the present disclosure.
Figure 13:
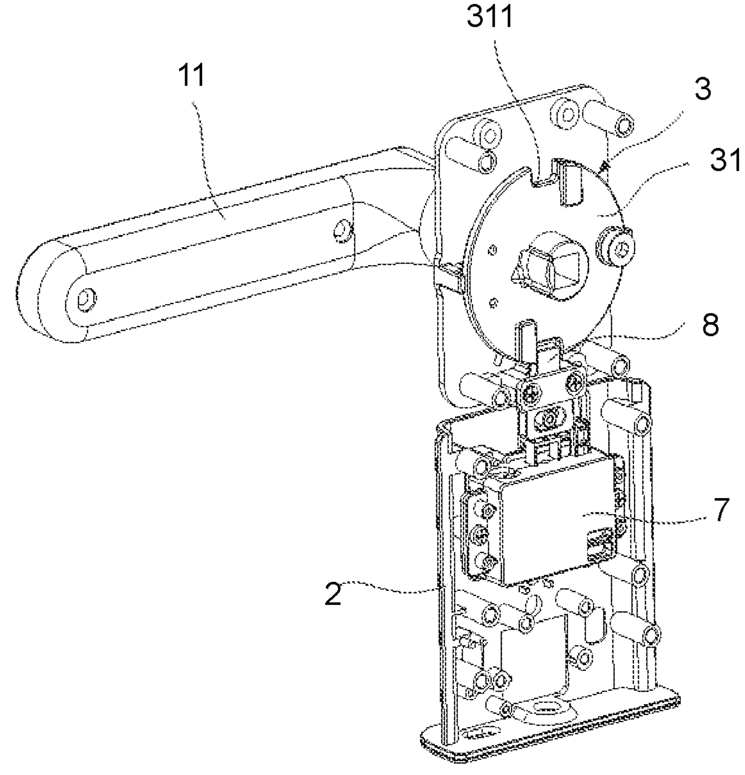
FIG. 13 is a schematic diagram illustrating a structure of an exemplary clutch mechanism of a handle device as described in connection with FIG. 11 that is in a limiting matching state according to some embodiments of the present disclosure.

As shown in FIG. 12, when the rotating handle 11 is in the horizontal state, the limiting slot 311 may face the clutch end 72 of the clutch mechanism 7. When the clutch end 72 is locked into the limiting slot 311, the clutch end 72 may restrict the rotation of the handle steering member 31, thereby restricting the rotation of the rotating handle 11. The transmission connection between the operation part and the action part may be blocked.

Figure 14:
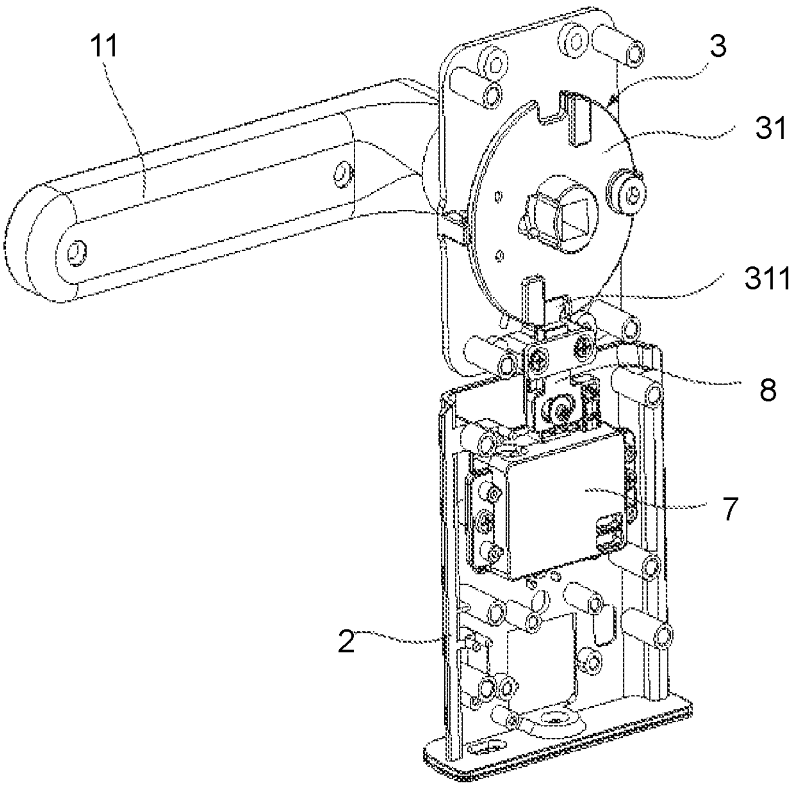
FIG. 14 is a schematic diagram illustrating a structure of an exemplary clutch mechanism of a handle device as described in connection with FIG. 11 that is separated from a limiting matching state according to some embodiments of the present disclosure.

As shown in FIG. 14, when the clutch end 72 leaves the limiting slot 311, the handle steering member 31 can rotate, so that the handle 1 can perform the unlocking movement.

In addition, in some embodiments, the clutch mechanism 7 may further include a steering limiting plate 8 connected to the clutch end 72. The clutch end 72 may cooperate with the limiting slot 311 through the steering limiting plate 8. The clutch end 72 may drive the steering limiting plate 8 to move along a straight line. As shown in FIG. 13, when the steering limiting plate 8 is locked into the limiting slot 311, the steering limiting plate 8 may restrict the rotation of the handle steering member 31, thereby restricting the rotation of the rotating handle 11.

As shown in FIG. 14, when the steering limiting plate 8 leaves the limiting slot 311, the handle steering member 31 can rotate, so that the handle 1 can perform the unlocking movement.

In some embodiments, the clutch end 72 of the clutch mechanism 7 may also be directly set as a stud, which may cooperate with the limiting slot 311.

Figure 11:
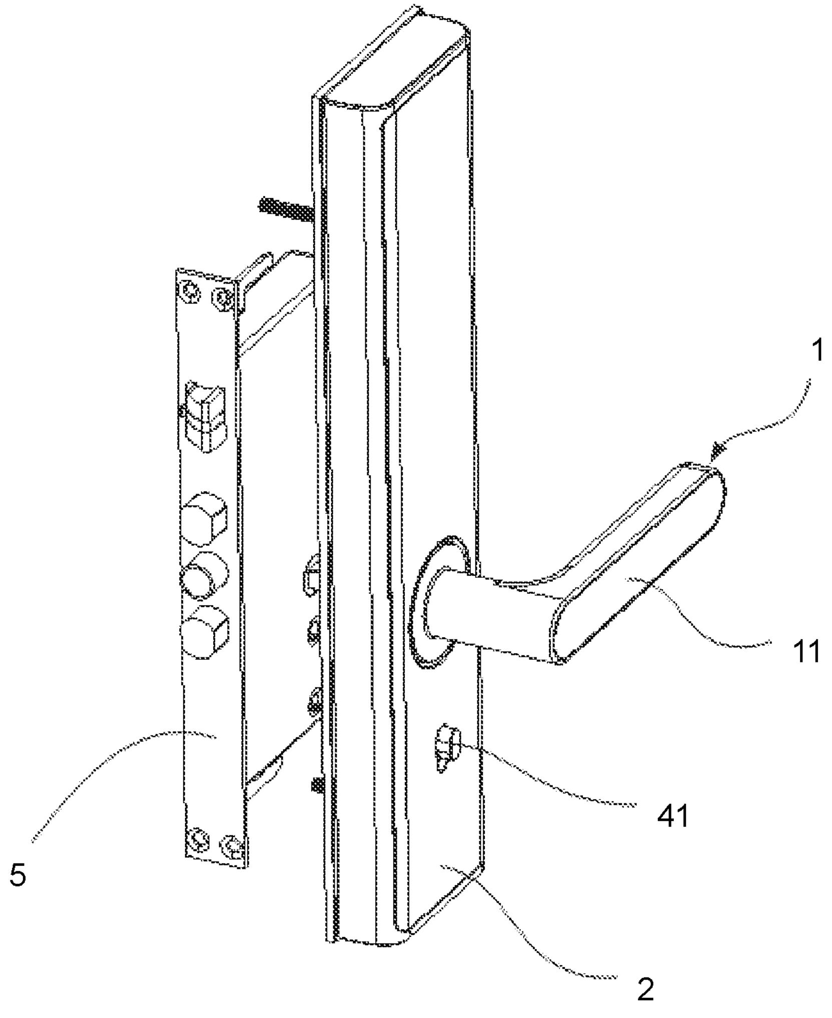
FIG. 11 is a schematic diagram illustrating an exemplary anti-peephole unlocking handle device according to some embodiments of the present disclosure.

As shown in FIG. 11 and FIG. 12, the rotating handle 11 may include a handle body 111 and a handle cover 112. The pressure sensor 6 may be located within the handle body 111 and configured at a position that can be touched by the user. According to a normal posture of the hand holding the rotating handle 11, the pressure sensor 6 may be preferably located at a position where the thumb can press. The pressure sensor 6 may also be located at another position of the handle body 111, for example, at the position of the handle body 111 held by the user, as long as the pressing pressure of the hand can be detected.

Alternatively, the pressure sensor 6 may be located in an installation groove of the handle cover 112. A pressure-deformed gap may exist between the pressure sensor 6 and the handle cover 112. Since the pressure sensor 6 adopts a capacitive pressure sensor, when the handle cover 112 is pressed and deformed, a value of the capacitance may change due to the size change of the gap, and the pressure signal may be detected.

In order to protect the pressure sensor 6, in some embodiments, the pressure sensor 6 may be located within a support sleeve, and the pressure sensor 6 may be installed within the rotating handle 11 through the support sleeve. In some alternative embodiments, the pressure sensor 6 may be located in different areas (e.g., areas other than the handle 1) according to the user experience and the internal structure of the product. In some embodiments, the pressure sensor 6 may be replaced by a touch switch and/or a capacitance sensor.

As shown in FIGS. 22-25, an embodiment of the present disclosure provides another handle device, in which the handle 1 may be a push-pull handle 12. The push-pull handle 12 may be rotatably connected to the indoor casing 2 with a horizontal swing axis parallel to the indoor casing 2 of the door lock. By pushing the push-pull handle 12 inward or pulling the push-pull handle 12 outward, the door lock can be unlocked and locked. The relationship between the push-pull action of the push-pull handle 12 and the unlocking and locking may be determined according to the door opening direction. Generally, when the door is opened outwards, pushing the push-pull handle 12 may be an unlocking action, and when the push-pull handle 12 is at a vertical position, the door lock may be in a locked state.

In some embodiments, the handle 1 may be a push-pull handle 12, the handle linkage member 3 may be a sliding plate 32. The sliding plate 32 may be slidably located in the indoor casing 2 and connected to a toggle end of the push-pull handle 12. The push-pull handle 12 may drive the sliding plate 32 to slide in the indoor casing 2. The sliding plate 32 may include a limiting gap 321 for cooperating with the clutch end 72.

Figure 15:
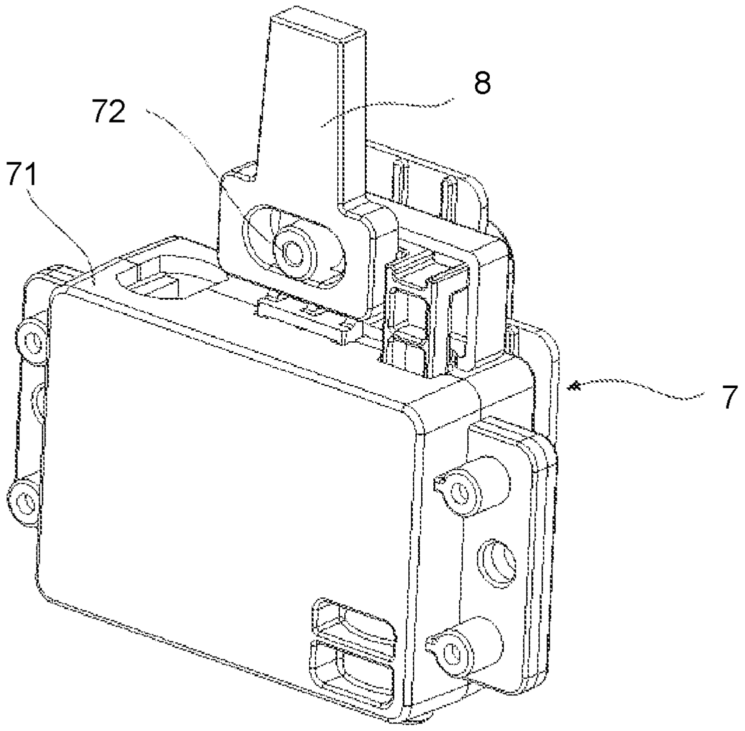
FIG. 15 is a schematic diagram illustrating an appearance structure of an exemplary clutch mechanism according to some embodiments of the present disclosure.
Figure 16:
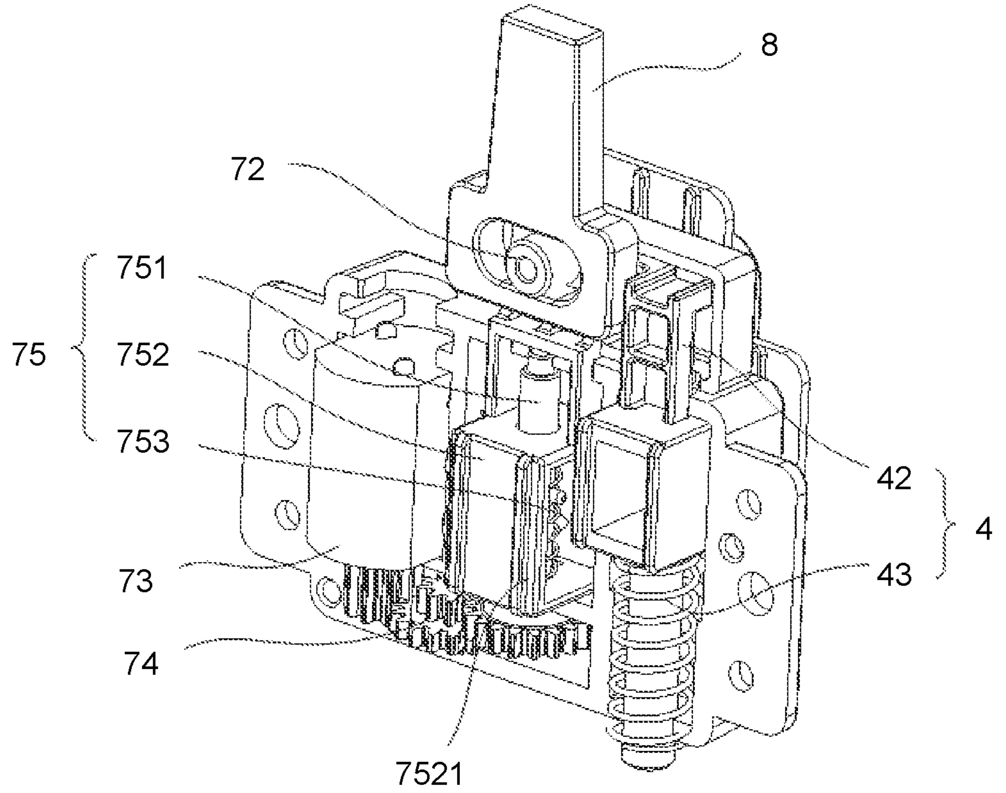
FIG. 16 is a schematic diagram illustrating an internal structure of an exemplary clutch mechanism as described in connection with FIG. 15 according to some embodiments of the present disclosure.
Figure 17:
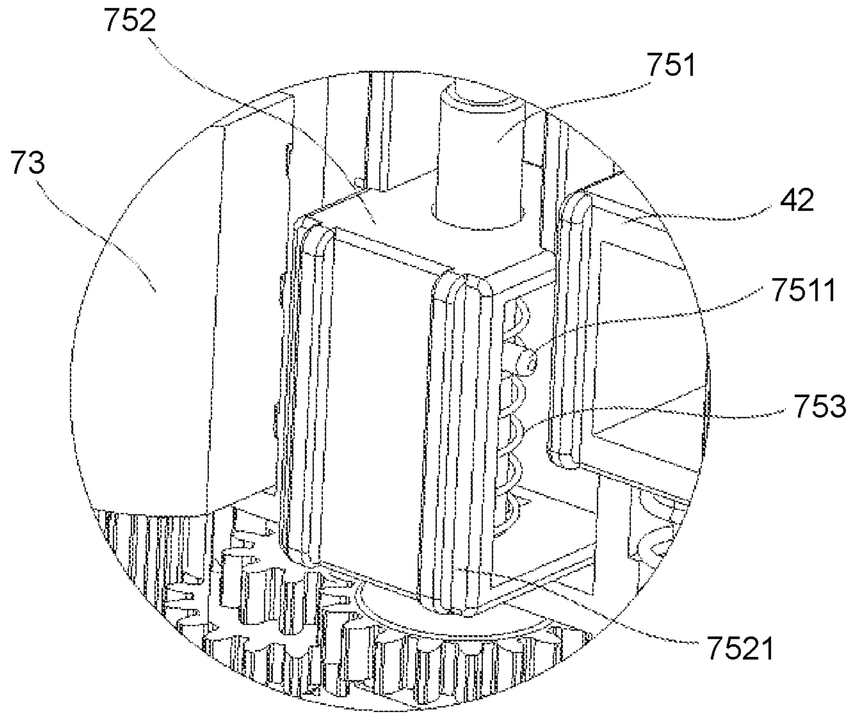
FIG. 17 is a schematic diagram illustrating an enlarged view of a portion of an exemplary clutch mechanism as described in connection with FIG. 16 according to some embodiments of the present disclosure.
Figure 18:
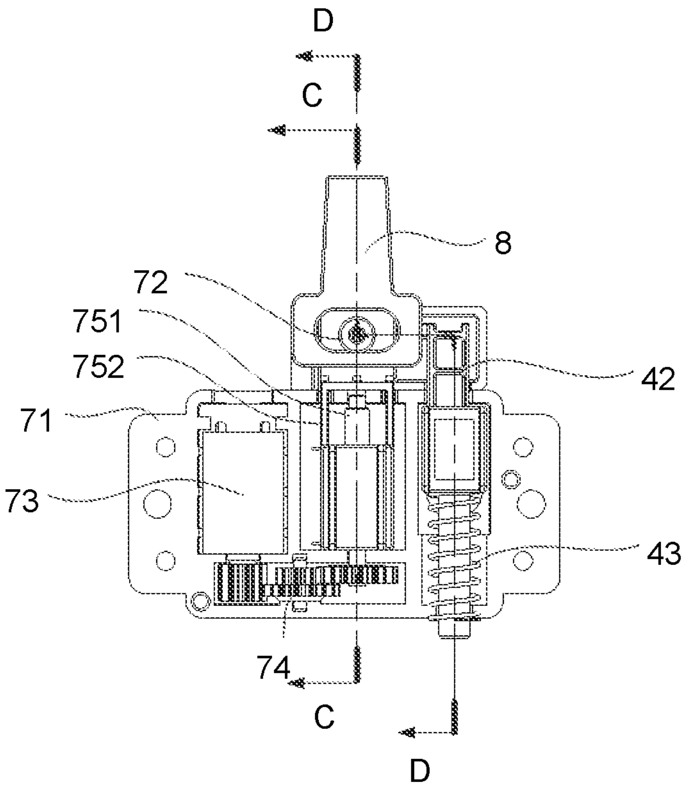
FIG. 18 is a schematic diagram illustrating a front view of an exemplary clutch mechanism as described in connection with FIG. 16 according to some embodiments of the present disclosure.

The working principle of the handle device is described below. It is assumed that pushing the push-pull handle 12 corresponds to an unlocking action. When the push-pull handle 12 is at the vertical position, the door lock may be in the locked state. At this time, as shown in FIG. 15, the clutch end 72 of the clutch mechanism 7 may cooperate with the limiting gap 321 of the sliding plate 32. The sliding plate 32 cannot slide up and down in the indoor casing 2. Since the sliding plate 32 limits the toggle end of the push-pull handle 12, the push-pull handle 12 cannot be pushed to unlock the lock. When the clutch end 72 of the clutch mechanism 7 leaves the limiting gap 321 of the sliding plate 32 the sliding plate 32 can slide up and down in the indoor casing 2 as shown in FIG. 16. At this time, the push-pull handle 12 can be pushed. The toggle end of the push-pull handle 12 may drive the sliding plate 32 to slide in the indoor casing 2. The sliding plate 32 may include a rack, and the rack may move linearly to drive the gear connected to the lock body to rotate, thereby realizing the unlocking action. When the push-pull handle 12 is reset to the vertical position under the action of a self-resetting structure, the clutch end 72 of the clutch mechanism 7 may be reset to a position to cooperate with the limiting gap 321, and the push-pull handle 12 may be restricted from being pushed to unlock again. The implementation principle that a rotation of the handle 12 drives the bolt to eject and retract may be similar to the process described in other embodiments, which will not be repeated here. More descriptions may be found elsewhere in the present disclosure (e.g., FIG. 40 and descriptions thereof).

Further, in some embodiments, the clutch end 72 that cooperates with the limiting gap 321 may be a limiting stud.

In some embodiments, a pressure sensor 6 may be located inside or outside of the push-pull handle 12 close to a side panel of the indoor casing 2. The pressure sensor 6 may be located at any position that the user's finger can touch (i.e., a position determined according to a normal posture of the hand holding the push-pull handle 12), preferably, a position where the finger can press.

Both two types of the handle devices described above can apply the clutch mechanism 7 and the mechanical clutch mechanism 4 of the present disclosure. Components with suitable shape and size may be selected according to the available space, as long as the principles are the same.

Based on the handle devices described in the above embodiments, an embodiment of the present disclosure further provides a door lock. The door lock may include a lock body 5 and a handle device. The handle device may be a handle device described in any one of the above embodiments.

Since the door lock adopts the handle device of the present disclosure, the handle device can only perform the unlocking movement when the hand of the user inside the door is on the handle 1 and the pressure sensor 6 detects the pressing pressure of the hand. When the hand releases the handle 1 and the handle 1 is reset to the locked state, the unlocking movement of the handle 1 may be restricted again, and the door lock cannot be unlocked, thereby avoiding the situation that criminals unlock the lock by operating the handle 1 using a tool through a peephole. Compared with the existing door lock including an anti-peephole unlocking structure, for the door lock of the present disclosure, the anti-peephole unlocking function can be released just by holding the handle 1 with a hand, and the unlocking movement can be performed. After the handle is released, the anti-peephole unlocking function may be automatically activated, and the handle 1 is automatically restricted to perform the unlocking movement. It is not necessary to unlock the anti-peephole unlocking button every time, and it is not necessary to manually lock the anti-peephole unlocking button after unlocking the lock every time. It is not necessary to verify whether the anti-peephole unlocking button is locked every time, and the situation of artificially forgetting to open the anti-peephole unlocking structure will not happen, thereby avoiding the situation that the anti-peephole unlocking structure is not activated caused by human factors, which may improve safety. Meanwhile, the unlocking is convenient and quick.

The various embodiments of the present disclosure are described in a progressive manner. Differences between different embodiments are emphasized, and the same or similar parts of the various embodiments can be referred to each other.

An embodiment of the present disclosure also provides a lock controlled based on a mechanical structure. The lock may include an elastic component, a clutch member, and a first transmission member. The first transmission member may have a transmission connection to the action part. The clutch member may have a transmission connection to the operation part and be connected to the elastic component. In an initial state, the clutch member may be separated from the first transmission member. In this state, the transmission connection between the operation part and the action part may be blocked. When unlocking the lock, the elastic component may be pressed and cooperate with the first transmission member. At the same time, the clutch member may have a transmission connection to the first transmission member under an action of the elastic component, so that the operation part has a transmission connection to the action part. The operation part (e.g., the rotating handle) can be operated to cause the action part to drive the bolt to retract. After the pressing on the elastic component is released, the elastic component may be reset to its original position under an action of its internal return spring and separated from the first transmission member. The clutch member may be separated from the first transmission member under the action of the elastic component, and the transmission connection between the operation part and the action part may be blocked again. The mechanical control lock may further include an opening-closing mechanism. The opening-closing mechanism may include a holding part protruding from the operation part and a limiting structure located in the operation part. The limiting structure may cooperate with the elastic component, and the elastic component may be in a pressed state. Operating the holding part may drive the limiting structure to cooperate with the elastic component, so as to restrict the elastic component from rebounding. In this state, the operation part may have a transmission connection to the action part, and the lock may be controlled to be unlocked or locked. Exemplary embodiments of the present disclosure may be described in detail with reference to FIGS. 26-40.

As shown in FIGS. 11-25, reference numerals are described below.

1000 denotes a panel, 1100 denotes a fixing hole, 1200 denotes a flange, 1210 denotes a convex rib, 1300 denotes a limiting plate, and 1400 denotes a limiting block.

2100 denotes a handle, 2110 denotes a connecting part, 2120 denotes an arm, 2130 denotes a first strip hole, 2140 denotes a rear cover, 2150 denotes a first convex plate, 2160 denotes a division block, 2170 denotes a first position limiting region, 2180 denotes a second position limiting region, 2200 denotes a button, 2300 denotes a clutch, 2400 denotes a return spring, 2500 denotes a spring baffle, 2600 denotes an accommodating cavity.

3110 denotes a clutch structure, 3120 denotes a blocking plate, 3130 denotes a clutch sleeve, 3140 denotes a second stucking member, 3150 denotes a second blocker, 3160 denotes an insert slot, 3200 denotes a connecting cylinder, 3210 denotes a limiting cover, 3220 denotes a rotating cylinder, 3230 denotes a first stucking member, 3240 denotes a first blocker, 3250 denotes a connecting plate, 3260 denotes a second convex plate, 3270 denotes a stucking member, 3300 denotes a torsion spring, 3310 denotes a torsion arm, 3400 denotes a compression cover.

4000 denotes a bearing, 4100 denotes a bearing pressure plate.

5100 denotes a slider, 5110 denotes a slot, 5120 denotes a through hole, 5130 denotes a second strip hole, 5200 denotes an operating member, 5210 denotes a protruding part, 5220 denotes a limiting part, 5230 denotes a limiting column, 5240 denotes a limiting convex plate, 5300 denotes a compression spring, 5400 denotes a limiting screw.

The handle 2100 in FIGS. 26-39 represents the same structure as that of the door inside handle 3031 in FIG. 8, which both belong to the operation part. In addition, the first transmission member may correspond to the mechanism 3100 shown in FIG. 39, which may include a clutch structure 3110, a blocking plate 3120, a clutch sleeve 3130, a second stucking member 3140, a second blocker 3150, and an insert slot 3160. The elastic component may correspond to a button 2200 and a return spring 2400 in FIGS. 26-35.

An embodiment of the present disclosure provides a smart lock. As shown in FIGS. 26-39, the smart door lock may include a panel 1000, an operation part, an action part, and a bolt. The panel 1000 may include a fixing hole 1100. The operation part and the action part may be located at both ends of the fixing hole 1100. The action part may include a driving member including the clutch structure 3110. A rotation of the driving member may drive the bolt to eject or retract. The operation part may include a handle 2100 and an elastic button including the clutch 2300. When the elastic button is in a pressed state, it may cooperate with the clutch structure 3110 so that a rotation of the handle 2100 may drive the rotation of the driving member, thereby driving the bolt to eject or retract.

In other words, when the operation part is operated to press the elastic button to a pressed state, the return spring 2400 may be compressed under the pressure. A rotation of the handle 2100 may be transmitted to rotate the driving member. The rotation of the driving member may drive the bolt to eject or retract. Therefore, simultaneously pressing the elastic button and rotating the handle 2100 can realize the locking and unlocking of the smart door lock. When the pressing action on the elastic button is released, the elastic button may be reset under the elastic force of the return spring 2400. At this time, the clutch 2300 may be separated from the clutch structure 3110, and the rotation of the handle 2100 cannot be transmitted to the driving member. When only rotating the handle 2100 without pressing the elastic button, the smart door lock cannot be unlocked.

Therefore, even if someone outside the door uses a tool passing through the peephole to rotate the handle 2100, the bolt is difficult to be driven to retract, that is, the door lock cannot be unlocked, thereby ensuring the security of the smart door lock.

In some embodiments, the handle 2100 may include an opening-closing mechanism. The opening-closing mechanism may include an operating member 5200 protruding from the handle 2100 and a limiting structure located within the handle 2100. The limiting structure may cooperate with the elastic button. When the elastic button is in the pressed state, the operating member 5200 may act on the limiting structure to make the limiting structure cooperate with the elastic button (e.g., through a snapping connection), so as to restrict the elastic button from rebounding. The operating element 5200 may be connected to the limiting structure (e.g., through a fixed connection, a transmission connection), and the movement of the operating member 5200 may drive the limiting structure to move to cooperate with the elastic button.

In other words, when it is necessary to realize the function of anti-peephole unlocking through the elastic button, it only needs to keep the limiting structure being separated from the elastic button. In a certain scene or for some customers with special needs, the function of anti-peephole unlocking may not be required, it only needs to press the elastic button to the pressed state. The pressure may be transmitted to the limiting structure through the operating member 5200, so that the limiting structure may be cooperated with the elastic button to restrict the elastic button from rebounding. At this time, the customer does not need to continue pressing the elastic button, and the elastic button can remain in the pressed state under the restriction of the limiting structure. The bolt can be driven to eject or retract by rotating the handle 2100. When the anti-peephole unlocking function needs to be turned on, the limiting structure may be separated from the elastic button by using the operating member 5200. At this time, the rebound of the elastic button is not restricted. The elastic button may rebound to make the smart door lock in a state of anti-peephole unlocking. To unlock the lock again, it needs to press the elastic button and rotate the handle 2100 at the same time to drive the bolt to retract.

Specifically, whether the anti-peephole unlocking function is required can be selected according to the user's needs, and whether the anti-peephole unlocking function is available may be switched by using the opening-closing mechanism (i.e., the elastic button). The operation is convenient and can effectively improve the user experience, which may have good applicability and good economy.

In some embodiments, the handle 2100 may include an accommodating cavity. A side wall of the accommodating cavity may include a first strip hole 2130. The limiting structure may be located within the accommodating cavity, and the operating member 5200 may extend through the first strip hole 2130. A movement of the operating member 5200 along the length direction of the first strip hole 2130 may drive the limiting structure to slide to be cooperated with or separated from the elastic button. That is, in some embodiments, the limiting structure may be driven to slide to be cooperated with or separated from the elastic button by pushing or pulling the operating member 5200 to slide.

In some embodiments, the operating member 5200 may also include a pushing button located on a side wall of the handle 2100. The pushing button may be similar to an internal structure of a pushing pen (a structure well known to those skilled in the art, and will not be repeated here), and the limiting structure may correspond to the pen tip. A side wall of the elastic button may include a lock hole or a lock slot that is cooperated with the limiting structure. Pressing the pushing button may drive the limiting structure to extend and insert into the lock hole or the lock slot. The rebound of the elastic button may be restricted. Pressing the pushing button again may drive the limiting structure to retract, and the elastic button may rebound.

Compared with the solution by setting the pushing button, the solution in which the limiting structure is driven to slide to be cooperated with the elastic button by a pushing-pulling operation can avoid misoperation and has better security. Additionally or alternatively, the operating member 5200 may also be set as other suitable mechanisms, which is not limited in the present disclosure.

In some alternative embodiments, the first strip hole 2130 may include other shapes or sizes. For example, the hole may have a regular shape (e.g., a circle and a square) or an irregular shape (e.g., an S-shaped and a convex shape).

In some embodiments, the opening-closing mechanism may further include a slider 5100 located in the accommodating cavity. A movement of the operating member 5200 may drive the slider 5100 to slide. The limiting structure may be located at one end of the slider 5100. The slider 5100 may include a second strip hole 5130. The slider 5100 may be fixed to the handle 2100 through a limiting screw 5400 and the second strip hole 5130. The limiting screw 5400 may slide along the second strip hole 5130.

Specifically, a length direction of the second strip hole 5130 may be parallel to a length direction of the first strip hole 2130, so that the slider 5100 may slide stably to be cooperated with the elastic button. A count of the second strip hole 5130 may not be limited. In some embodiments, the count of the second strip hole 5130 is two, which may limit a position and a sliding direction of the slider 5100, thereby making the sliding of the slider 5100 more stable. In some alternative embodiments, the second strip hole 5130 may include other shapes or sizes. For example, the hole may have a regular shape (e.g., a circle and a square) or an irregular shape (e.g., an S-shaped and a convex shape). The shape of the second strip hole 5130 may cooperate with that of the first strip hole 2130, so that the slider 5100 can slide to a position cooperated with the elastic button.

In some embodiments, the opening-closing mechanism may further include a compression spring 5300 located in the accommodating cavity. The operating member 5200 may include a protruding part 5210 protruding from the first strip hole 2130 and a limiting part 5220 located in the accommodating cavity. The protruding part 5210 may extend out the first strip hole 2130, which is convenient for manual operation. The limiting part 5220 may be located within the accommodating cavity to restrict the operating member 5200 from fully extending out of the first strip hole 2130 to be separated from the first strip hole 2130. The limiting part 5220 may also be configured to drive the slider 5100 to slide.

Figure 28:
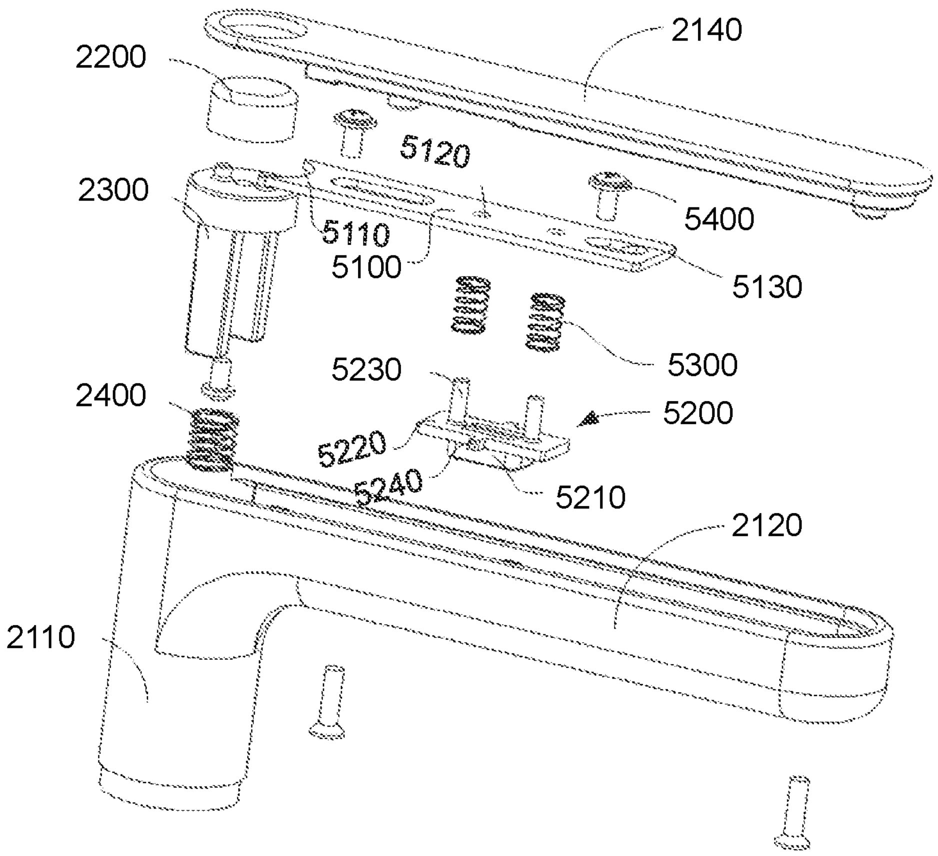
FIG. 28 is a schematic diagram illustrating an exemplary handle and its internal structure according to some embodiments of the present disclosure.
Figure 29:
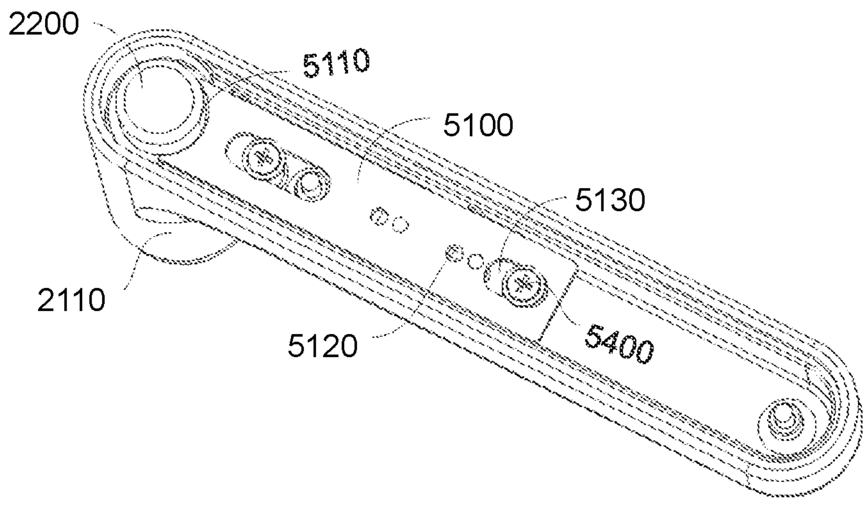
FIG. 29 is a schematic diagram illustrating a structure that a slider and an elastic button are in a matching state according to some embodiments of the present disclosure.
Figure 30:
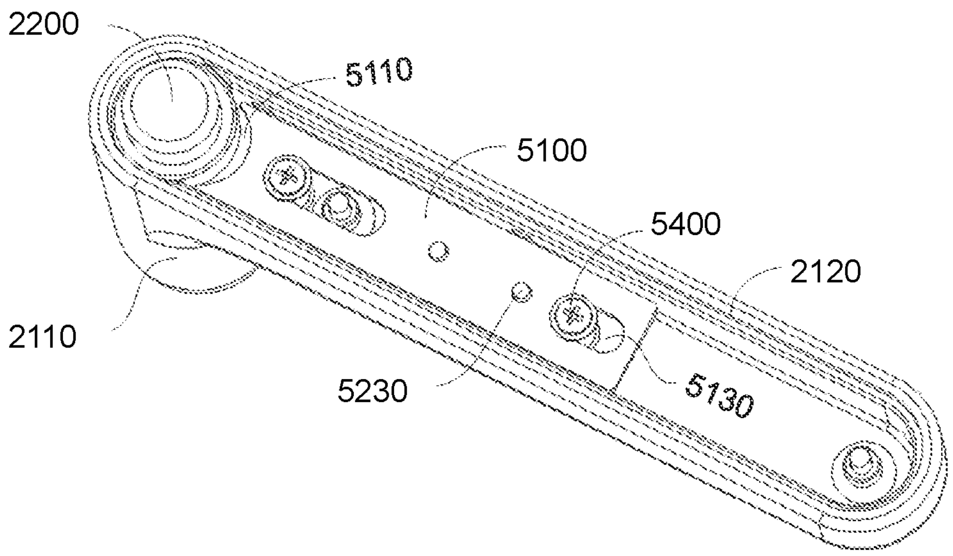
FIG. 30 is a schematic diagram illustrating a structure that a slider and an elastic button are in a separated state according to some embodiments of the present disclosure.
Figure 31:
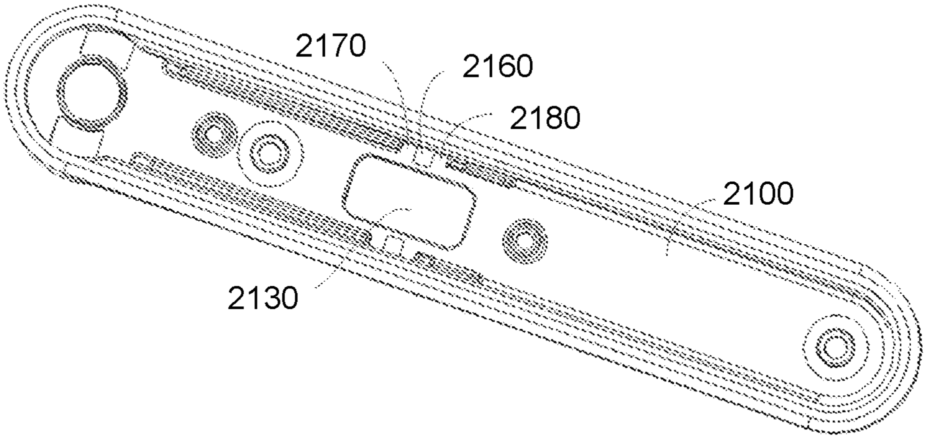
FIG. 31 is a schematic diagram illustrating a partial structure of an accommodating cavity of an exemplary handle according to some embodiments of the present disclosure.

As shown in FIG. 28, the limiting part 5220 may include a limiting convex plate 5240. As shown in FIG. 31, the accommodating cavity may include a division block 2160 cooperating with the limiting convex plate 5240. The accommodating cavity may be divided into a first position limiting region 2170 and a second position limiting region 2180. When the limiting structure cooperates with the elastic button, the limiting convex plate 5240 may be located within the first position limiting region 2170. When the limiting structure is separated from the elastic button, the limiting convex plate 5240 may be located within the second position limiting region 2180. The compression spring 5300 may act on the limiting part 5220 so that the protruding part 5210 may be located within the position limiting region (including the first position limiting region 2170 and the second position limiting region 2180), and when the compression spring 5300 is in a compressed state, the limiting part 5220 may be out of the position limiting region. Specifically, pressing the protruding part 5210 may cause the compression spring 5300 to be compressed, and the limiting convex plate 5240 may be separated from the position limiting region. The slider 5100 may be driven to slide by sliding the operating member 5200. After the opening-closing mechanism is adjusted to a desired state (a state that the limiting structure is cooperated with or separated from the elastic button), the pressing on the protruding part 5210 may be released, and the compression spring 5300 in the compressed state may push the limiting part 5220 so that the limiting convex plate may be located in the position limiting region and restricted by the division block 2160. A movement of the slider 5100 caused by a rotation, a vibration, etc. during the usage of the handle 2100 may be avoided.

In some embodiments, the slider 5100 may include a through hole 5120. The limiting part 5220 may include a limiting column 5230 passing through the through hole 5120. The compression spring 5300 may be sleeved on the outside of the limiting column 5230. A length of the compression spring 5300 may be greater than that of the limiting column 5230. After the operating member 5200 is pressed, one end of the spring may abut the limiting part 5220, and the other end may abut the slider 5100. The compression spring 5300 may be gradually compressed until an end of the limiting column 5230 enters the through hole or a groove 5120. After the pressing on the protruding part 5210 is released, the compression spring 5300 in the compressed state may push the limiting part to be separated from the through hole or the groove 5120. At this time, the end of the limiting column 5230 may exit the through hole or the groove. 5120.

In some embodiments, the operating member 5200 and the slider 5100 may also be set as an integrated sliding or sleeving structure. The slider 5100 may include a through hole 5120, and the operating member 5200 may include a limiting column 5230. The limiting column 5230 may move along an axial direction of the through hole 5120. That is, during the compression and recovery process of the compression spring 5300, a position of the slider 5100 remains unchanged, and a position of the limiting structure remains unchanged, which may facilitate the cooperation with the elastic button.

In some embodiments, a count of the limiting column 5230 may be two. That is, the sliding of the operating member 5200 may drive the slider 5100 to slide through two sets of pushing parts, so that the sliding of the slider 5100 may be more stable, and a rotation or a deviation may be avoided. A count of the limiting convex plate 5240 and a count of the division block 2160 may both be two to ensure the position limiting effect. The counts of the limiting column 5230, the limiting convex plate 5240, and the division block 2160 may not be limited to two, and can also be other numbers, which is not limited in the present disclosure.

In some embodiments, the handle 2100 may include an arm 2120 and a connecting part 2110. The opening-closing mechanism may be located on the arm 2120. The second strip hole 5130 may be located on the arm 2120. The connecting part 2110 may include an accommodating cavity 2600 connected to the fixing hole 1100. The elastic button may be located within the accommodating cavity 2600. The elastic button may further include a button 2200 and a return spring 2400. The button 2200 and the clutch 2300 may be fixed, and the button 2200 may extend out of the accommodating cavity 2600 for a pressing operation. The accommodating cavity 2600 may include a spring baffle 2500. The return spring 2400 may be located between the spring baffle 2500 and the clutch 2300, and the clutch 2300 may pass through the spring baffle 2500 to cooperate with the clutch structure 3110. In some embodiments, the clutch 2300 may include a cavity with an opening at an end away from the button 2200. The return spring 2400 and the spring baffle 2500 may be sequentially arranged in the cavity from the inside to the outside. When the button 2200 is pressed, the return spring 2400 may be in a compressed state, and the clutch 2300 may cooperate with the clutch structure 3110. When the pressing on the button 2200 is released, the return spring 2400 in the compressed state may push the clutch 2300 to be separated from the clutch structure 3110. In some embodiments, the clutch structure 3110 may cooperate with the clutch 2300 on their end surfaces. For example, when the button 2200 is pressed, the clutch 2300 approaches the clutch structure 3110 until the clutch 2300 is in contact with the clutch structure 3110 on their end surfaces. A concave-convex structure may be located on a joint end surface of the clutch 2300 and the clutch structure 3110, so that the concave-convex structure can cooperate with each other when the clutch 2300 is in contact with the clutch structure 3110. At this time, a rotation of the handle 2100 may drive the clutch 2300 to rotate, and then the clutch structure 3110 may drive the driving member to rotate, so that the bolt may be driven to retract to unlock the lock. In some embodiments, the clutch structure 3110 may cooperate with the clutch 2300 on their inner walls or outer walls. For example, the clutch structure 3110 may include an internal cavity along its axial direction. A cross section of the clutch 2300 may match with that of the internal cavity. When the button 2200 is pressed, the clutch 2300 may enter the internal cavity of the clutch structure 3110. An outer wall of the clutch 2300 and an inner wall of the clutch structure 3110 may respectively include a concave-convex structure that cooperates with each other, so that the clutch structure 3110 and the clutch 2300 may be clamped with each other in the circumferential direction. At this time, rotating the handle 2100 may drive the clutch 2300 to rotate, and then the clutch structure 3110 may drive the driving member to rotate, so that the bolt may be driven to retract to unlock the lock. The clutch structure 3110 and the clutch 2300 may also have other cooperation methods, which are not limited in the present disclosure. In some embodiments, the handle 2100 may have a transmission connection to the clutch 2300, that is, a rotation of the handle 2100 may drive the clutch 2300 to rotate through the transmission connection. The transmission connection may include various forms, merely by way of example, the handle 2100 may be fixedly connected to the clutch 2300 through a handle linkage member. More descriptions about the handle linkage member may be found elsewhere in the present disclosure. In some embodiments, an end of the slider 5100 may include a slot 5110 cooperating with the button 2200. When a side wall of the slot 5110 is attached to a side wall of the button 2200, an end surface of the slot 5110 may abut against the clutch 2300 to limit the rebound of the elastic button, that is, the slot 5110 is the limiting structure mentioned above for restricting the clutch 2300 from being separated from the clutch structure 3110. Specifically, if the button 2200 has a cylindrical structure, the slot 5110 may have an arc-shaped slot, or if the button 2200 has a square column structure, the slot 5110 may have a square slot, which may ensure that a sufficient contact area exists between the limiting structure and the clutch 2300, thereby avoiding a deformation of the limiting structure.

In some embodiments, the limiting structure may also be a limiting rod, and the elastic button may include a limiting groove cooperating with the limiting rod. At this time, sliding the operating member 5200 may drive the limiting rod to be inserted into the limiting groove to limit an axial movement of the elastic button, thereby limiting the rebound of the elastic button. Specifically, an end of the slider 5200 may include the limiting rod, or the entire slider 5200 may have a rod-shaped structure.

Setting the limiting structure as the slot 5110 may increase a contact area with the elastic button, reduce the processing requirements, and have better stability and processing technology.

In some embodiments, the button 2200 and the clutch 2300 may have a split structure and be fixed by bolts. The button 2200 may be made of an aluminum profile whose surface has been hard anodized. The clutch 2300 may be made of a zinc alloy whose surface has been electroplated. The button 2200 may extend out of the accommodating cavity 2600 for pressing operation. Specifically, as shown in FIG. 28, the handle 2100 may include a connecting part 2110, an arm 2120, and a rear cover 2140. The rear cover 2140 may include a hole structure so that the button 2200 can extend through the hole. A friction may exist between an inner wall of the accommodating cavity 2600 and an outer wall of the button 2200. At this time, using the aluminum profile whose surface has been hard anodized may increase a hardness and a wear resistance of the button 2200, which may avoid scratches and abrasion. Using the zinc alloy whose surface has been electroplated may ensure that the clutch 2300 has sufficient strength to drive the driving member to rotate through the cooperation with the clutch structure 3110.

Figure 36:
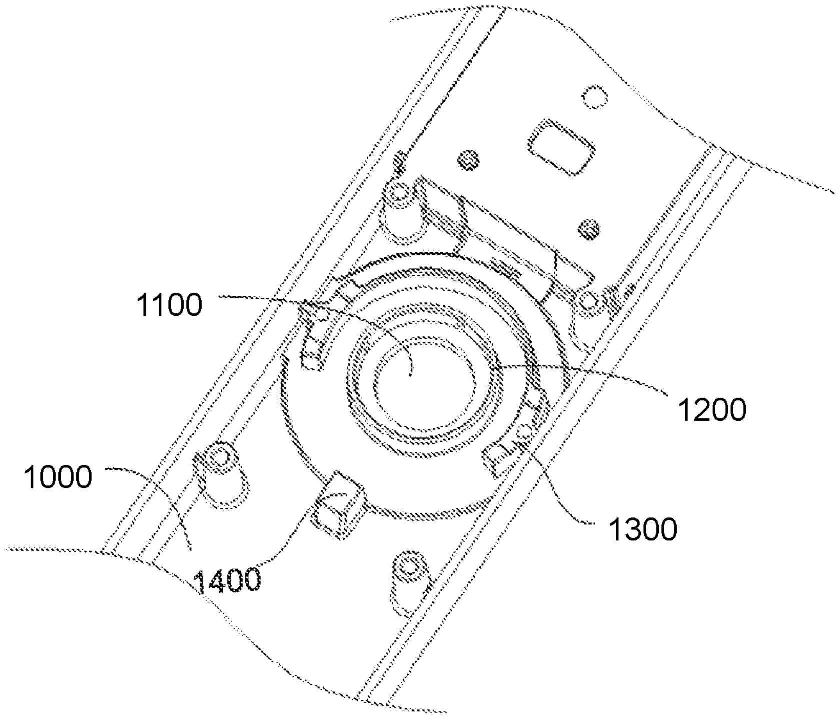
FIG. 36 is a schematic diagram illustrating a structure of an exemplary panel according to some embodiments of the present disclosure.

In some embodiments, the action part may further include a connecting cylinder 3200 and a torsion spring 3300. The torsion spring 3300 may act on the driving member to drive the bolt to eject. As shown in FIG. 36, the panel 1000 may include a limiting plate 1300 and a limiting block 1400 along the circumference of the fixing hole 1100. The limiting plate 1300 may include a gap. For example, the limiting plate 1300 may have a circular arc structure. The limiting block 1400 may be located at a middle position of the gap. Specifically, the middle position of the gap refers to the middle position between the two ends of the limiting plate 1300. The limiting block 1400 may be located at the position with a same distance from both ends of the limiting plate 1300. A circumferential extension of an end of the limiting plate 1300 may pass the position where the limiting block 1400 is located.

Figure 35:
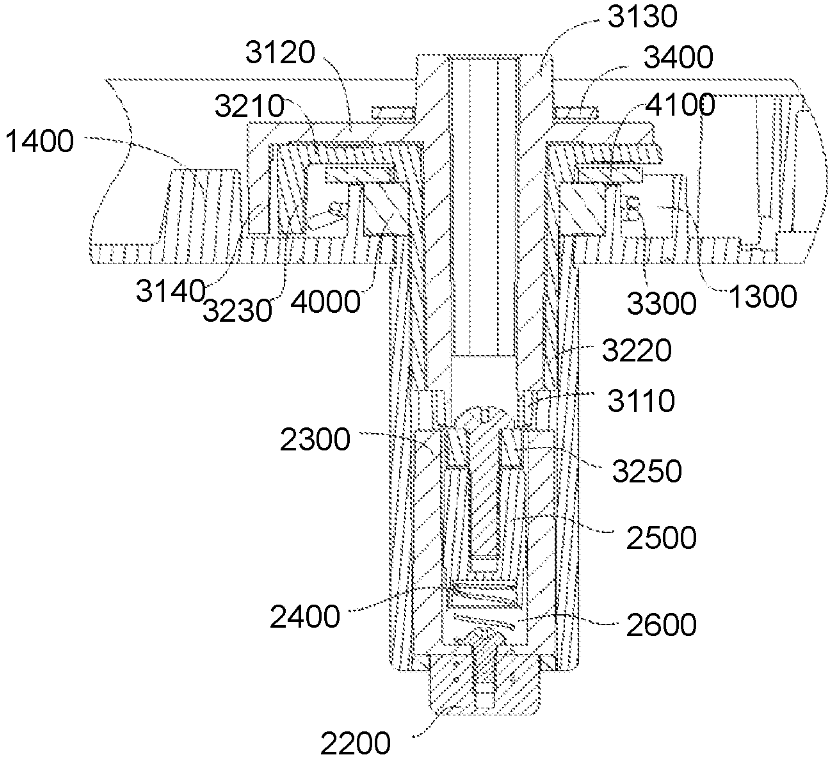
FIG. 35 is a schematic diagram illustrating a left view of an internal structure as described in connection with FIG. 33 according to some embodiments of the present disclosure.
Figure 37:
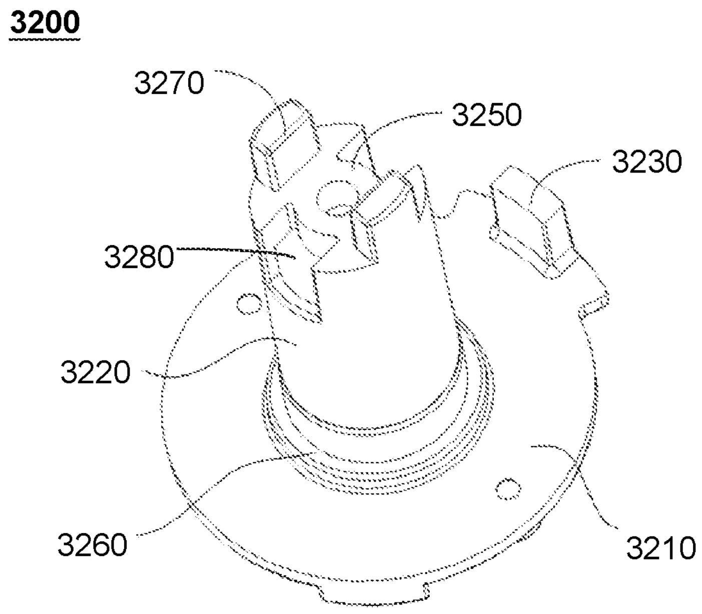
FIG. 37 is a schematic diagram illustrating a structure of an exemplary connecting cylinder at a first angle according to some embodiments of the present disclosure.

The torsion spring 3300 may be located inside the limiting plate 1300 and two torsion arms 3310 of the torsion spring 3300 may abut on both sides of the limiting block 1400, respectively. The torsion arm 3310 can move between the limiting block 1400 and the end of the limiting plate 1300. As shown in FIG. 35 and FIG. 37, the connecting cylinder 3200 may include a limiting cover 3210 and a rotating cylinder 3220. The limiting cover 3210 may include a first stucking member 3230 located between the two torsion arms 3310. The rotating cylinder 3220 may pass through the fixing hole 1100 and be fixed with the handle 2100. When the handle 2100 rotates, the connecting cylinder 3200 may be driven to rotate together. The rotating cylinder 3220 may include a cavity. The cavity may be connected to the accommodating cavity 2600 to form a clutch cavity.

As shown in FIG. 37, an end of the rotating cylinder may include a connecting plate 3250. The connecting plate 3250 and the spring baffle 2500 may be fixed by screw(s). For example, the screw(s) may pass through the hole at a top of the connecting plate 3250 to connect and fix the connecting plate 3250 and the spring baffle 2500. The connecting plate 3250 may include a stucking member 3270 and a perforation 3280. The spring baffle 2500 may include a slot cooperating with the stucking member 3270. When the stucking member 3270 cooperates with the slot, a position of the perforation 3280 may correspond to the clutch 2300, so that the clutch 2300 can pass through the spring baffle 2500 and the perforation 3280 in sequence and cooperate with the clutch structure 3110. The setting of the stucking member 3270 and the slot may facilitate accurate positioning during the installation process and improve the installation efficiency.

Figure 39:
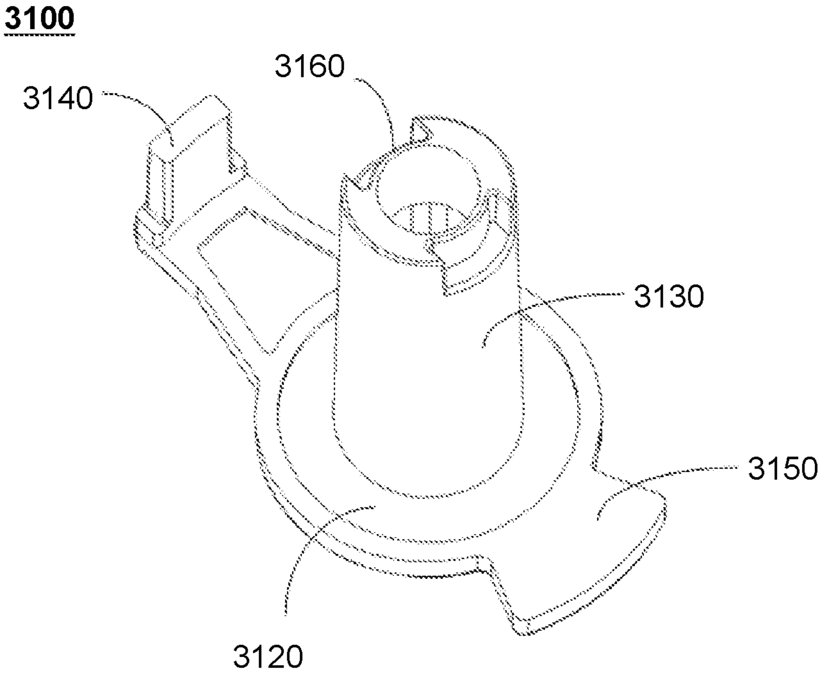
FIG. 39 is a schematic diagram illustrating a structure of an exemplary driving member according to some embodiments of the present disclosure.

The driving member may be configured to drive the bolt to move. As shown in FIG. 39, in some embodiments, the driving member 3100 may include a blocking plate 3120 and a clutch sleeve 3130. The blocking plate 3120 may include a second stucking member 3140 located between the two torsion arms 3310. The second stucking member 3140 may also be located at the position where the limiting block 1400 locates. To avoid interference, the first stucking member 3230, the second stucking member 3140, and the limiting block 1400 may be arranged side by side along a length direction of the torsion arm 3310. Alternatively, the first stucking member 3230, the second stucking member 3140, and the limiting block 1400 may be arranged from the inside to the outside along a radial direction of the fixing hole 1100 and located between the two torsion arms 3310 of the torsion spring 3300. The clutch sleeve 3130 may pass through the cavity of the rotating cylinder 3220. An end of the clutch sleeve 3130 may include a clutch structure 3110 (referring to FIG. 35). When the button is pressed, the clutch 2300 may cooperate with the clutch structure 3110 in the aforementioned clutch cavity. The rotation of the handle 2100 may drive the rotation of the driving member 3100, thereby driving the bolt to eject or retract to realize the locking or unlocking of the door lock. More descriptions about rotating the handle 2100 to drive the driving member 3100 to rotate so as to drive the bolt to eject and retract may be found elsewhere in the present disclosure (e.g., FIG. 40 and descriptions thereof).

An inner side of the limiting plate 1300 may be configured to limit a position of the torsion spring 3300 to prevent the torsion spring 3300 from moving along its radial direction (or a radial direction of the fixing hole 1100) during usage, thereby preventing a situation that the torsion spring 3300 is separated from the driving member and the driving member cannot be driven to drive the bolt to eject (i.e., the bolt is reset). A notch of the limiting plate 1300 and the limiting block 1400 may limit a rotation angle of the first stucking member 3230 and the second stucking member 3140, thereby limiting a rotation angle of the handle 2100 and a compression stroke of the torsion spring 3300.

In some embodiments, the limiting plate 1300 and the limiting block 1400 may work together to limit the position of the torsion spring 3300 so that the torsion spring 3300 can neither move in the radial direction nor change its position significantly in the circumferential direction. Since the first stucking member 3230 and the second stucking member 3140 are located between the two torsion arms 3310, the elasticity of the torsion arm 3310 may drive the first stucking member 3230 and the second stucking member 3140 to reset after the first stucking member 3230 and the second stucking member 3140 rotate a certain angle. When no pressure is applied to the handle 2100 to drive it to rotate, the handle 2100 and the bolt may be reset.

Figure 32:
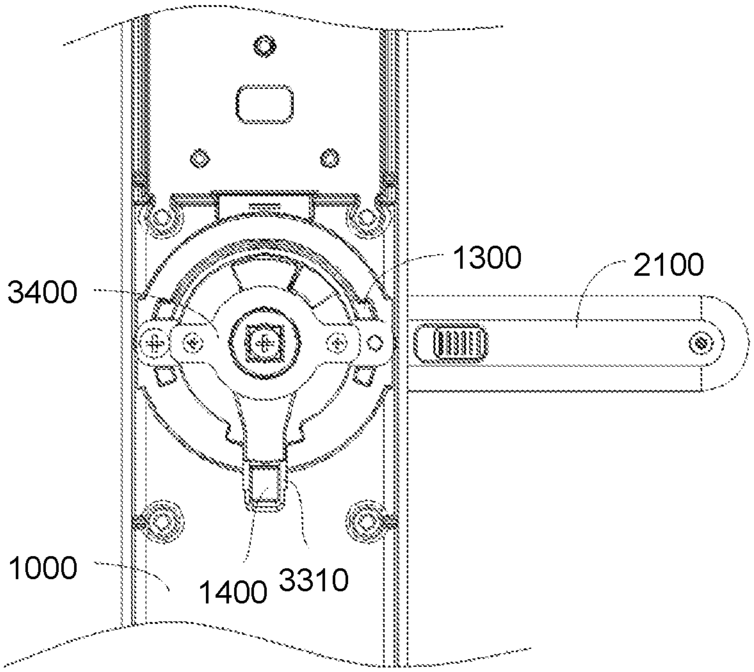
FIG. 32 is a schematic diagram illustrating an exemplary smart door lock according to some embodiments of the present disclosure.

In an initial state, as shown in FIG. 32, the first stucking member 3230, the second stucking member 3140, and the limiting block 1400 may be arranged side by side between the two torsion arms 3310 of the torsion spring 3300. After the clutch 2300 is cooperated with the clutch structure 3110, the rotation of the handle 2100 may drive the rotation of the driving member. At the same time, since the connecting cylinder 3200 is fixed to the handle 2100, the first stucking member 3230 and the second stucking member 3140 may rotate synchronously and push one torsion arm 3310 of the torsion spring 3300 to move away from the other torsion arm 3310 until reaching one end of the limiting plate 1300. After the smart door lock is unlocked, the pressing operation on the button 2200 may be released or the rotating operation on the handle 2100 and the pressing operation on the button 2200 may be released at the same time, and the clutch 2300 may be separated from the clutch structure 3110. The restoring force of the torsion spring 3300 may drive the first stucking member 3230 and the second stucking member 3140 back to the initial position, and the rotation of the connecting cylinder 3200 may drive the handle 2100 to rotate to the original position.

The rotation angle of the driving member and the handle 2100 may be limited through the limiting plate 1300 and the limiting block 1400, so that the handle 2100 can only rotate between the limiting plate 1300 and the limiting block 1400. The limiting plate 1300 and the limiting block 1400 may be arranged on the panel 1000 and form an integral structure with the panel 1000. Specifically, the limiting plate 1300 and the limiting block 1400 may be integrally formed with the panel 1000, or may be connected to the panel 1000 through a non-detachable fixing manner, such as welding, which is stable. Since the rotation of the handle 2100 is a regular action during the usage of the door lock, limiting the rotation angle of the handle 2100 through the limiting plate 1300 and the limiting block 1400 may avoid a deformation or a looseness of the limiting plate 1300 and the limiting block 1400 after multiple collisions with the first stucking member 3230 and the second stucking member 3140. The structure is simple, reliable, and stable.

Specifically, in some embodiments, the handle 2100 may have a long strip structure, which can be rotated by pressing down or lifting up. The handle 2100 may also be a round handle 2100, which can be rotated clockwise or counter-clockwise to achieve the above rotation. In the following embodiments, the lock may be unlocked by pressing down the handle 2100, and the lock may be reverse locked by lifting up the handle 2100.

Figure 38:
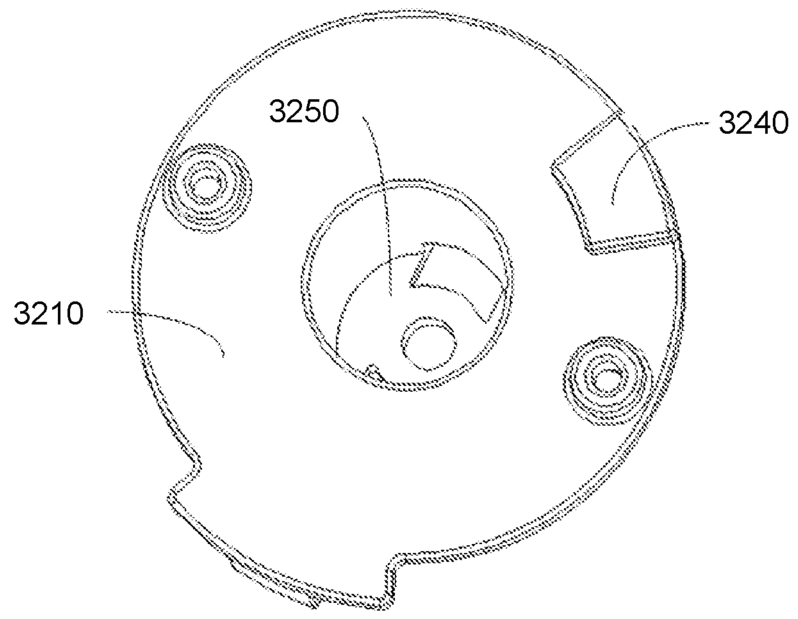
FIG. 38 is a schematic diagram illustrating a structure of an exemplary connecting cylinder at a second angle according to some embodiments of the present disclosure.

In some embodiments, the connecting cylinder 3200 may cooperate with the driving member 3100 to achieve a reverse locking. For example, as shown in FIG. 37 and FIG. 38, the limiting cover 3210 may include a first blocker 3240 (e.g., the convex plate 3240 shown in FIG. 38). The blocking plate 3120 may include a second blocker 3150 (e.g., the sheet 3150 shown in FIG. 39) that cooperates with the first blocker 3240. When the clutch 2300 and the clutch structure 3110 are in a separated state, a rotation of the handle 2100 in a reverse-locking direction may drive the driving member to rotate through the first blocker 3240 and the second blocker 3150, so that the door lock can be reverse locked. When the clutch 2300 and the clutch structure 3110 are in the separated state, the rotation of the handle 2100 can drive the connecting cylinder 3200 to rotate but cannot drive the driving member 3100 to rotate, so that pressing down the handle 2100 cannot achieve unlocking the door lock. When the handle 2100 is lifted (rotated in the reverse-locking direction), the connecting cylinder 3200 may rotate together with the handle 2100. At this time, the first blocker 3240 may cooperate with the second blocker 3150 to drive the driving member to rotate to achieve reverse locking the door lock. For example, initial relative positions of the first blocker 3240 and the second blocker 3150 may be appropriately set. Specifically, it is assumed that a counterclockwise rotation corresponds to the reverse-locking direction. In the initial state, the second blocker 3150 may be located near a left side of the first blocker 3240. When the handle 2100 is driven to rotate counterclockwise (i.e., rotating in the reverse-locking direction), the connecting cylinder 3200 may also rotate counterclockwise, so that the first blocker 3240 may rotate counterclockwise to push the second blocker 3150 to rotate counterclockwise. A linkage relationship between the driving member 3100 and the reverse-locking bolt may be appropriately set. When the driving member 3100 rotates counterclockwise, the reverse-locking bolt may eject to realize the reverse locking. That is, unlocking the lock requires pressing the button 2200 and pressing down the handle 2100 at the same time and reverse locking the lock only requires lifting the handle 2100, which is convenient to operate under the premise of ensuring safety.

In addition, when the handle 2100 rotates in the reverse-locking direction, the first blocker 3240 may push the second blocker 3150 to rotate the driving member. The handle 2100 may be located at different positions relative to the door, and the rotation direction of the handle 2100 to open the door may be different. For example, for a door lock located on a left side of the door and a door lock located on a right side of the door, the rotating direction of the handle 2100 may be opposite when unlocking the lock. Therefore, a corresponding connecting cylinder 3200 needs to be selected according to the position of the handle 2100. Specifically, the connecting cylinder 3200 needs to be selected so that the first blocker 3240 can push the second blocker 3150 to rotate when the connecting cylinder 3200 rotates in the reverse-locking direction.

Merely by way of example, as shown in FIG. 40, the smart door lock may also include a large square bolt 3011, a reverse-locking pick 3003, a large square bolt fork 3010, and a transmission device 3019. One end of the reverse-locking pick 3003 may be coaxially installed with a shaft sleeve of the handle and include a protrusion for pushing when the large fork 3001 rotates. The other end may be a gear end. The middle part of the large square bolt fork 3010 may be rotatably connected to the indoor casing 2. One end of the large square bolt fork 3010 may include a gear meshing with the gear end of the reverse-locking pick 3003, and the other end may be a connection end connected to the large square bolt 3011. When a reverse locking is performed, the handle 2100 may be rotated in the reverse-locking direction, the first blocker 3240 may push the second blocker 3150 to rotate the large fork 3001. At the same time, the reverse-locking pick 3003 may rotate counterclockwise, so that the large square bolt 3011 may extend out of the lock housing to reversely lock the door lock. The state of the large square bolt 3011 extending out of the lock housing may be maintained by a large square bolt torsion spring 3017.

If the smart door lock is in a reverse-locking state, and to release the reverse-locking state, the handle 2100 may be rotated in a forward direction (refers to clockwise in the present disclosure) to drive the large fork 3001 to rotate. The large fork 3001 may drive a latch bolt 3006 to retract back to the indoor casing 2 and drive the reverse-locking pick 3003 to rotate clockwise. The reverse-locking pick 3003 may drive the large square bolt fork 3010 to rotate counterclockwise to retract the large square bolt 3011 into the indoor casing 2. The states of the large square bolt 3011 extending out of the lock housing or retracted into the lock housing may be maintained by the large square bolt torsion spring 3017.

In some embodiments, the smart door lock may further include a compression cover 3400. The limiting cover 3210 may include a mounting groove on a side away from the rotating cylinder 3220. The compression cover 3400 may be fixed with the limiting cover 3210. The blocking plate 3120 may be rotatably located in the mounting groove. In some embodiments, the mounting groove may also be located on a side of the compression cover 3400 facing the limiting cover 3210. In some embodiments, both the limiting cover 3210 and the compression cover 3400 may include a portion of the mounting groove. The compression cover 3400 may be configured to restrict the limiting cover 3210 from moving along its axial direction.

Figure 27:
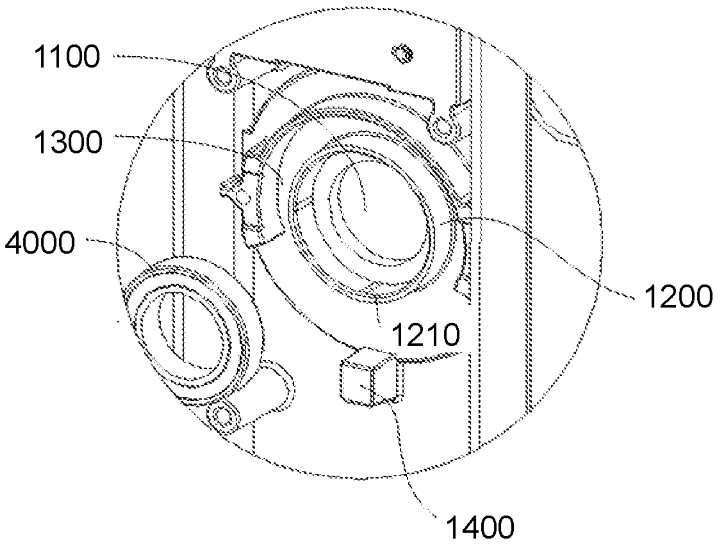
FIG. 27 is a schematic diagram illustrating an enlarged view of a portion A as described in connection with FIG. 26 according to some embodiments of the present disclosure.

In some embodiments, as shown in FIG. 27, the smart door lock may further include a bearing 4000. As shown in FIG. 36, a side of the fixing hole 1100 facing the action part may include a flange 1200 along its circumference. An outer ring of the bearing 4000 may be fixedly connected to the flange 1200. The limiting cover 3210 and the connecting part 2110 of the handle 2100 may abut against an inner ring of the bearing 4000 at two ends, respectively. The rotating cylinder 3220 of the connecting cylinder 3200 may pass through the fixing hole 1100 and be fixedly connected to the handle 2100 (e.g., by welding or plugging). Since the handle 2100 needs to drive the connecting cylinder 3200 to rotate frequently during use, the setting of the bearing 4000 may eliminate the gap between the connecting cylinder 3200 and the fixing hole 1100, which may avoid dust ingress and ensure internal cleanliness, and avoid a loosening of the connecting cylinder 3200 during the rotation of the handle 2100. At the same time, a shaking of the handle 2100 may be eliminated, which may ensure stability during usage, avoid wear due to friction, and prolong the service life. In addition, the setting of the flange 1200 may be more convenient to realize the fixedly connection with the outer ring of the bearing 4, which may ensure stability of the fixedly connection and reduce the thickness requirement of the panel 1000.

When the flange 1200 and the limiting plate 1300 are simultaneously located in the circumferential direction of the fixing hole 1100, the flange 1200 may be located on an inner side of the limiting plate 1300. The torsion spring 3300 may be sleeved on an outer side of the flange 1200. That is, the flange 1200 and the limiting plate 1300 may be enclosed to form a placement groove for placing the torsion spring 3300, which may have a simple structure and good stability.

In addition, an inner wall of the flange 1200 may include at least three convex ribs 1210 uniformly along an axial direction. A length direction of each convex rib 1210 may be parallel to the axial direction of the flange 1200. The outer ring of the bearing 4000 may have an interference cooperation with the convex ribs 1210. In some embodiments, the outer ring of the bearing 4000 may also have a direct interference cooperation with the inner wall of the flange 1200 to achieve the fixation. The setting of the convex ribs 1210 may facilitate the satisfaction of the accuracy requirements and reduce the strength requirements of the flange 1200, which is convenient for installation and operation.

In some embodiments, the smart door lock may further include a bearing pressure plate 4100 connected to the panel 1000. A diameter of the flange 1200 may be greater than that of the fixing hole 1100. The bearing pressure plate 4100 and the edge of the fixing hole 1100 may abut against the outer ring of the bearing 4000 from two ends to limit an axial movement of the bearing 4000. Since it is necessary to push and pull the handle 2100 to push or pull the door after the door lock is unlocked by rotating the handle 2100, the edge of the fixing hole 1100 and the bearing plate 4100 can stabilize the position of the bearing 4000, thereby preventing the bearing 4000 from being separated from the fixing hole 1100 under the driving of the handle 2100.

Figure 33:
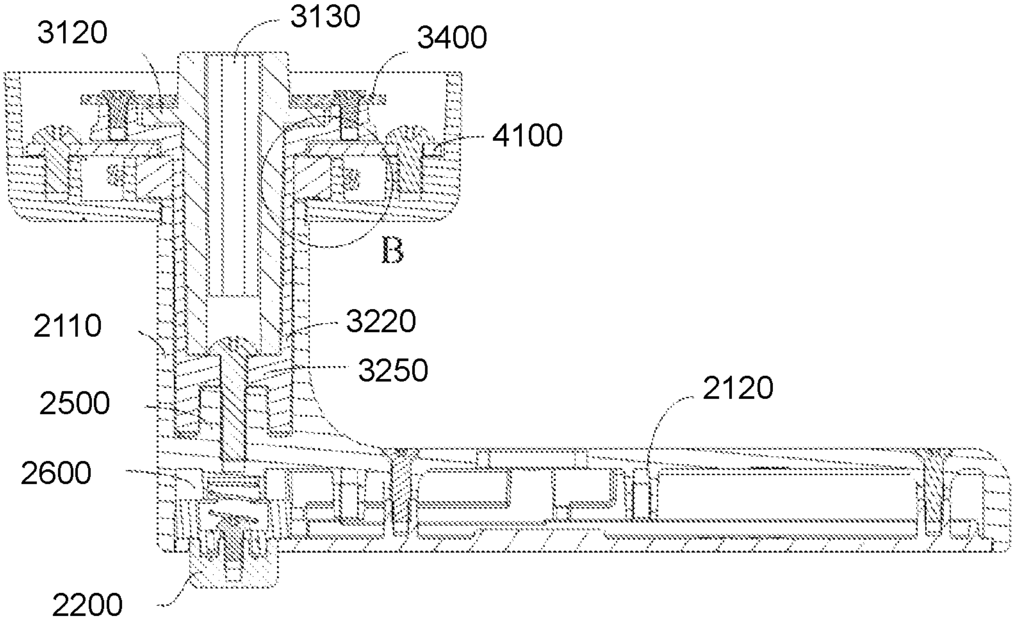
FIG. 33 is a schematic diagram illustrating an internal structure of an exemplary smart door lock as described in connection with FIG. 32 according to some embodiments of the present disclosure.
Figure 34:
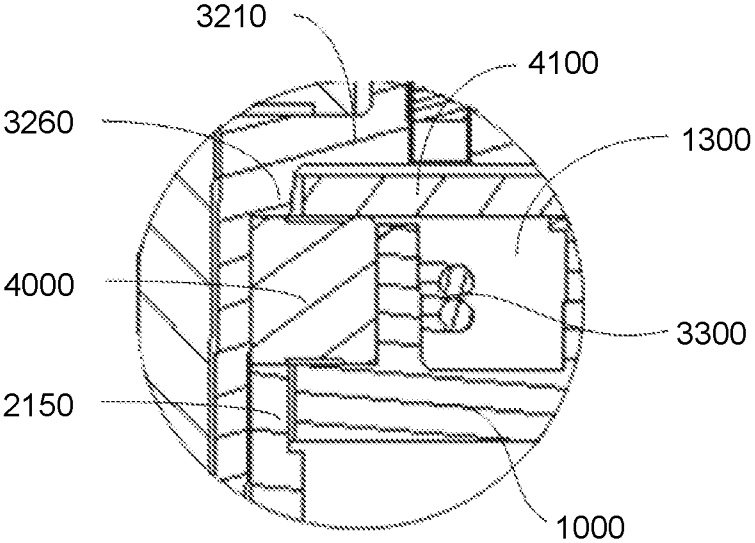
FIG. 34 is a schematic diagram illustrating an enlarged view of a portion B as described in connection with FIG. 33 according to some embodiments of the present disclosure.

In some embodiments, as shown in FIG. 33 and FIG. 34, the connecting portion 2110 may include a first convex plate 2150 on a side facing the driving member. The limiting cover 3210 may include a second convex plate 3260 on a side facing the operation part. The first convex plate 2150 and the second convex plate 3260 may abut against the inner ring of the bearing 4000 from both ends. The setting of the first convex plate 2150 and the second convex plate 3260 can prevent the limiting cover 3210 or the connecting part 2110 from contacting the outer ring of the bearing 4000. In some embodiments, a size of the limiting cover 3210 or the connecting part 2110 may be set that the limiting cover 3210 and the connecting part 2110 just abut against the inner ring of the bearing 4000 but not to contact the outer ring of the bearing 4000. The setting of the first convex plate 2150 and the second convex plate 3260 can simplify the size requirements of the limiting cover 3210 and the connecting part 2110 and simplify the processing technology.

In some embodiments, as shown in FIG. 39, the clutch 2300 may include an inserting column, and the clutch structure 3110 may be an inserting groove cooperating with the inserting column. Alternatively, the clutch 2300 may include an inserting groove, and the clutch structure 3110 may be an inserting column. By using the clutch 2300 including the inserting column, it may be convenient for the inserting column to extend through the spring baffle 2500 and the connecting plate 3250 to cooperate with the clutch structure 3110.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer-readable media having computer-readable program code embodied thereon.

A non-transitory computer-readable signal medium may include a propagated data signal with computer readable program code embodied therein, for example, in baseband or as part of a carrier wave. Such a propagated signal may take any of a variety of forms, including electromagnetic, optical, or the like, or any suitable combination thereof. A computer-readable signal medium may be any computer-readable medium that is not a computer-readable storage medium and that may communicate, propagate, or transport a program for use by or in connection with an instruction execution system, apparatus, or device. Program code embodied on a computer-readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object-oriented programming language such as Java, Scala, Smalltalk, Eiffel, JADE, Emerald, C++, C#, VB. NET, Python or the like, conventional procedural programming languages, such as the "C" programming language, Visual Basic, Fortran, Perl, COBOL, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution, e.g., an installation on an existing server or mobile device.

Similarly, it should be appreciated that in the foregoing description of embodiments of the present disclosure, various features are sometimes grouped together in a single embodiment, figure, or description thereof to streamline the disclosure aiding in the understanding of one or more of the various inventive embodiments. This method of disclosure, however, is not to be interpreted as reflecting an intention that the claimed object matter requires more features than are expressly recited in each claim. Rather, inventive embodiments lie in less than all features of a single foregoing disclosed embodiment.

In some embodiments, the numbers expressing quantities, properties, and so forth, used to describe and claim certain embodiments of the application are to be understood as being modified in some instances by the term "about," "approximate," or "substantially." For example, "about," "approximate" or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting effect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A lock, comprising:
- a bolt;
- an operating part;
- an action part configured to drive the bolt to move, wherein the operating part and the action part are connected to each other via a transmission connection, and the transmission connection is blockable; and
- a clutch mechanism and a handle linkage member, the clutch mechanism including a limiting member; wherein
  - the operating part includes a push-pull handle,
  - the handle linkage member includes a sliding plate that has a pull connection to one end of the push-pull handle,
  - the push-pull handle drives the sliding plate to slide in a preset track, and
  - the sliding plate includes a limiting notch matching with the limiting member.

2. The lock of claim 1, wherein the operating part and the action part switch between a transmission connection state and a transmission connection blocked state based on a sensing signal of one or more sensing units.

3. The lock of claim 2, wherein
- the lock further comprises a controller,
- the operating part includes one or more sensing units,
- the controller has a signal connection to the one or more sensing units,
- the one or more sensing units are configured to detect at least one of whether the operating part is in contact with a human body, whether the operating part is at the initial position, or biometric data generated after the human body is in contact with the operating part, and output the sensing signal based on a detection result,
- the controller is configured to control, based on the sensing signal, the operating part and the action part to be in the transmission connection state or the transmission connection blocked state.

4. The lock of claim 3, wherein
- the operating part is connected to the action part through the handle linkage member,
- the clutch mechanism includes a driving member,
- the limiting member has a transmission connection to the driving member;
- the controller has a signal connection to the driving member and is configured to control the driving member to drive the limiting member and the handle linkage member to separate or to cooperate based on the sensing signal.

5. The lock of claim 4, wherein the controller controls the driving member to drive the limiting member to move to a second position after the limiting member has been at a first position for a period longer than a preset period; when the limiting member is at the first position, the limiting member does not hinder the rotation of the handle linkage member, and when the limiting member is at the second position, the limiting member hinders the rotation of the handle linkage member.

6. The lock of claim 3, wherein when the detection result is that a pressure sensor is pressed and a human body touches the lock, the one or more sensing units output the sensing signal.

7. The lock of claim 2, wherein the one or more sensing units include at least one of a pressure sensor, a capacitance sensor, a biosensor, or a touch switch.

8. The lock of claim 2, wherein the one or more sensing units are arranged in different areas of the handle; or the one or more sensing units are arranged in regions other than the handle.

9. The lock of claim 1, wherein when the sensing signal indicates that the operating part is in contact with the human body, the controller is configured to control the driving member to drive the limiting member and the handle linkage member to separate.

10. The lock of claim 1, wherein
- the driving member comprises a motor,
- the clutch mechanism further comprises a linear motion output assembly,
- an output shaft of the motor has a transmission connection to the limiting member through the linear motion output assembly,
- the linear motion output assembly is configured to convert a rotation of the output shaft of the motor into a linear motion to drive the limiting member and the handle linkage member to separate or to cooperate.

11. The lock of claim 10, wherein the linear motion output assembly comprises:
- a clutch rotating shaft having a transmission connection to the output shaft of the motor, the clutch rotating shaft being a rotation end of the linear motion output assembly and rotating around its own axis; and a clutch actuator matched with the clutch rotating shaft through a threaded track, the clutch actuator being circumferentially limited and one end of the clutch actuator is connected to the limiting member.

12. The lock of claim 1, wherein the operation part and the action part switch between the transmission connection state and the transmission connection blocked state based on one or more mechanical actions.

13. The lock of claim 1, wherein the lock further comprises a detecting unit configured to detect a state of the lock, and the detecting unit is located on the action part and configured to detect whether an ejection and retraction of the bolt is in an abnormal state.

14. The lock of claim 13, wherein the state of the lock includes at least one of a working state, an installation state, or an abnormal state.

15. A system for controlling a lock, wherein, the lock comprises a bolt, an operating part, an action part configured to drive the bolt to move, wherein the operating part and the action part are connected to each other via a transmission connection, and the transmission connection is blockable;

a clutch mechanism and a handle linkage member, the clutch mechanism including a limiting member; wherein the operating part includes a push-pull handle, the handle linkage member includes a sliding plate that has a pull connection to one end of the push-pull handle, the push-pull handle drives the sliding plate to slide in a preset track, and the sliding plate includes a limiting notch matching with the limiting member;

the system comprises:

a storage device storing a set of instructions, and at least one processor in communication with the storage device, wherein when executing the set of instructions, the at least one processor is configured to cause the system to:

acquire a sensing signal by one or more sensing units; and control, based on the sensing signal, the operating part and the action part to switch between a transmission connection state and a transmission connection blocked state.

16. A method for controlling a lock, wherein, the lock comprises a bolt, an operating part, an action part configured to drive the bolt to move, wherein the operating part and the action part are connected to each other via a transmission connection, and the transmission connection is blockable;

a clutch mechanism and a handle linkage member, the clutch mechanism including a limiting member; wherein the operating part includes a push-pull handle, the handle linkage member includes a sliding plate that has a pull connection to one end of the push-pull handle, the push-pull handle drives the sliding plate to slide in a preset track, and the sliding plate includes a limiting notch matching with the limiting member;

the method comprises:

acquiring a sensing signal by one or more sensing units; and controlling, based on the sensing signal, the operating part and the action part to switch between a transmission connection state and a transmission connection blocked state.

* * * * *